(12) United States Patent
Maruyama et al.

(10) Patent No.: US 10,421,906 B2
(45) Date of Patent: *Sep. 24, 2019

(54) LIQUID-CRYSTAL DISPLAY ELEMENT

(71) Applicant: DIC Corporation, Tokyo (JP)

(72) Inventors: Kazunori Maruyama, Kita-adachi-gun (JP); Yoshinori Iwashita, Kita-adachi-gun (JP); Shinji Ogawa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 15/329,331

(22) PCT Filed: Jul. 23, 2015

(86) PCT No.: PCT/JP2015/070947
§ 371 (c)(1),
(2) Date: Jan. 26, 2017

(87) PCT Pub. No.: WO2016/017519
PCT Pub. Date: Feb. 4, 2016

(65) Prior Publication Data
US 2017/0210988 A1  Jul. 27, 2017

(30) Foreign Application Priority Data
Jul. 29, 2014 (JP) ................. 2014-153826

(51) Int. Cl.
| | | |
|---|---|---|
| *G02F 1/1333* | (2006.01) | |
| *C09K 19/30* | (2006.01) | |
| *G02F 1/1368* | (2006.01) | |
| *G02F 1/1337* | (2006.01) | |
| *G02F 1/1343* | (2006.01) | |
| *G02F 1/1362* | (2006.01) | |
| *C09K 19/32* | (2006.01) | |
| *C09K 19/44* | (2006.01) | |
| *G02F 1/137* | (2006.01) | |
| *C09K 19/12* | (2006.01) | |
| *C09K 19/34* | (2006.01) | |

(52) U.S. Cl.
CPC ...... *C09K 19/3066* (2013.01); *C09K 19/3003* (2013.01); *C09K 19/322* (2013.01); *C09K 19/44* (2013.01); *G02F 1/137* (2013.01); *G02F 1/1337* (2013.01); *G02F 1/1368* (2013.01); *G02F 1/13439* (2013.01); *G02F 1/134309* (2013.01); *G02F 1/136286* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3425* (2013.01); *G02F 2001/13712* (2013.01); *G02F 2001/133738* (2013.01); *G02F 2001/134372* (2013.01); *G02F 2201/121* (2013.01); *G02F 2201/123* (2013.01)

(58) Field of Classification Search
CPC ........... C09K 19/3006; C09K 19/3003; C09K 19/322; C09K 19/44; C09K 2019/123; C09K 2019/3004; C09K 2019/3009; C09K 2019/301; C09K 2019/3016; C09K 2019/3425; G02F 1/1333; G02F 1/1337; G02F 1/134309; G02F 1/13439; G02F 1/136286; G02F 1/1368; G02F 1/137; G02F 2001/133738; G02F 2001/134372; G02F 2001/13712; G02F 2201/121; G02F 2201/123
USPC .................................................. 252/299.62
See application file for complete search history.

(56) References Cited

U.S. PATENT DOCUMENTS

| | | |
|---|---|---|
| 6,497,828 B1 | 12/2002 | Hirschmann et al. |
| 8,368,067 B2 | 2/2013 | Uchiyama et al. |
| 8,860,912 B2 | 10/2014 | Kaneoya et al. |
| 8,885,124 B2 | 11/2014 | Kaneoya et al. |

(Continued)

FOREIGN PATENT DOCUMENTS

| | | |
|---|---|---|
| CN | 101133138 A | 2/2008 |
| CN | 101276106 A | 10/2008 |

(Continued)

OTHER PUBLICATIONS

International Search Report dated Oct. 20, 2015, issued in counterpart application No. PCT/JP2015/070947. (3 pages).

(Continued)

*Primary Examiner* — Geraldina Visconti
(74) *Attorney, Agent, or Firm* — Westerman, Hattori, Daniels & Adrian, LLP

(57) ABSTRACT

There is provided a liquid crystal display element. The liquid crystal layer contains a liquid crystal composition between the first substrate and the second substrate. The first common electrode contains a transparent conductive material on the first substrate. The second common electrode contains a transparent conductive material on the second substrate. The pixel electrode contains a transparent conductive material. Distances R between the pixel electrode and the common electrode is smaller than distance G between the first substrate and the second substrate. The common electrode is disposed closer to the first substrate than the pixel electrode over nearly the entire surface of the first substrate. The liquid crystal composition has negative dielectric anisotropy and contains one or two or more compounds selected from the group of compounds represented by General Formula (i), General Formula (ii), and General Formula (iii).

8 Claims, 5 Drawing Sheets

(56) References Cited

U.S. PATENT DOCUMENTS

| | | | |
|---|---|---|---|
| 8,961,823 B2 | 2/2015 | Gotoh et al. | |
| 9,120,968 B2 | 9/2015 | Kaneoya et al. | |
| 9,376,618 B2* | 6/2016 | Ogawa | C09K 19/12 |
| 9,464,229 B2* | 10/2016 | Kurisawa | C09K 19/42 |
| 10,031,384 B2* | 7/2018 | Ogawa | G02F 1/1368 |
| 2001/0010576 A1 | 8/2001 | Lee et al. | |
| 2001/0048501 A1 | 12/2001 | Kim et al. | |
| 2003/0117558 A1 | 6/2003 | Kim et al. | |
| 2005/0280762 A1 | 12/2005 | Lee et al. | |
| 2006/0257763 A1 | 11/2006 | Araki | |
| 2008/0239181 A1 | 10/2008 | Jin | |
| 2009/0268150 A1 | 10/2009 | Hattori et al. | |
| 2009/0309066 A1 | 12/2009 | Klasen-Memmer | |
| 2010/0140614 A1 | 6/2010 | Uchiyama | |
| 2010/0271569 A1 | 10/2010 | Ohkuma et al. | |
| 2011/0116017 A1 | 5/2011 | Gere | |
| 2011/0193020 A1 | 8/2011 | Klasen-Memmer et al. | |
| 2011/0248216 A1 | 10/2011 | Klasen-Memmer et al. | |
| 2011/0297881 A1 | 12/2011 | Hirata et al. | |
| 2012/0236246 A1 | 9/2012 | Furusato et al. | |
| 2012/0261614 A1 | 10/2012 | Goto et al. | |
| 2012/0268706 A1 | 10/2012 | Goebel et al. | |
| 2012/0326084 A1 | 12/2012 | Klasen-Memmer et al. | |
| 2013/0169906 A1 | 7/2013 | Nakanishi et al. | |
| 2013/0183460 A1 | 7/2013 | Klasen-Memmer et al. | |
| 2013/0193377 A1 | 8/2013 | Saigusa et al. | |
| 2013/0207039 A1 | 8/2013 | Hattori et al. | |
| 2013/0265527 A1 | 10/2013 | Takeuchi et al. | |
| 2013/0329168 A1 | 12/2013 | Chung et al. | |
| 2014/0016075 A1 | 1/2014 | Iwata et al. | |
| 2014/0104522 A1 | 4/2014 | Onda et al. | |
| 2014/0104524 A1 | 4/2014 | Lee et al. | |
| 2014/0218667 A1 | 8/2014 | Miyachi et al. | |
| 2015/0002773 A1 | 1/2015 | Ogawa et al. | |
| 2015/0070646 A1 | 3/2015 | Kim et al. | |
| 2015/0275089 A1 | 10/2015 | Katano et al. | |
| 2016/0272889 A1* | 9/2016 | Ogawa | C09K 19/0403 |
| 2017/0210988 A1 | 7/2017 | Maruyamal | |
| 2017/0218270 A1* | 8/2017 | Maruyama | C09K 11/883 |

FOREIGN PATENT DOCUMENTS

| | | |
|---|---|---|
| CN | 102264867 A | 11/2011 |
| CN | 103476905 A | 12/2013 |
| JP | S5170602 A | 6/1976 |
| JP | 11-202356 A | 7/1999 |
| JP | 2000-019321 A | 1/2000 |
| JP | 2000-192040 A | 7/2000 |
| JP | 2002-31812 A | 1/2002 |
| JP | 2002-309255 A | 10/2002 |
| JP | 2003-233083 A | 8/2003 |
| JP | 2005-281559 A | 10/2005 |
| JP | 2006-165528 A | 6/2006 |
| JP | 2006-317602 A | 11/2006 |
| JP | 2007-96055 A | 4/2007 |
| JP | 2009-058546 A | 3/2009 |
| JP | 2009-109542 A | 5/2009 |
| JP | 2009-163014 A | 7/2009 |
| JP | 2010-503733 A | 2/2010 |
| JP | 2010-189560 A | 9/2010 |
| JP | 2010-250117 A | 11/2010 |
| JP | 2010-256509 A | 11/2010 |
| JP | 2010-535910 A | 11/2010 |
| JP | 2011141356 A | 7/2011 |
| JP | 2011-186043 A | 9/2011 |
| JP | 2013-144796 A | 7/2013 |
| JP | 2013-173915 A | 9/2013 |
| JP | 5288224 B1 | 9/2013 |
| JP | 2014-81450 A | 5/2014 |
| KR | 20120048434A A | 5/2012 |
| KR | 20120120992 A | 11/2012 |
| TW | 200808943 A | 2/2008 |
| TW | 200819520 A | 5/2008 |
| TW | 200829965 A | 7/2008 |
| TW | 200918646 A | 5/2009 |
| TW | 201124479 A | 7/2011 |
| TW | 201139343 A | 11/2011 |
| TW | 201142502 A1 | 12/2011 |
| TW | 201245426 A | 11/2012 |
| TW | 201321484 A | 6/2013 |
| WO | 2010/095506 A1 | 8/2010 |
| WO | 2011/092973 A1 | 8/2011 |
| WO | 2012/053323 A1 | 4/2012 |
| WO | 2012/117875 A | 9/2012 |
| WO | 2012/144321 A1 | 10/2012 |
| WO | 2013024749 A1 | 2/2013 |
| WO | 2013115164 A1 | 8/2013 |
| WO | 2013133383 A1 | 9/2013 |
| WO | 2014/069550 A1 | 5/2014 |

OTHER PUBLICATIONS

Park et al., Comparison of the Process Margin between FFS and IPS mode?Proceedings of The 18th International Display Workshops, ISSN-L 1883-2490, 2011, vol. 3, pp. 1561-1562.

Seen et al., "A new liquid Crystal Fringe-Field Switching Device with Superior Outdoor Readability", Japanese Journal of Applied Physics, 2010, vol. 49, No. 8, pp. 084302-1-084302-3, cited in Japanese Office Action dated May 26, 2016 issued in counterpart of JP 2014-153824 (1 page).

International Search Report dated Oct. 20, 2015, issued in PCT/JP2015/070958.

Non Final Office Action dated Oct. 2, 2017, issued in U.S. Appl. No. 15/328,178.

K. Nomura, et al. "Room-temperature fabrication of transparent flexible thin-film transistors using amorphous oxide semiconductors", Nature Publishing Group, vol. 432, 2204, p. 488-492.

Non-Final Office Action dated Apr. 21, 2017, issued in U.S. Appl. No. 15/035,652.

Final Office Action dated Aug. 16, 2017, issued in U.S. Appl. No. 15/035,652.

International Search Report dated Jan. 27, 2015, issued in counterpart International Application No. PCT/JP2014/0791972.

Young Jin Lim et al., "High performance transflective liquid crystal display associated with fringe-field switching device", Optics Express, Apr. 25, 2014, vol. 19, No. 9, pp. 8085-8091, cited in Korean Office Action dated Dec. 22, 2014, corresponds to U.S. Appl. No. 14/405,057: (7 pages).

Notice Allowance dated Nov. 23, 2015, issued in U.S. Appl. No. 14/405,353. (9 pages).

International Search Report dated Dec. 10, 2013, issued in application No. PCT/JP2013/076805(counterpart to U.S. Appl. No. 14/405,057)(3 pages).

Written Opinion dated Dec. 10, 2013, issued in application No. PCT/JP2013/076805(counterpart to U.S. Appl. No. 14/405,057)(4 pages).

International Search Report dated Dec. 10, 2013, issued in application No. PCT/JP2013/076806(counterpart to U.S. Appl No. 14/405,057)(3 pages).

Written Opinion dated Dec. 10, 2013, issued in application No. PCT/JP2013/076806(counterpart to U.S. Appl. No. 14/405,057)(5 pages)

International Search Report dated Oct. 20, 2015, issued in application No. PCT/JP2015/071211(counterpart to U.S. Appl. No. 15/329,437). (2 pages).

Non-Final Office Action dated Nov. 29, 2018, issued in U.S. Appl. No. 15/328,178.(19 pages).

* cited by examiner

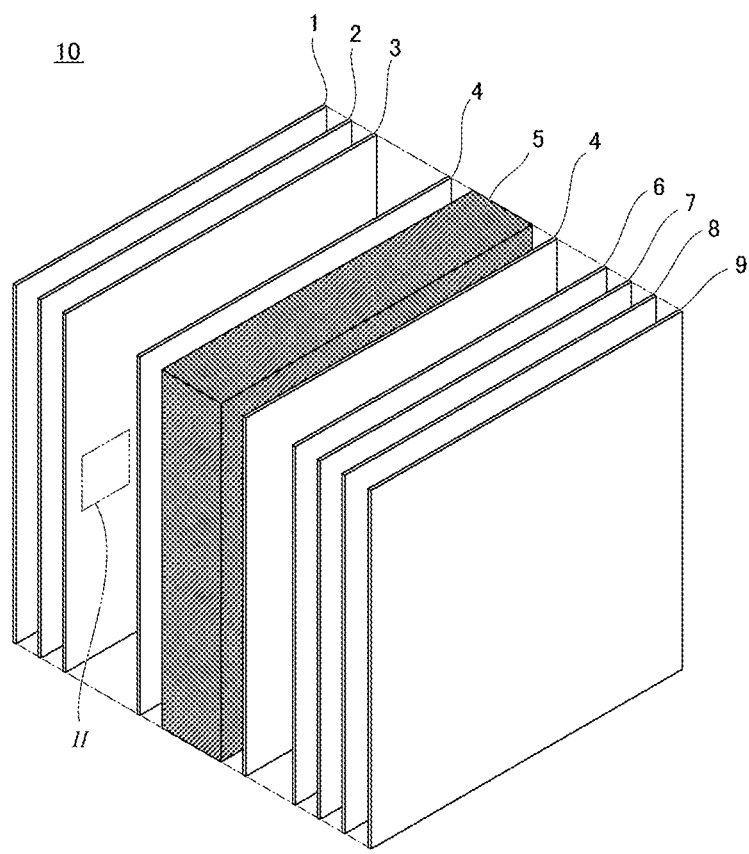
[Figure 1]

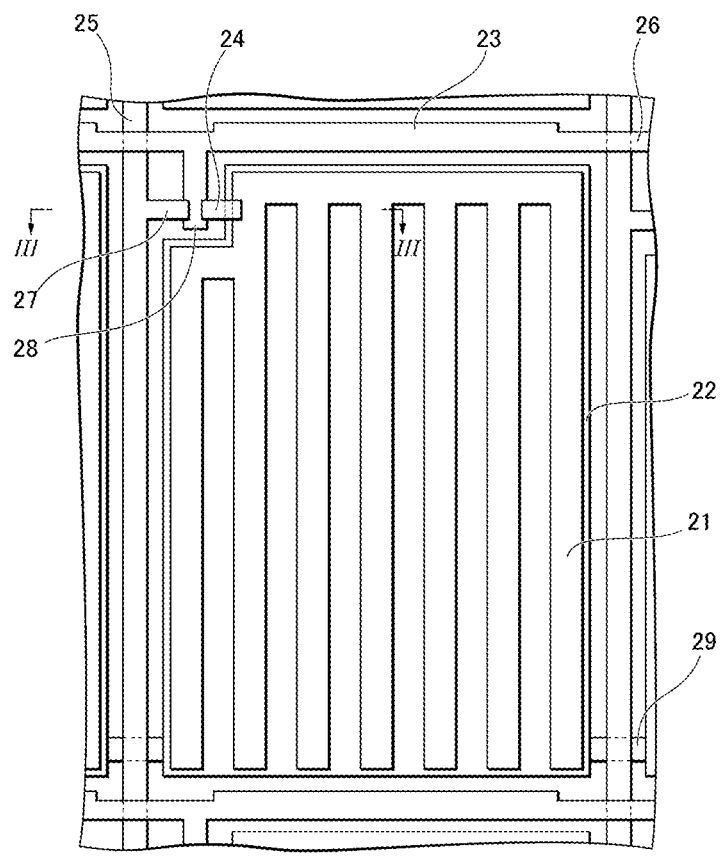
[Figure 2]

[Figure 3]
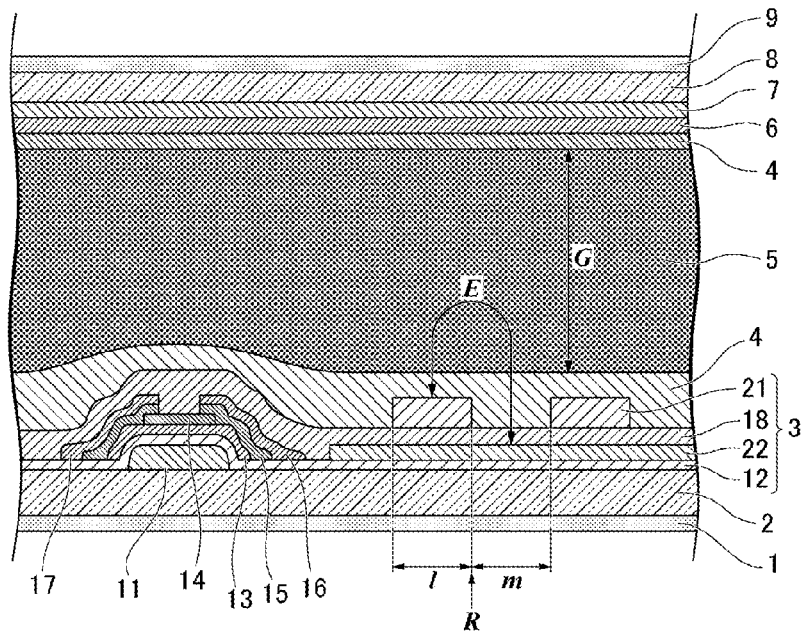
[Figure 4]
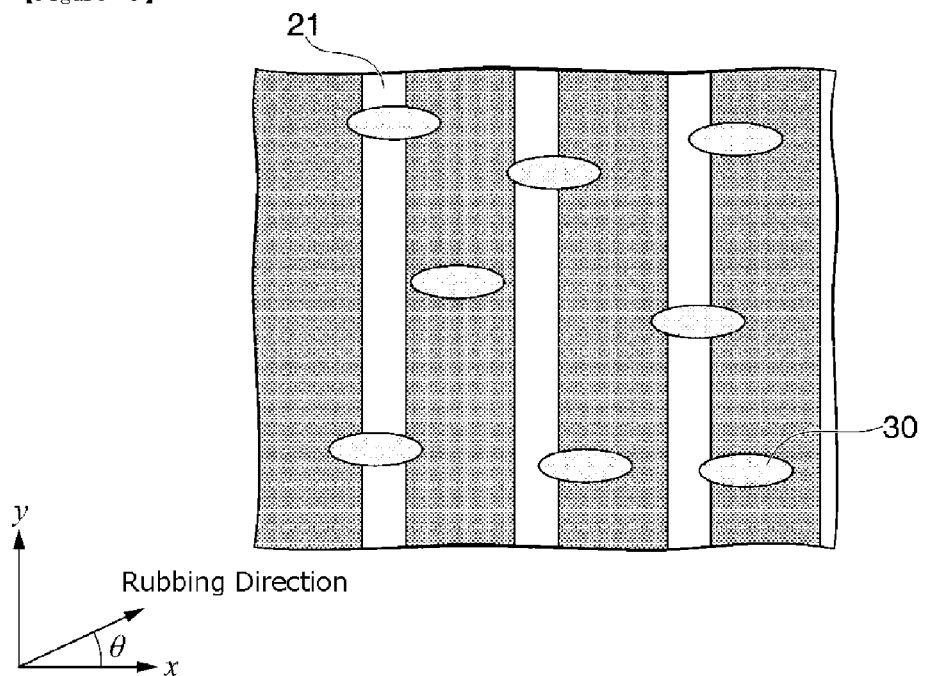

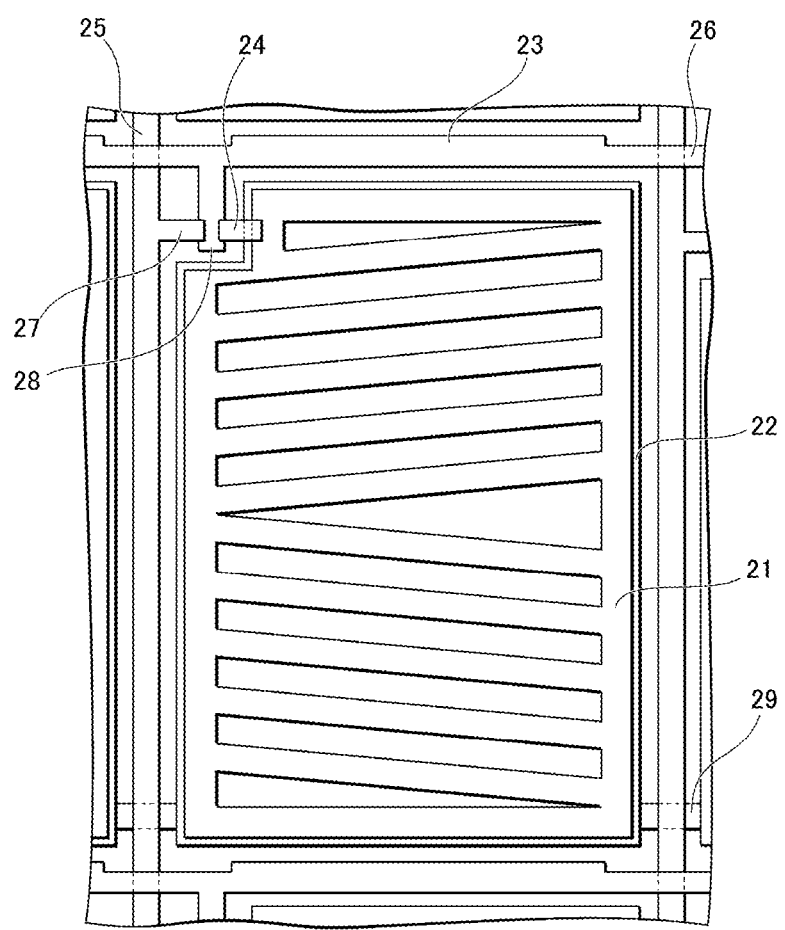
【Figure 5】

[Figure 6]
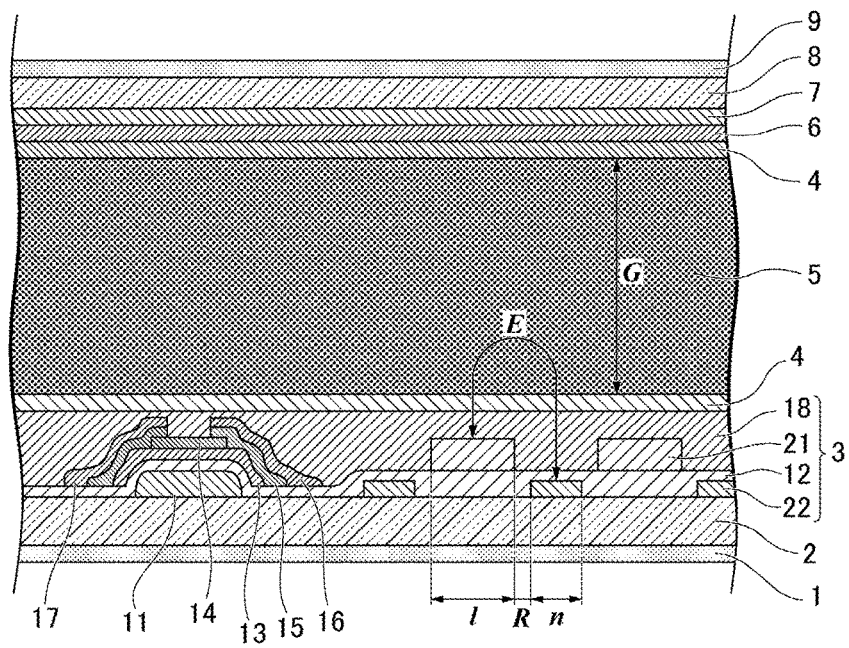
[Figure 7]
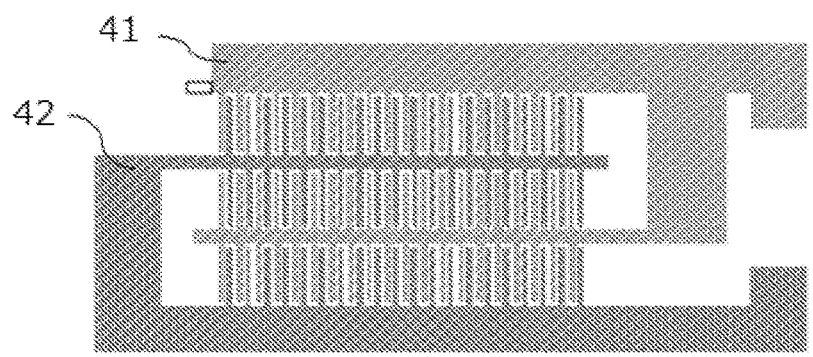

LIQUID-CRYSTAL DISPLAY ELEMENT

TECHNICAL FIELD

The present invention relates to an FFS mode liquid crystal display device using a nematic liquid crystal composition having negative dielectric anisotropy, which has high transmittance and a high opening ratio.

BACKGROUND ART

From the fact that display quality is excellent, active matrix type liquid crystal display elements have been put on the market for portable terminals, liquid crystal televisions, projectors, computers and the like. In the active matrix type elements, thin film transistors (TFT), metal-insulator-metals (MIM), or the like are used for each pixel, and it is important that the liquid crystal compound or the liquid crystal composition used in this type has a high voltage holding ratio. In addition, a liquid crystal display element which includes a Vertical Alignment (VA) mode, an In-Plane Switching (IPS) mode, and an Optically Compensated Bend, Optically Compensated Birefringence (OCB) mode in combination is proposed in order to obtain wider viewing angle characteristics, and an Electrically Controlled Birefringence (ECB) mode reflective liquid crystal display element is proposed in order to obtain a brighter display. To comply with such liquid crystal display elements, new liquid crystal compounds or liquid crystal compositions are currently being proposed.

At present, as the liquid crystal display for smartphones, a fringe field switching mode liquid crystal display device (FFS mode liquid crystal display device) having high quality and excellent visual characteristics, which is a type of an IPS mode liquid crystal display element, is widely used (refer to PTLs 1 and 2). The FFS mode is a mode introduced for improving the low opening ratio and transmittance of the IPS mode, and as the liquid crystal composition used, a material using a p-type liquid crystal composition having positive dielectric anisotropy is widely used from the viewpoint of easily lowering a voltage. In addition, since most applications of the FFS mode are for portable terminals, there is a strong demand for more power saving, and liquid crystal element manufacturers are continuing to carry out active development in this regard, such as adoption of arrays using IGZO.

On the other hand, currently, it is also possible to improve the transmittance by changing a liquid crystal material currently using a p-type material to an n-type material having negative dielectric anisotropy (refer to PTL 3). This is because the FFS mode does not produce a perfect parallel electric field unlike the IPS mode, and in the case of using the p-type material, the liquid crystal molecules close to the pixel electrode tilt along the fringe electric field of the major axis of the liquid crystal molecules, thereby deteriorating the transmittance. On the other hand, in the case of using the n-type liquid crystal composition, since the polarization direction of the n-type composition is the minor axis direction of the molecules, the influence of the fringe electric field simply rotates the liquid crystal molecules along the major axis and the major axis of the molecule is maintained in a parallel arrangement, so that the transmittance does not decrease.

However, although an n-type liquid crystal composition is typical as a liquid crystal composition for VA, the VA mode and the FFS mode are different in all the points of alignment direction, electric field direction, and required optical characteristics. Further, the FFS mode liquid crystal display element has the features of the electrode structure as described below and, in the VA mode, electrodes are provided on both of the two substrates, whereas in the FFS mode, electrodes are provided only in the array substrate. Therefore, nothing is known about problems such as burn-in or drip mark for which it is difficult to predict the effects with the related art. Accordingly, even if the liquid crystal composition used for VA is simply used for this purpose, it is difficult to form a high-performance liquid crystal display element as required today, and therefore, there is a demand to provide an n-type liquid crystal composition optimized for FFS mode.

CITATION LIST

Patent Literature

PTL 1: JP-A-11-202356
PTL 2: JP-A-2003-233083
PTL 3: JP-A-2002-31812

SUMMARY OF INVENTION

Technical Problem

The object of the present invention is to provide a liquid crystal display element using an n-type liquid crystal composition which is able to realize excellent display characteristics by using the composition for an FFS mode liquid crystal display element and which is excellent in various characteristics as a liquid crystal display element, such as dielectric anisotropy ($\Delta\varepsilon$), viscosity ($\eta$), nematic phase-isotropic liquid transition temperature ($T_{NI}$), nematic phase stability at low temperatures, and rotational viscosity ($\gamma_1$).

Solution to Problem

The inventors of the present invention conducted intensive research in order to solve the problems described above and, as a result of researching the formation of various liquid crystal compositions most suitable for an FFS mode liquid crystal display element, the present inventors found that a liquid crystal composition containing a specific liquid crystal compound is useful and completed the present invention.

The present invention provides a liquid crystal display element including:

a first transparent insulating substrate and a second transparent insulating substrate, which are disposed so as to face each other;

a liquid crystal layer containing a liquid crystal composition, which is interposed between the first substrate and the second substrate;

on the first substrate, a first common electrode containing a transparent conductive material and a plurality of gate bus lines and data bus lines being disposed in a matrix shape;

on the second substrate, a second common electrode containing a transparent conductive material;

for each pixel, a thin film transistor provided at an intersection between the gate bus lines and data bus lines, and a pixel electrode containing a transparent conductive material, which is driven by the thin film transistor; and alignment film layers which induce homogeneous alignment between the liquid crystal layer and each of the first and second substrates and whose alignment directions are parallel to each other, wherein a distances R between the pixel electrode and the common electrode is smaller than a distance G between the first substrate and the second substrate so that the pixel electrode and the common electrode form fringe electric fields therebetween, the common electrode is disposed closer to the first substrate than the pixel electrodes and over nearly the entire surface of the first substrate, and the liquid crystal composition has negative dielectric anisotropy and contains one or more compounds selected from the group of compounds represented by General Formula (i), General Formula (ii), and General Formula (iii) below.

[Chem. 1]

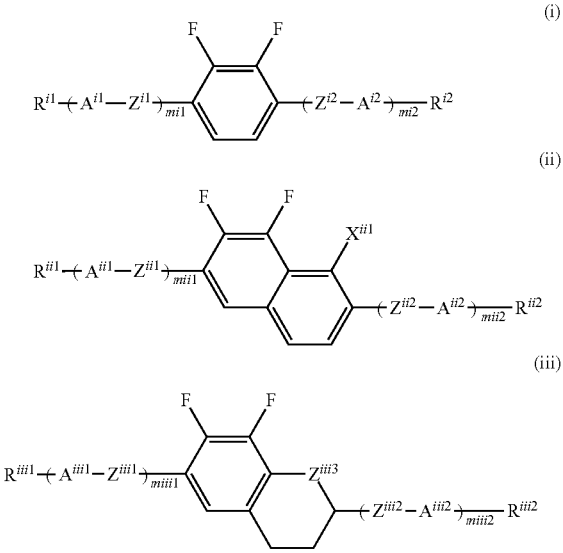

In the formulas, $R^{i1}$, $R^{i2}$, $R^{ii1}$, $R^{ii2}$, $R^{iii1}$, and $R^{iii2}$ each independently represent an alkyl group having 1 to 10 carbon atoms, one or two or more non-adjacent —$CH_2$— in the alkyl groups may each independently be substituted with —CH=CH—, —C≡C—, —O—, —CO—, —COO— or —OCO—, $A^{i1}$, $A^{i2}$, $A^{ii1}$, $A^{ii2}$, $A^{iii1}$, and $A^{iii2}$ each independently represent a group selected from the group consisting of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=), and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $Z^{i1}$, $Z^{i2}$, $Z^{ii1}$, $Z^{ii2}$, $Z^{iii1}$ and $Z^{iii2}$ each independently represent a single bond, —$OCH_2$—, —$CH_2O$—, —$OCF_2$—, —$CF_2O$—, —$CH_2CH_2$—, or —$CF_2CF_2$—, $Z^{iii3}$ represents —$CH_2$— or an oxygen atom, $X^{ii1}$ represents a hydrogen atom or a fluorine atom, $m^{i1}$, $m^{i2}$, $m^{ii1}$, $m^{ii2}$, $m^{iii1}$, and $m^{iii2}$ each independently represent an integer of 0 to 3, $m^{i1}+m^{i2}$, $m^{ii1}+m^{ii2}$ and $m^{iii1}+m^{iii2}$ are 1, 2, or 3, and in the case where there is a plurality of $A^{i1}$ to $A^{iii2}$ and $Z^{i1}$ to $Z^{iii2}$, these may be the same or different.

Advantageous Effects of Invention

The FFS mode liquid crystal display element of the present invention is excellent in high-speed responsiveness, has a feature of generating few display defects, is able to suppress alignment unevenness, and has excellent display characteristics. The liquid crystal display element of the present invention is useful for display elements such as liquid crystal TVs or monitors.

BRIEF DESCRIPTION OF DRAWINGS

FIG. 1 is a diagram schematically showing an example of a configuration of a liquid crystal display element of the present invention.

FIG. 2 is a planar diagram in which a region surrounded by a line II of an electrode layer 3 formed on a substrate 2 in FIG. 1 is enlarged.

FIG. 3 is a cross-sectional view of the liquid crystal display element shown in FIG. 1 in the direction along the line III-III in FIG. 2.

FIG. 4 is a view schematically showing an alignment direction of the liquid crystal induced by an alignment film 4.

FIG. 5 is a planar diagram in which another example of the region surrounded by the line II of the electrode layer 3 formed on the substrate 2 in FIG. 1 is enlarged.

FIG. 6 is a cross-sectional diagram of another example which cuts away the liquid crystal display element shown in FIG. 1 in the direction of line III-III in FIG. 2.

FIG. 7 is a planar diagram in which the electrode configuration of the liquid crystal display element is enlarged.

DESCRIPTION OF EMBODIMENTS

As described above, the present invention is based on the finding of an optimum n-type liquid crystal composition for an FFS mode liquid crystal display element. Hereinafter, first, description will be given of embodiments of the liquid crystal composition of the present invention.

(Liquid Crystal Layer)

The liquid crystal composition of the present invention contains one type or two or more types of compounds represented by General Formula (i), General Formula (ii), and General Formula (iii).

[Chem. 2]

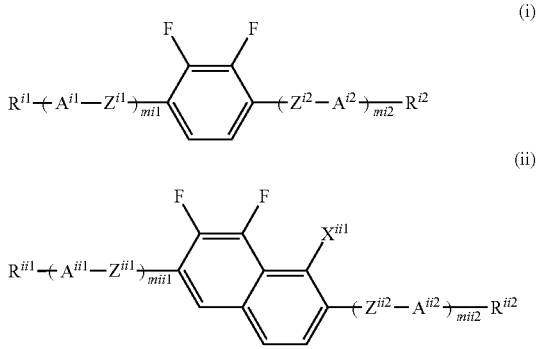

(iii)

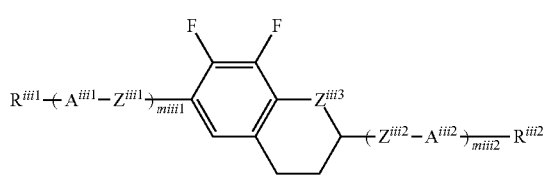

The compounds represented by General Formulas (i), (ii) and (iii) are preferably compounds having a negative Δε and an absolute value greater than 3.

In General Formulas (i), (ii) and (iii), $R^{i1}$, $R^{i2}$, $R^{ii1}$, $R^{ii2}$, $R^{iii1}$ and $R^{iii2}$ each independently preferably represent an alkyl group having 1 to 8 carbon atoms, an alkoxy group having 1 to 8 carbon atoms, an alkenyl group having 2 to 8 carbon atoms or an alkenyloxy group having 2 to 8 carbon atoms, more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, even more preferably an alkyl group having 1 to 5 carbon atoms or an alkenyl group having 2 to 5 carbon atoms, still more preferably an alkyl group having 2 to 5 carbon atoms or an alkenyl group having 2 to 3 carbon atoms, and particularly preferably an alkenyl group having 3 carbon atoms (propenyl group).

In addition, in the case where the ring structure to which $R^{i1}$, $R^{i2}$, $R^{ii1}$, $R^{ii2}$, $R^{iii1}$ and $R^{iii2}$ are bonded is a phenyl group (aromatic group), a linear alkyl group having 1 to 5 carbon atoms, a linear alkoxy group having 1 to 4 carbon atoms, and an alkenyl group having 4 to 5 carbon atoms are preferable, and in the case where the ring structure to which $R^{i1}$, $R^{i2}$, $R^{ii1}$, $R^{ii2}$, $R^{iii1}$ and $R^{iii2}$ are bonded is saturated, such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferable. In order to stabilize the nematic phase, it is preferable that the total of a carbon atom and an oxygen atom, if any, is 5 or less, and the linear is preferable.

The alkenyl group is preferably selected from a group represented by any one of formula (R1) to formula (R5). (The black dot in each formula represents a carbon atom in the ring structure.)

[Chem. 3]

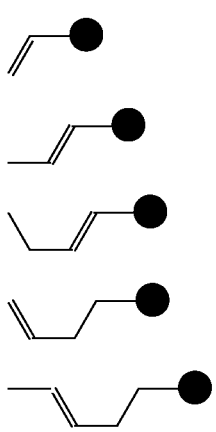

(R1)
(R2)
(R3)
(R4)
(R5)

In order to improve the transmittance of the liquid crystal display element, particularly in the case where $m^{i1}+m^{iii2}$ is 2 or 3, at least one group of $R^{iii1}$ or $R^{iii2}$ is preferably a group other than formula (R2), and more preferably an alkyl group or an alkoxy group. Similarly, in the case where $m^{ii1}+m^{ii2}$ is 2 or 3, at least one group of $R^{ii1}$ or $R^{ii2}$ is preferably a group other than formula (R2), and more preferably an alkyl group or alkoxy group. In addition, in the case where $m^{iii1}+m^{iii2}$ is 2 or 3, at least one group of $R^{iii1}$ or $R^{iii2}$ is preferably a group other than formula (R2), and more preferably an alkyl group or alkoxy group.

In the case where it is required that $A^{i1}$, $A^{i2}$, $A^{ii1}$, $A^{ii2}$, $A^{iii1}$, and $A^{iii2}$ each independently increase Δn, the above are preferably aromatic, and in order to improve the response speed, the above are preferably aliphatic, and the above preferably represent a trans-1,4-cyclohexylene group, a 1,4-phenylene group, a 2-fluoro-1,4-phenylene group, a 3-fluoro-1,4-phenylene group, a 3,5-difluoro 1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably represent the following structure,

[Chem. 4]

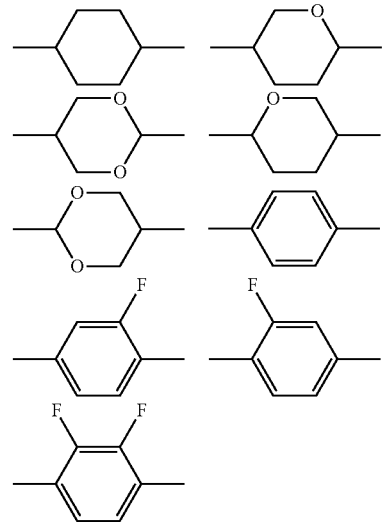

and even more preferably represent a trans-1,4-cyclohexylene group or a 1,4-phenylene group.

$Z^{i1}$, $Z^{i2}$, $Z^{ii1}$, $Z^{ii2}$, $Z^{iii1}$ and $Z^{iii2}$ each independently preferably represent —CH$_2$O—, —CF$_2$O—, —CH$_2$CH$_2$—, —CF$_2$CF$_2$— or a single bond, more preferably —CH$_2$O—, —CH$_2$CH$_2$—, or a single bond, and particularly preferably —CH$_2$O— or a single bond.

$X^{ii2}$ is preferably a fluorine atom.

$Z^{iii3}$ is preferably an oxygen atom.

$m^{i1}+m^{i2}$, $m^{ii1}+m^{ii2}$ and $m^{iii1}+m^{iii2}$ are preferably 1 or 2, and more preferably a combination in which $m^{i1}$ is 1 and $m^{i2}$ is 0, a combination in which $m^{i1}$ is 2 and $m^{i2}$ is 0, a combination in which $m^{i1}$ is 1 and $m^{i2}$ is 1, a combination in which $m^{i1}$ is 2 and $m^{i2}$ is 1, a combination in which $m^{ii1}$ is 1 and $m^{ii2}$ is 0, a combination in which $m^{ii1}$ is 2 and $m^{ii2}$ is 0, a combination in which $m^{iii1}$ is 1 and $m^{iii2}$ is 0, or a combination in which $m^{iii1}$ is 2 and $m^{iii2}$ is 0.

The lower limit value of the preferable content of the compound represented by formula (i) with respect to the total amount of the composition of the present invention is 1%, 10%, 20%, 30%, 40%, 50%, 55%, 60%, 65%, 70%, 75%, or 80%. The upper limit value of the preferable content is 95%, 85%, 75%, 65%, 55%, 45%, 35%, 25%, or 20%.

The lower limit value of the preferable content of the compound represented by formula (ii) with respect to the total amount of the composition of the present invention is 1%, 10%, 20%, 30%, 40%, 50%, 55%, 60%, 65%, 70%, 75%, or 80%. The upper limit value of the preferable content is 95%, 85%, 75%, 65%, 55%, 45%, 35%, 25%, or 20%.

The lower limit value of the preferable content of the compound represented by formula (iii) with respect to the total amount of the composition of the present invention is 1%, 10%, 20%, 30%, 40%, 50%, 55%, 60%, 65%, 70%, 75%, or 80%. The upper limit value of the preferable content is 95%, 85%, 75%, 65%, 55%, 45%, 35%, 25%, or 20%.

In the case where a composition having a high response speed is required while keeping the viscosity of the composition of the present invention low, it is preferable that the lower limit value be low and the upper limit value be low. Furthermore, in the case where a composition with good temperature stability is necessary while maintaining the high $T_{NI}$ of the composition of the present invention, it is preferable that the lower limit value be low and the upper limit value be low. In addition, when it is desired to increase the dielectric anisotropy in order to keep the driving voltage low, it is preferable that the above lower limit value be high and the upper limit value be high.

As the compound represented by General Formula (i), the compound in which $Z^{i1}$ and $Z^{i2}$ represent a single bond is preferably a compound represented by General Formula (II).

[Chem. 5]

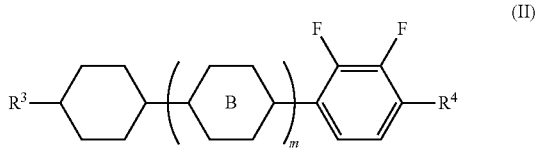

In the formula, $R^3$ and $R^4$ represent an alkyl group having 1 to 8 carbon atoms, an alkenyl group having 2 to 8 carbon atoms, an alkoxy group having 1 to 8 carbon atoms, an alkenyloxy group having 2 to 8 carbon atoms, one or more hydrogen atoms in the alkyl group, the alkenyl group, the alkoxy group or the alkenyloxy group may be substituted with a fluorine atom, and the methylene group in the alkyl group, the alkenyl group, the alkoxy group or the alkenyloxy group may be substituted with an oxygen atom as long as the oxygen atoms are not bonded consecutively, and B represents a 1,4-phenylene group, a trans-1,4-cyclohexylene group, or a tetrahydropyran-2,5-diyl group, and in the case where B represents a 1,4-phenylene group, one or more hydrogen atoms in the 1,4-phenylene group may be substituted with a fluorine atom, m represents 0, 1, or 2, but in the case where m is 2, two B's may be the same or different.

The lower limit value of the content in the liquid crystal composition of the compound represented by the compound represented by General Formula (II) is preferably 0% by mass, more preferably 0.5% by mass, preferably 1% by mass or more, more preferably 3% by mass or more, preferably 5% by mass or more, more preferably 10% by mass, more preferably 20% by mass, still more preferably 25% by mass, particularly preferably 28% by mass, and most preferably 30% by mass, and the upper limit value is preferably 85% by mass, more preferably 75% by mass, even more preferably 70% by mass, still more preferably 67% by mass, and most preferably 65% by mass.

In addition, as the compound represented by General Formula (i), a compound in which $Z^{i1}$ and $Z^{i2}$ represent a single bond is preferably a compound represented by General Formula (III). However, the compound represented by General Formula (III) is excluded from the compound represented by General Formula (II).

[Chem. 6]

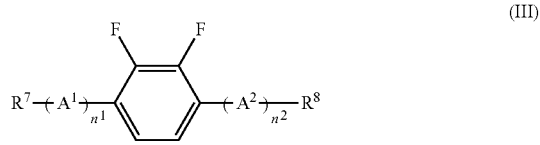

In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and one or more hydrogen atoms in the alkyl group, alkenyl group, alkoxy group, or alkenyloxy group may be substituted with a fluorine atom, a methylene group in the alkyl group, an alkenyl group, an alkoxy group, or an alkenyloxy group may be substituted with an oxygen atom as long as the oxygen atoms are not bonded consecutively, and $A^1$ and $A^2$ each independently represent a 1,4-cyclohexylene group, a 1,4-phenylene group, or a tetrahydropyran-2,5-diyl group, and in the case where $A^1$ and/or $A^2$ represents a 1,4-phenylene group, one or more hydrogen atoms of the 1,4-phenylene groups may be substituted with a fluorine atom, $n^1$ and $n^2$ each independently represent 0, 1, 2, or 3 and, in the case where $n^1+n^2$ is 1 to 3 and there is a plurality of $A^1$, $A^2$, $Z^1$, and $Z^2$, the above may be the same or different, but a compound where $n^i$ is 1 or 2, $n^2$ is 0, and $A^1$ is a 1,4-cyclohexylene group directly bonded to $R^7$ is excluded.

The lower limit value of the content of the compound represented by General Formula (III) in the liquid crystal composition is preferably 0% by mass, preferably 0.5% by mass, more preferably 1% by mass or more, more preferably 2% by mass, more preferably 3% by mass, still more preferably 4% by mass, and particularly preferably 5% by mass, and the upper limit value is preferably 45% by mass, more preferably 35% by mass, still more preferably 30% by mass, and particularly preferably 27% by mass, and most preferably 25% by mass.

As the compound represented by General Formula (i), a compound in which $Z^{i1}$ and $Z^{i2}$ represent a single bond is specifically preferably a compound selected from a compound group represented by General Formulas (i-1) to (i-7).

The compound represented by General Formula (i-1) is the following compound.

[Chem. 7]

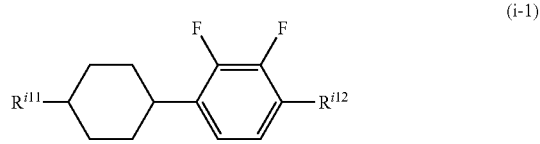

In the formula, $R^{i11}$ and $R^{i12}$ each independently represent the same meanings as $R^{i1}$ and $R^{i2}$ in General Formula (i).

$R^{i11}$ is preferably an alkyl group having 1 to 5 carbon atoms or an alkenyl group having 2 to 5 carbon atoms, and a propyl group or a pentyl group is preferable. $R^{i12}$ is preferably an alkyl group having 1 to 5 carbon atoms, an alkenyl group having 4 to 5 carbon atoms or an alkoxy group having 1 to 4 carbon atoms, and an ethoxy group or a butoxy group is preferable.

It is also possible to use the compound represented by General Formula (i-1) alone and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be reduced is effective. Furthermore, in the case of improving the drip mark or burn-in characteristics, it is preferable to set the content range to a medium level.

The lower limit value of the preferable content of the compound represented by formula (i-1) with respect to the total amount of the composition of the present invention is 5%, 10%, 13%, 15%, 17%, 20%, 23%, 25%, 27%, 30%, 33%, or 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, or 3%.

Furthermore, it is preferable that the compound represented by General Formula (i-1) be a compound selected from the group of compounds represented by formula (i-1.1) to formula (i-1.14), more preferably a compound represented by formula (i-1.1) to (i-1.4), and even more preferably a compound represented by formula (i-1.1) and formula (i-1.3)

[Chem. 8]

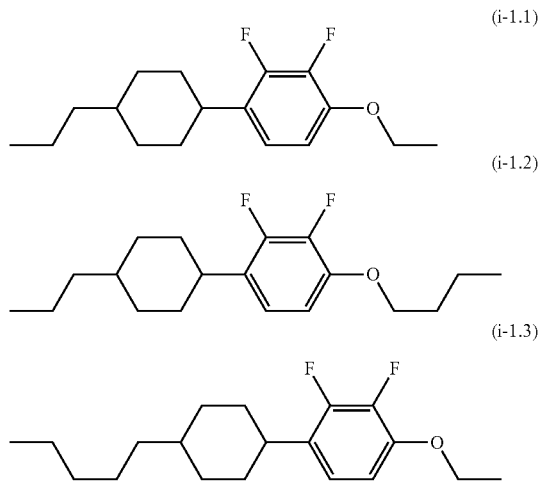

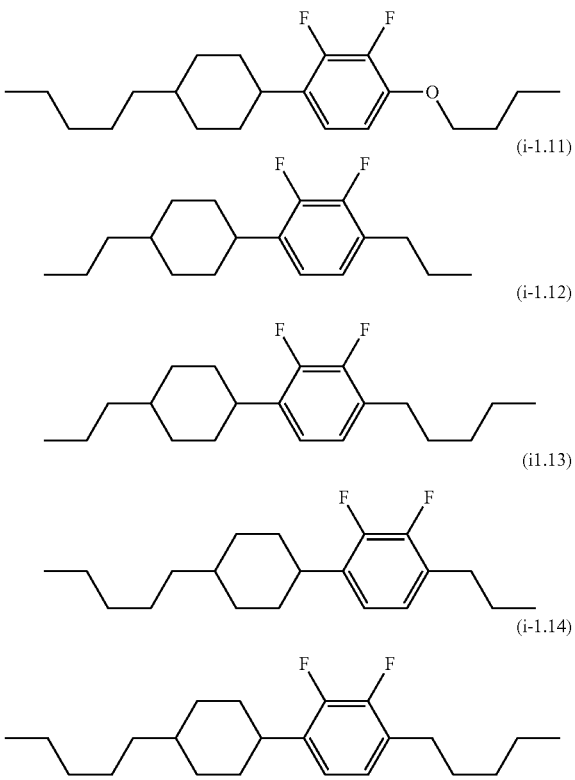

It is possible to use the compounds represented by formulas (i-1.1) to (i-1.4) alone or in combination; however, the lower limit value of the preferable content of these compounds alone or in combination with respect to the total content of the composition of the present invention is 5%, 10%, 13%, 15%, 17%, 20%, 23%, 25%, 27%, 30%, 33%, or 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, or 3%.

The compound represented by General Formula (i-2) is the following compound.

[Chem. 9]

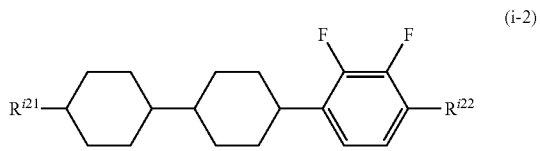

In the formula, $R^{i21}$ and $R^{i22}$ each independently represent the same meanings as $R^{i1}$ and $R^{i2}$ in General Formula (i).

$R^{i21}$ is preferably an alkyl group having 1 to 5 carbon atoms or an alkenyl group having 2 to 5 carbon atoms, and is preferably an ethyl group, a propyl group, a butyl group, or a pentyl group. $R^{i22}$ is preferably an alkyl group having 1 to 5 carbon atoms, an alkenyl group having 4 to 5 carbon atoms or an alkoxy group having 1 to 4 carbon atoms, and is preferably a methyl group, a propyl group, a methoxy group, an ethoxy group, or a propoxy group. In order to improve the transmittance of the liquid crystal display element, it is preferable that at least one or more groups of $R^{i21}$ or $R^{i22}$ be an alkyl group or an alkoxy group.

It is also possible for the compound represented by General Formula (i-2) to be used alone and it is also possible to use a combination of two or more compounds. There are no particular restrictions on the type of compounds which are able to be combined, but it is used in combination as appropriate according to the required performance such as solubility at low temperature, transition temperature, electrical reliability, birefringence and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on solubility at low temperature, setting the content to be reduced is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-2) with respect to the total amount of the composition of the present invention is 5%, 7%, 10%, 13%, 15%, 17%, 20%, 23%, 25%, 27%, 30%, 33%, 35%, 37%, 40%, or 42%. The upper limit value of the preferable content with respect to the total amount of the composition of the present invention is 50%, 48%, 45%, 43%, 40%, 38%, 35%, 33%, 30%, 28%, 25%, 23%, 20%, 18%, 15%, 13%, 10%, 8%, 7%, 6%, and 5%.

Furthermore, it is preferable that the compound represented by General Formula (i-2) be a compound selected from the group of compounds represented by formula (i-2.1) to formula (i-2.13), more preferably a compound represented by formula (i-2.3) to formula (i-2.7), formula (i-2.10), formula (i-2.11) and formula (i-2.13), even more preferably a compound represented by formula (i-2.3) to formula (i-2.7) in the case where emphasis is placed on improving Δqε, and yet more preferably a compound represented by formula (i-2.10), formula (i-2.11) and formula (i-2.13) in the case where emphasis is placed on improvement of $T_{NI}$.

[Chem. 10]

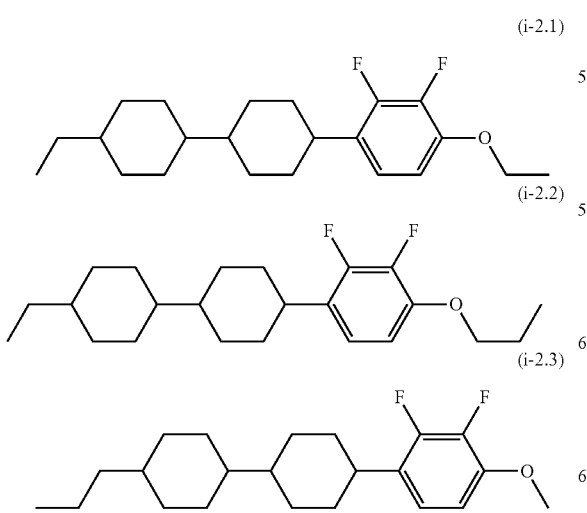
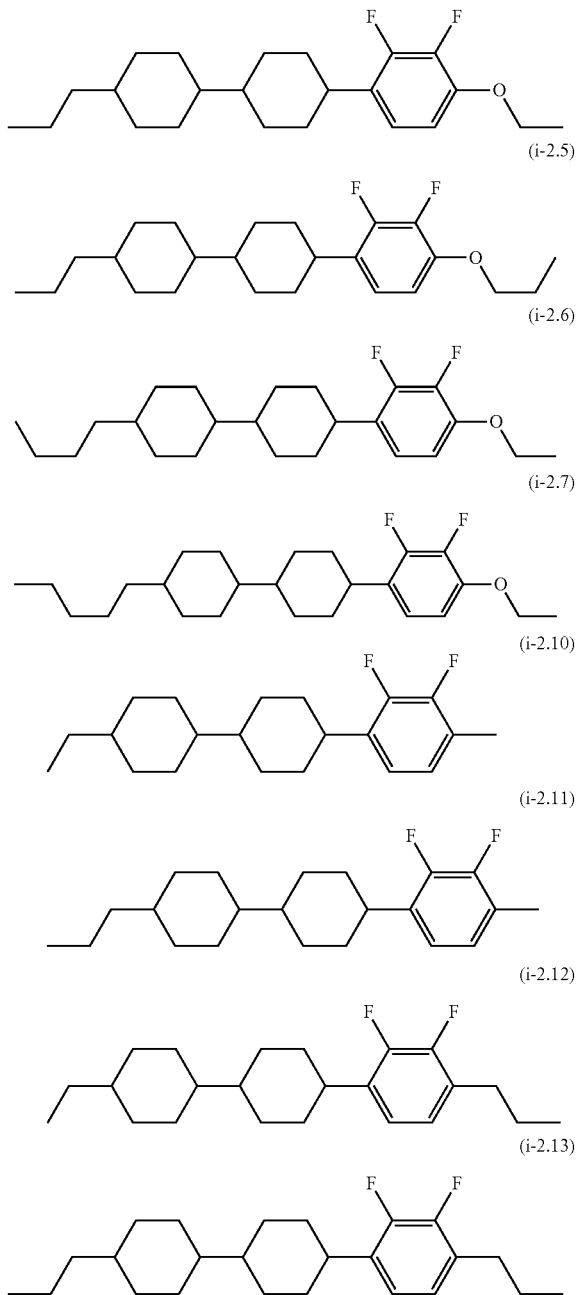

It is possible to use the compounds represented by formulas (i-2.1) to (i-2.13) alone or in combination and the lower limit value of the preferable content of these compounds used alone or used in combination with respect to the total amount of the composition of the present invention is 5%, 10%, 13%, 15%, 17%, 20%, 23%, 25%, 27%, 30%, 33%, or 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, and 3%.

The compound represented by General Formula (i-3) is the following compound.

[Chem. 11]

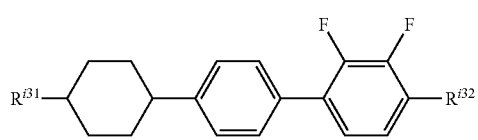
(i-3)

In the formula, $R^{i31}$ and $R^{i32}$ each independently represent the same meanings as $R^{i1}$ and $R^{i2}$ in General Formula (i).

$R^{i31}$ preferably represents an alkyl group having 1 to 5 carbon atoms or an alkenyl group having 2 to 5 carbon atoms, more preferably an ethyl group, a propyl group, or a butyl group. $R^{i32}$ is preferably an alkyl group having 1 to 5 carbon atoms, an alkenyl group having 4 to 5 carbon atoms or an alkoxy group having 1 to 4 carbon atoms, more preferably an ethoxy group, a propoxy group, or a butoxy group. In order to improve the transmittance of the liquid crystal display element, it is preferable that at least one group of $R^{i31}$ or $R^{i32}$ is an alkyl group or an alkoxy group.

It is also possible for the compound represented by General Formula (i-3) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-3) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

Furthermore, it is preferable that the compound represented by General Formula (i-3) be a compound selected from the group of compounds represented by formula (i-3.1) to formula (i-3.11), more preferably a compound represented by formulas (i-3.1) to (i-3.7), and more preferably a compound represented by formula (i-3.1), formula (i-3.2), formula (i-3.3), formula (i-3.4) and formula (i-3.6).

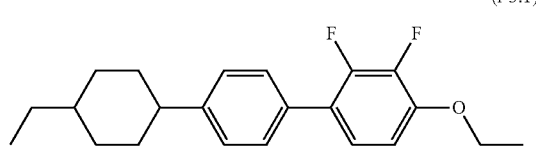
(i-3.1)

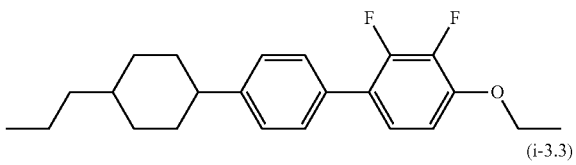
(i-3.2)
(i-3.3)

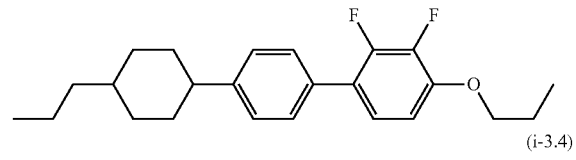
(i-3.4)

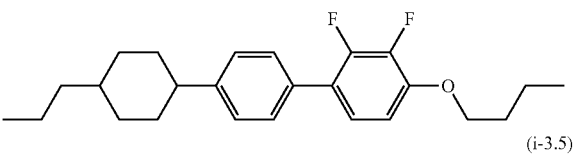
(i-3.5)

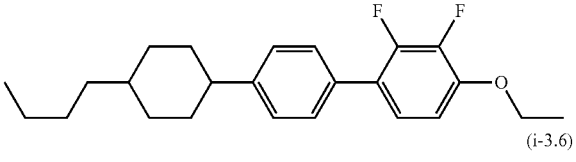
(i-3.6)

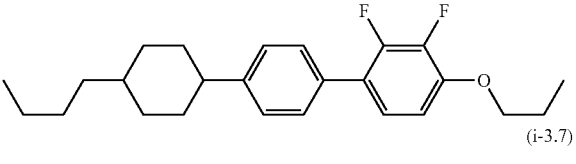
(i-3.7)

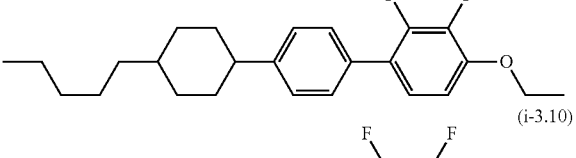
(i-3.10)

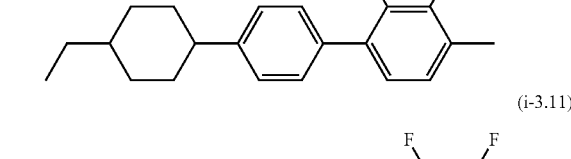
(i-3.11)

It is possible for the compounds represented by formula (i-3.1) to formula (i-3.4) and formula (i-3.6) to be used alone or in combination, and a combination of formula (i-3.1) and formula (i-3.2) or a combination of two types or three types selected from formula (i-3.3), formula (i-3.4), and formula (i-3.6) is preferable. The lower limit value of the preferable content of these compounds alone or in combination with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-4) is the following compound.

[Chem. 13]

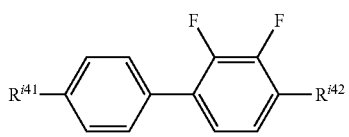
(i-4)

In the formula, $R^{i41}$ and $R^{i42}$ each independently represent the same meanings as $R^{i1}$ and $R^{i2}$ in General Formula (i).

$R^{i41}$ and $R^{i42}$ are each independently preferably an alkyl group having 1 to 5 carbon atoms, an alkenyl group having 4 to 5 carbon atoms or an alkoxy group having 1 to 4 carbon atoms, and a methyl group, a propyl group, an ethoxy group, or a butoxy group is preferable.

It is also possible for the compound represented by General Formula (i-4) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be reduced is effective. Furthermore, in the case of improving the drip mark or burn-in characteristics, it is preferable to set the content range to a medium level.

The lower limit value of the preferable content of the compound represented by formula (i-4) with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, and 8%.

Furthermore, it is preferable that the compound represented by General Formula (i-4) be a compound selected from the group of compounds represented by formula (i-4.1) to formula (i-4.14), more preferably a compound represented by formula (i-4.1) to (i-4.4), and more preferably a compound represented by formula (i-4.1) and formula (i-4.2).

[Chem. 14]

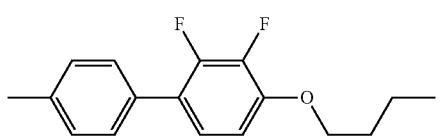
(i-4.1)

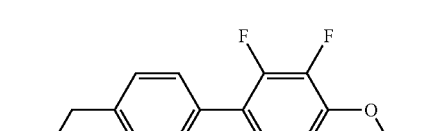
(i-4.2)

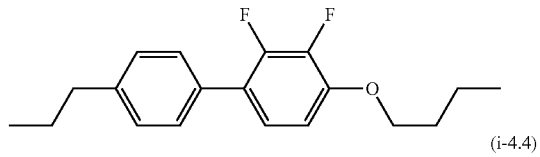
(i-4.3)

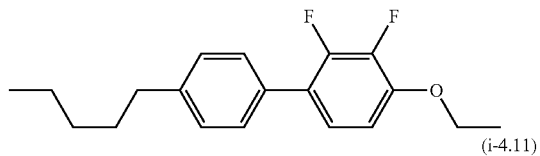
(i-4.4)

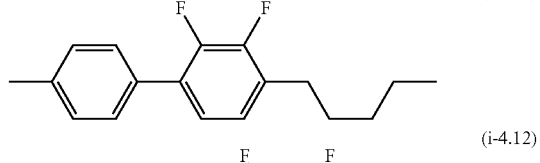
(i-4.11)

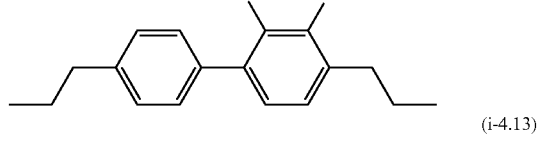
(i-4.12)

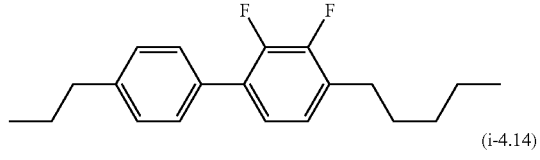
(i-4.13)

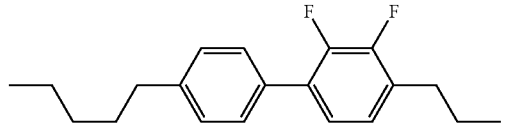
(i-4.14)

It is possible to use the compounds represented by formulas (i-4.1) to (i-4.4) alone or in combination and the lower limit value of the preferable content of these compounds alone or in combination with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, and 8%.

The compound represented by General Formula (i-5) is the following compound.

[Chem. 15]

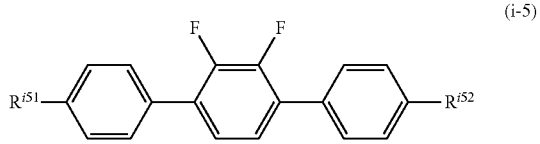
(i-5)

In the formula, $R^{i51}$ and $R^{i52}$ each independently represent the same meanings as $R^{i1}$ and $R^{i2}$ in General Formula (i).

$R^{i51}$ and $R^{i52}$ are each independently preferably an alkyl group having 1 to 5 carbon atoms, an alkenyl group having 4 to 5 carbon atoms or an alkoxy group having 1 to 4 carbon atoms, and an ethyl group, a propyl group, or a butyl group is preferable. In order to improve the transmittance of the liquid crystal display element, it is preferable that at least one group of $R^{i51}$ or $R^{i52}$ is an alkyl group or an alkoxy group.

It is also possible for the compound represented by General Formula (N-1-5) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on solubility at low temperature, setting the content to be reduced is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-5) with respect to the total amount of the composition of the present invention is 5%, 8%, 10%, 13%, 15%, 17%, or 20%. The upper limit value of the preferable content with respect to the total amount of the composition of the present invention is 35%, 33%, 30%, 28%, 25%, 23%, 20%, 18%, 15%, or 13%.

Furthermore, it is preferable that the compound represented by General Formula (i-5) be a compound selected from the group of compounds represented by formula (i-5.1) to formula (i-5.6), and compounds represented by formulas (i-5.2) and formula (i-5.4) are more preferable.

[Chem. 16]

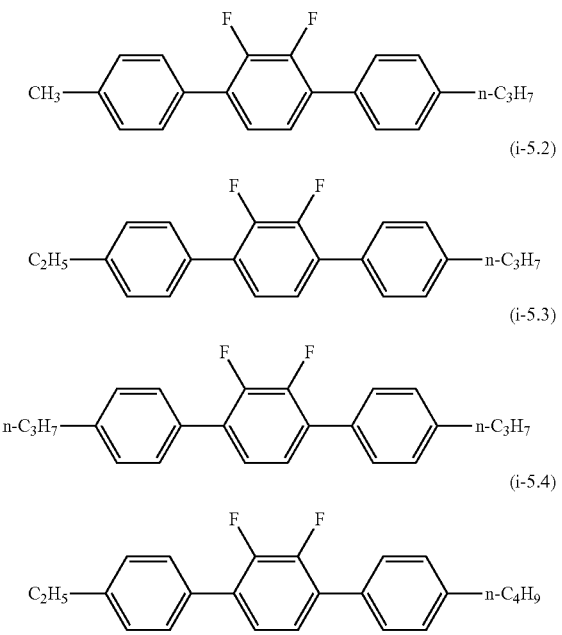

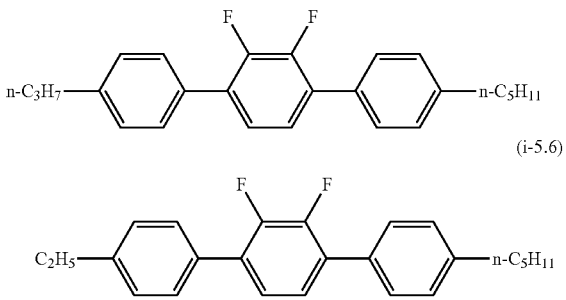

It is possible to use the compounds represented by the formulas (i-5.1) to (i-5.6) alone or in combination; however, the lower limit value of the preferable content of these compounds alone or in combination with respect to the total content of the composition of the present invention is 5%, 8%, 10%, 13%, 15%, 17%, or 20%. The upper limit value of the preferable content with respect to the total amount of the composition of the present invention is 35%, 33%, 30%, 28%, 25%, 23%, 20%, 18%, 15%, or 13%.

The compound represented by General Formula (i-6) is the following compound.

[Chem. 17]

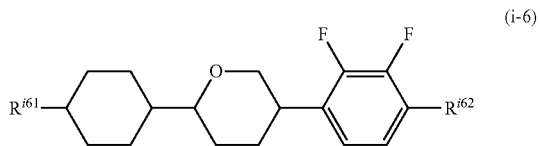

In the formula, $R^{i61}$ and $R^{i62}$ each independently represent the same meanings as $R^{i1}$ and $R^{i2}$ in General Formula (i).

In the formula, $R^{i71}$ preferably represents an alkyl group having 1 to 5 carbon atoms or an alkenyl group having 2 to 5 carbon atoms, and more preferably an ethyl group, a propyl group, or a butyl group. $R^{i72}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group. In order to improve the transmittance of the liquid crystal display element, it is preferable that at least one group of $R^{i61}$ or $R^{i62}$ be an alkyl group or an alkoxy group.

It is also possible for the compound represented by General Formula (i-6) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be reduced is effective. Furthermore, in the case of improving the drip mark or burn-in characteristics, it is preferable to set the content range to a medium level.

The lower limit value of the preferable content of the compound represented by formula (i-6) with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, or 8%.

Furthermore, it is preferable that the compound represented by General Formula (i-6) be a compound selected from the group of compounds represented by formula (i-6.1) to formula (i-6.4), and a compound represented by formula (i-6.2) is more preferable.

[Chem. 18]

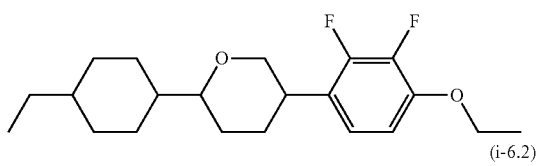
(i-6.1)

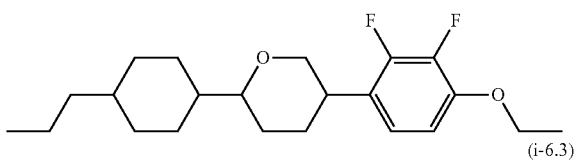
(i-6.2)

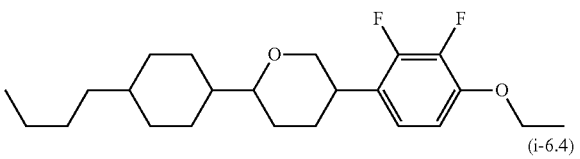
(i-6.3)

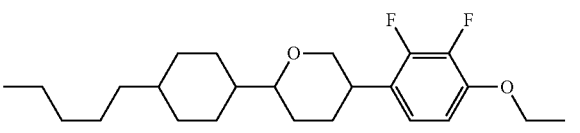
(i-6.4)

It is possible to use the compounds represented by the formulas (i-6.1) to (i-6.4) alone or in combination; however, the lower limit value of the preferable content of these compounds alone or in combination with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, or 8%.

The compound represented by General Formula (i-7) is the following compound.

[Chem. 19]

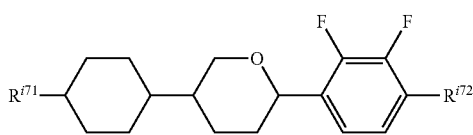
(i-7)

In the formula, $R^{i71}$ and $R^{i72}$ each independently represent the same meanings as $R^{i1}$ and $R^{i2}$ in General Formula (i).

In the formula, $R^{i71}$ preferably represents an alkyl group having 1 to 5 carbon atoms or an alkenyl group having 2 to 5 carbon atoms, and more preferably an ethyl group, a propyl group, or a butyl group. $R^{i72}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group. In order to improve the transmittance of the liquid crystal display element, it is preferable that at least one group of $R^{i71}$ or $R^{i72}$ be an alkyl group or an alkoxy group.

It is also possible for the compound represented by General Formula (i-7) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be reduced is effective. Furthermore, in the case of improving the drip mark or burn-in characteristics, it is preferable to set the content range to a medium level.

The lower limit value of the preferable content of the compound represented by formula (i-7) with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, or 8%.

Furthermore, it is preferable that the compound represented by General Formula (i-7) is a compound selected from the group of compounds represented by formula (i-7.1) to formula (i-6.4), and a compound represented by formula (i-7.2) is more preferable.

[Chem. 20]

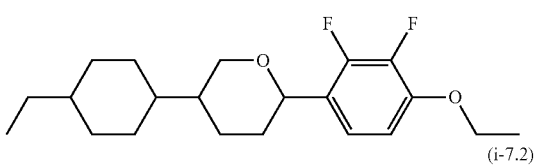
(i-7.1)

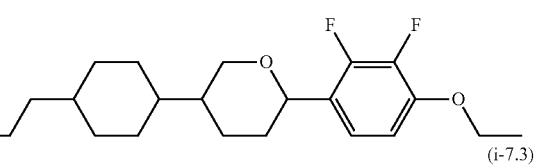
(i-7.2)

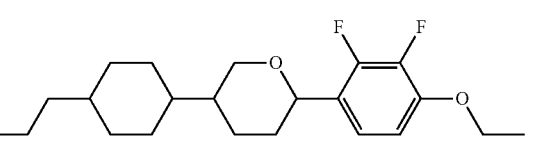
(i-7.3)

-continued (i-7.4)

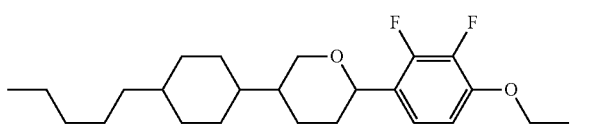

It is possible to use the compounds represented by the formulas (i-7.1) to (i-7.4) alone or in combination; however, the lower limit value of the preferable content of these compounds alone or in combination with respect to the total amount of the composition of the present invention is 3%, 5%, 7%, 10%, 13%, 15%, 17%, or 20%. The upper limit value of the preferable content with respect to the total amount of the composition of the present invention is 35%, 30%, 28%, 25%, 23%, 20%, 18%, 15%, 13%, 11%, 10%, or 8%.

The compound represented by General Formula (i) is preferably a compound selected from the group of compounds represented by General Formula (i-8).

[Chem. 21]

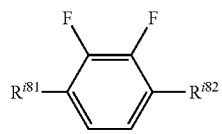

(i-8)

In the formula, $R^{i81}$ and $R^{i82}$ each independently represent the same meanings as $R^{i1}$ and $R^{i2}$ in General Formula (i).

$R^{i81}$ and $R^{i82}$ each independently preferably represent an alkyl group having 1 to 10 carbon atoms, an alkenyl group having 2 to 10 carbon atoms, or an alkoxy group having 1 to 10 carbon atoms.

It is also possible for the compound represented by General Formula (i-8) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on solubility at low temperature, setting the content to be reduced is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-6) with respect to the total amount of the composition of the present invention is 5%, 8%, 10%, 13%, 15%, 17%, or 20%. The upper limit value of the preferable content with respect to the total amount of the composition of the present invention is 35%, 33%, 30%, 28%, 25%, 23%, 20%, 18%, 15%, or 13%.

Furthermore, it is preferable that the compound represented by General Formula (i-8) be a compound selected from the group of compounds represented by formula (i-8.1) to formula (i-8.14).

[Chem. 22]

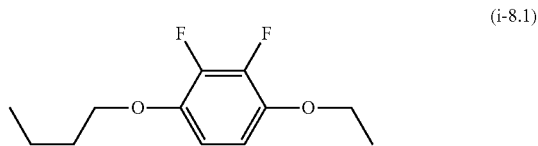

(i-8.1)

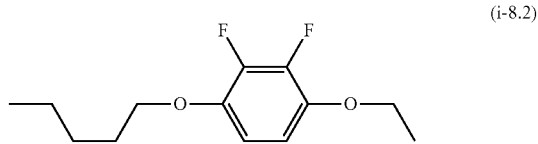

(i-8.2)

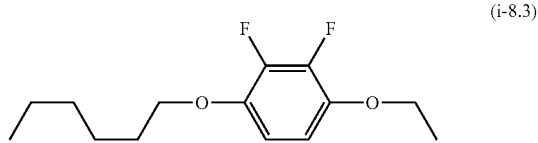

(i-8.3)

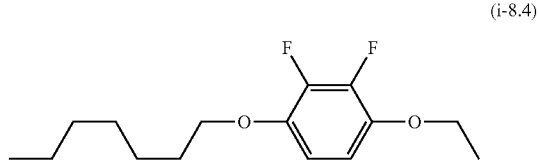

(i-8.4)

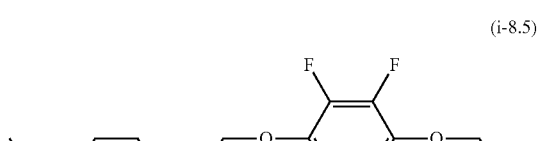

(i-8.5)

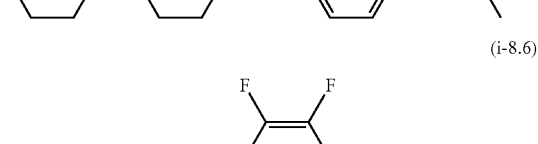

(i-8.6)

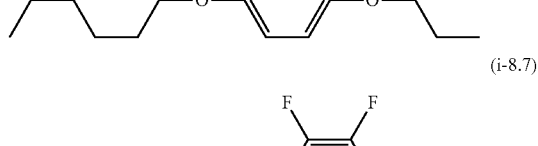

(i-8.7)

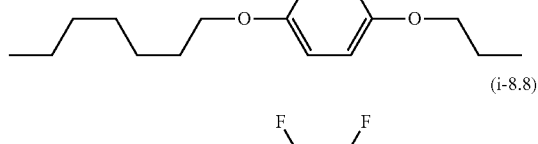

(i-8.8)

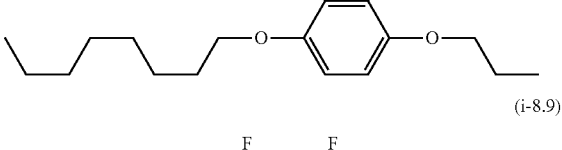

(i-8.9)

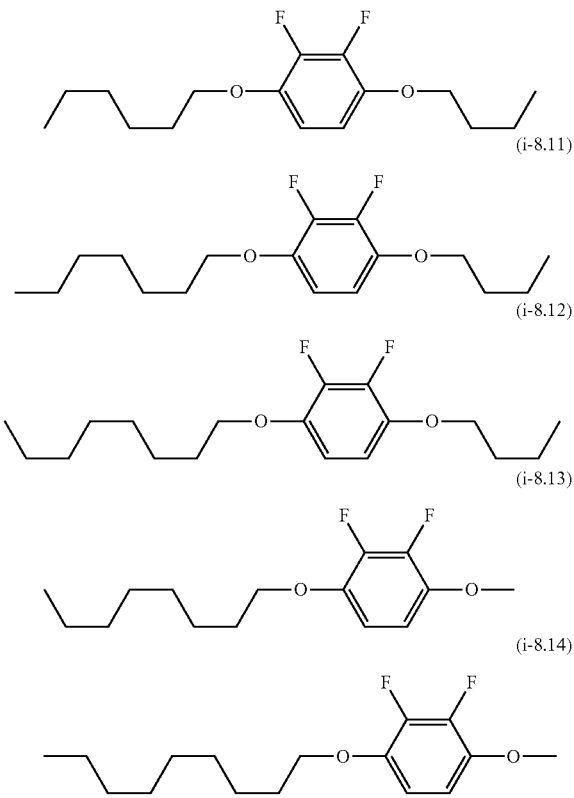

In addition, the compound represented by General Formula (i) is preferably a compound represented by General Formula (i-a).

[Chem. 23]

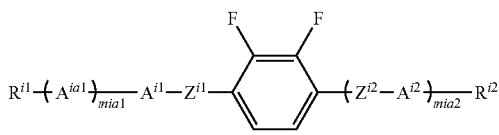

In the formula, $A^{ia1}$ is independently (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=), and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $m^{ia1}$ and $m^{ia2}$ each independently represent 0 or 1, and $R^{i1}$, $R^{i2}$, $A^{i1}$, $A^{i2}$, $Z^{i1}$, and $Z^{i2}$ each independently represent the same meanings as $R^{i1}$, $R^{i2}$, $A^{i1}$, $A^{i2}$ $Z^{i1}$, and $Z^{i2}$ in General Formula (i).

The compound represented by General Formula (i-a) is preferably a compound selected from the group of compounds represented by General Formulas (i-10) to (i-21).

The compound represented by General Formula (i-10) is the following compound.

[Chem. 24]

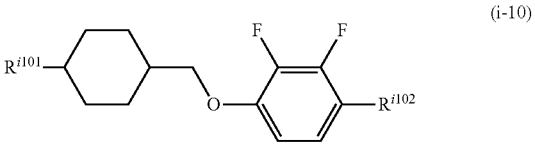

In the formula, $R^{i101}$ and $R^{i102}$ each independently represent the same meanings as $R^{i1}$ and $R^{i2}$ in General Formula (i).

$R^{i101}$ is preferably an alkyl group having 1 to 5 carbon atoms or an alkenyl group having 2 to 5 carbon atoms, and more preferably an ethyl group, a propyl group, or a butyl group. $R^{i102}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group.

It is also possible for the compound represented by General Formula (i-10) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-10) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

Furthermore, it is preferable that the compound represented by General Formula (i-10) be a compound selected from the group of compounds represented by formula (i-10.1) to formula (i-10.11), more preferably a compound represented by formulas (i-10.1) to (i-10.5), and even more preferably a compound represented by formula (i-10.1) and formula (i-10.2).

[Chem. 25]

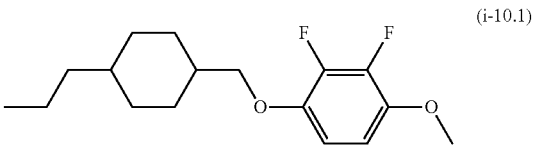

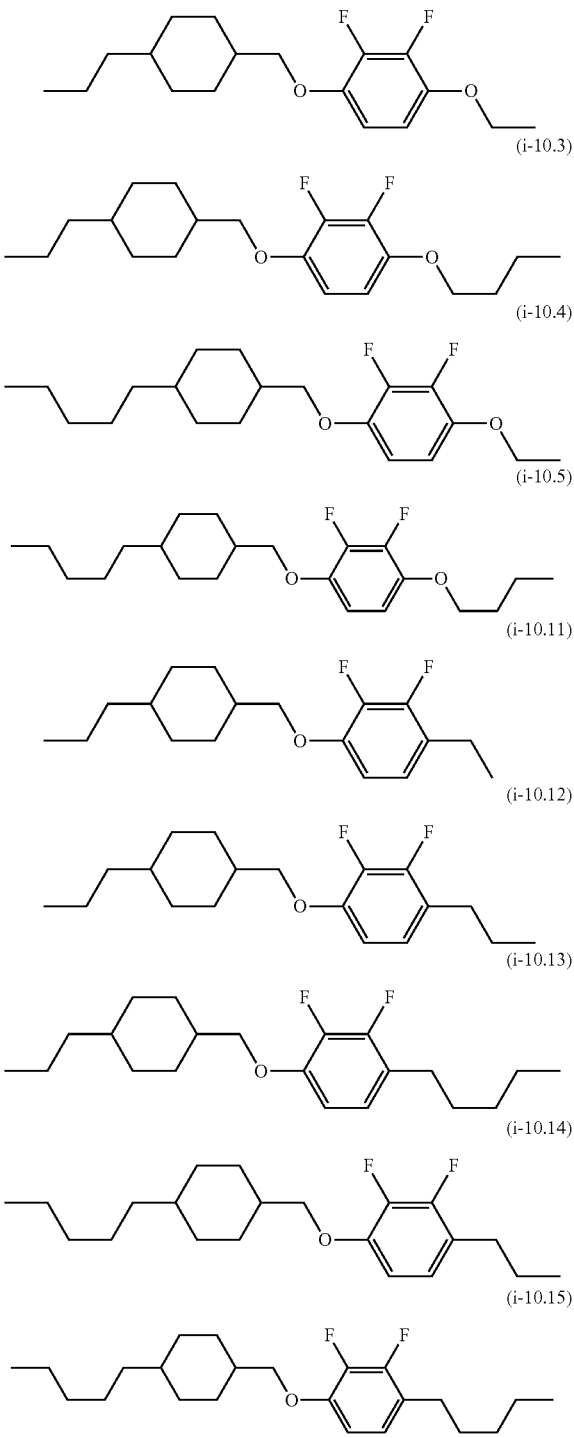

It is possible to use the compounds represented by formula (i-10.1) to formula (i-10.11) alone or in combination; however, the lower limit value of the preferable content of these compounds alone or in combination with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-11) is the following compound.

[Chem. 26]

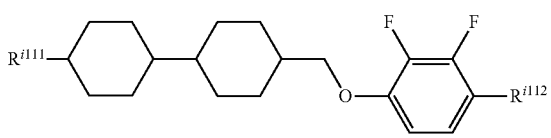

In the formula, $R^{i11}$ and $R^{i112}$ each independently represent the same meanings as $R^{i1}$ and $R^{i2}$ in General Formula (i).

In the formula, $R^{i111}$ and $R^{i112}$ each independently represent the same meanings as $R^{i1}$ and $R^{i2}$ in General Formula (i).

$R^{i111}$ is preferably an alkyl group having 1 to 5 carbon atoms or an alkenyl group having 2 to 5 carbon atoms, and an ethyl group, a propyl group, or a butyl group is preferable. $R^{i112}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group. In order to improve the transmittance of the liquid crystal display element, it is preferable that at least one group of $R^{i111}$ or $R^{i112}$ be an alkyl group or an alkoxy group.

It is also possible for the compound represented by General Formula (i-11) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-11) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

Furthermore, it is preferable that the compound represented by General Formula (i-11) be a compound selected from the group of compounds represented by formula (i-11.1) to formula (i-11.15), more preferably a compound represented by formula (i-11.1) to (i-11.15), and even more preferably a compound represented by formula (i-11.2) and formula (i-11.4).

[Chem. 27]

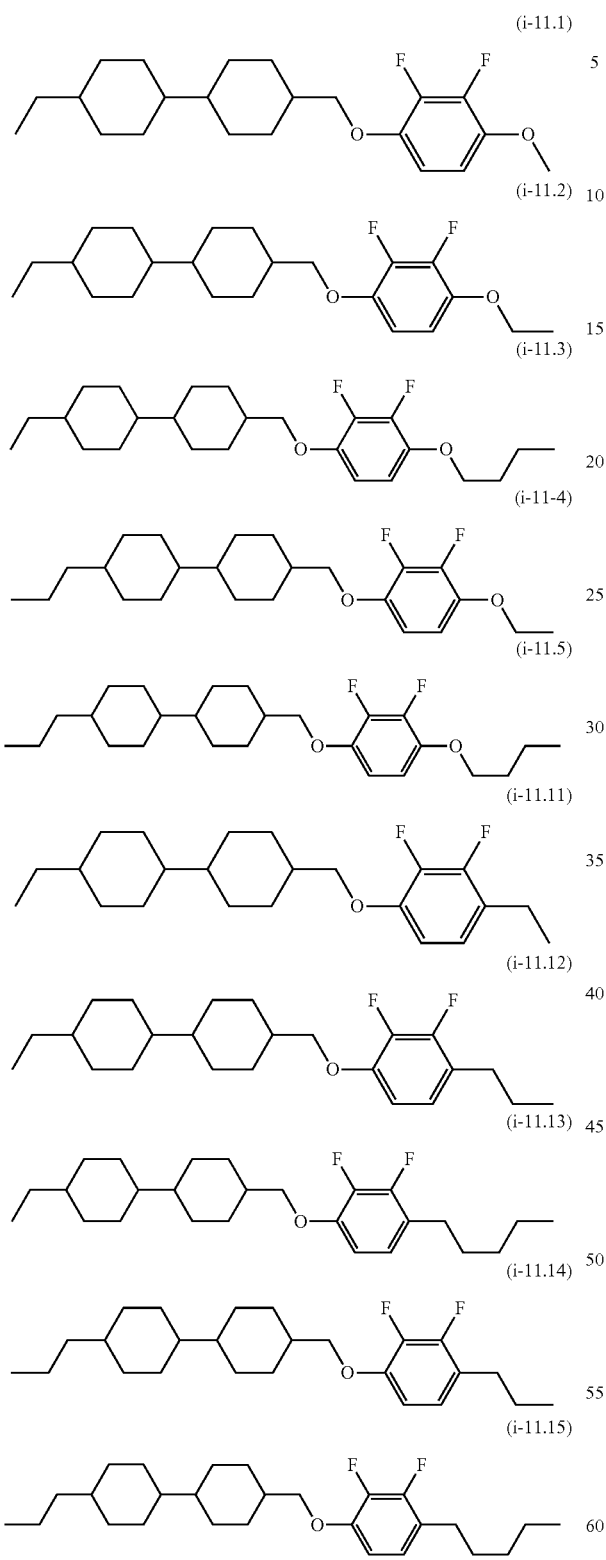

It is possible to use the compounds represented by the formulas (i-11.2) to (i-11.15) alone or in combination; however, the lower limit value of the preferable content of these compounds alone or in combination with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-12) is the following compound.

[Chem. 28]

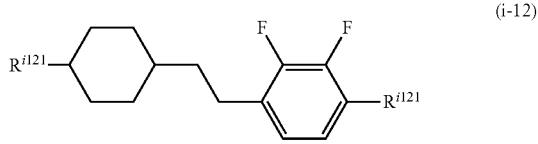

In the formula, $R^{i121}$ and $R^{i122}$ each independently represent the same meanings as $R^{i1}$ and $R^{i2}$ in General Formula (i).

$R^{i121}$ is preferably an alkyl group having 1 to 5 carbon atoms or an alkenyl group having 2 to 5 carbon atoms, and more preferably an ethyl group, a propyl group, or a butyl group. $R^{i122}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group.

It is also possible for the compound represented by General Formula (i-12) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-12) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-13) is the following compound.

[Chem. 29]

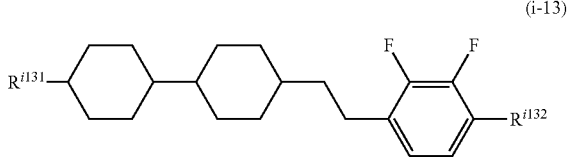

In the formula, $R^{i131}$ and $R^{i132}$ each independently represent the same meanings as $R^{i1}$ and $R^{i2}$ in General Formula (i).

$R^{i131}$ is preferably an alkyl group having 1 to 5 carbon atoms or an alkenyl group having 2 to 5 carbon atoms, and more preferably an ethyl group, a propyl group, or a butyl group. $R^{i132}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group. In order to improve the transmittance of the liquid crystal display element, it is preferable that at least one group of $R^{i131}$ or $R^{i132}$ be an alkyl group or an alkoxy group.

It is also possible for the compound represented by General Formula (i-13) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-13) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-14) is the following compound.

[Chem. 30]

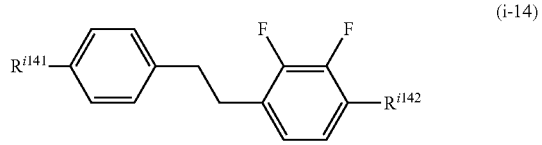

(i-14)

In the formula, $R^{i141}$ and $R^{i142}$ each independently represent the same meanings as $R^{i1}$ and $R^{i2}$ in General Formula (i).

$R^{i141}$ is preferably an alkyl group having 1 to 5 carbon atoms or an alkenyl group having 2 to 5 carbon atoms, and more preferably an ethyl group, a propyl group, or a butyl group. $R^{i142}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group.

It is also possible for the compound represented by General Formula (i-14) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-14) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-15) is the following compound.

[Chem. 31]

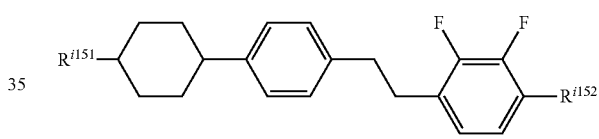

(i-15)

In the formula, $R^{i151}$ and $R^{i152}$ each independently represent the same meanings as $R^{i1}$ and $R^{i2}$ in General Formula (i).

$R^{i151}$ is preferably an alkyl group having 1 to 5 carbon atoms or an alkenyl group having 2 to 5 carbon atoms, more preferably an ethyl group, a propyl group, or a butyl group. $R^{i152}$ is preferably an alkyl group having 1 to 5 carbon atoms, an alkenyl group having 4 to 5 carbon atoms or an alkoxy group having 1 to 4 carbon atoms, and preferably an ethoxy group, a propoxy group, or a butoxy group. In order to improve the transmittance of the liquid crystal display element, it is preferable that at least one group of $R^{i151}$ or $R^{i152}$ be an alkyl group or an alkoxy group.

It is also possible for the compound represented by General Formula (i-15) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-15) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-16) is the following compound.

[Chem. 32]

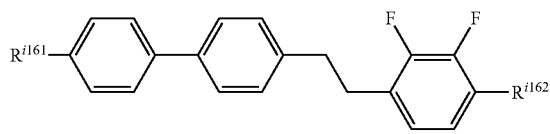

(i-16)

In the formula, $R^{i161}$ and $R^{i162}$ each independently represent the same meanings as $R^{i1}$ and $R^{i2}$ in General Formula (i).

$R^{i161}$ is preferably an alkyl group having 1 to 5 carbon atoms or an alkenyl group having 2 to 5 carbon atoms, and more preferably an ethyl group, a propyl group, or a butyl group. $R^{i162}$ is preferably an alkyl group having 1 to 5 carbon atoms, an alkenyl group having 4 to 5 carbon atoms or an alkoxy group having 1 to 4 carbon atoms, preferably an ethoxy group, a propoxy group, or a butoxy group. In order to improve the transmittance of the liquid crystal display element, it is preferable that at least one group of $R^{i161}$ or $R^{i162}$ be an alkyl group or an alkoxy group.

It is also possible for the compound represented by General Formula (i-16) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-16) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-17) is the following compound.

[Chem. 33]

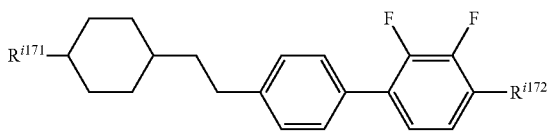

(i-17)

In the formula, $R^{i171}$ and $R^{i172}$ each independently represent the same meanings as $R^{i1}$ and $R^{i2}$ in General Formula (i).

$R^{i171}$ is preferably an alkyl group having 1 to 5 carbon atoms or an alkenyl group having 2 to 5 carbon atoms, and more preferably an ethyl group, a propyl group, or a butyl group. $R^{i172}$ is preferably an alkyl group having 1 to 5 carbon atoms, an alkenyl group having 4 to 5 carbon atoms or an alkoxy group having 1 to 4 carbon atoms, and more preferably an ethoxy group, a propoxy group, or a butoxy group. In order to improve the transmittance of the liquid crystal display element, it is preferable that at least one group or more of $R^{i171}$ or $R^{i172}$ be an alkyl group or an alkoxy group.

It is also possible for the compound represented by General Formula (i-17) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving $\Delta\varepsilon$, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-17) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-18) is the following compound.

[Chem. 34]

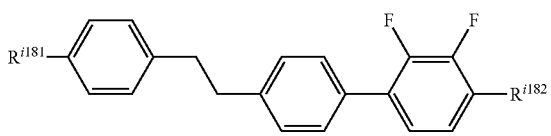

(i-18)

In the formula, $R^{i181}$ and $R^{i182}$ each independently represent the same meanings as $R^{i1}$ and $R^{i2}$ in General Formula (i).

$R^{i181}$ is preferably an alkyl group having 1 to 5 carbon atoms or an alkenyl group having 2 to 5 carbon atoms, and more preferably an ethyl group, a propyl group, or a butyl group. $R^{i182}$ is preferably an alkyl group having 1 to 5 carbon atoms, an alkenyl group having 4 to 5 carbon atoms or an alkoxy group having 1 to 4 carbon atoms, and more preferably an ethoxy group, a propoxy group, or a butoxy group. In order to improve the transmittance of the liquid crystal display element, it is preferable that at least one group of $R^{i181}$ or $R^{i82}$ be an alkyl group or an alkoxy group.

It is also possible for the compound represented by General Formula (i-18) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-18) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (i-20) is the following compound.

[Chem. 35]

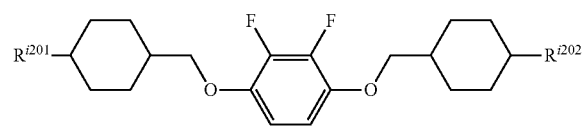

(i20)

In the formula, $R^{i201}$ and $R^{i202}$ each independently represent the same meanings as $R^{i1}$ and $R^{i2}$ in General Formula (i).

$R^{i201}$ and $R^{i202}$ are preferably an alkyl group having 1 to 5 carbon atoms or an alkenyl group having 2 to 5 carbon atoms, and an ethyl group, a propyl group, a butyl group, and an alkenyl group having 2 to 3 carbon atoms are preferable. In order to improve the transmittance of the liquid crystal display element, it is preferable that at least one group of $R^{i201}$ or $R^{i202}$ be an alkyl group or an alkoxy group.

It is also possible for the compound represented by General Formula (i-20) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-20) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (N-1-21) is the following compound.

[Chem. 36]

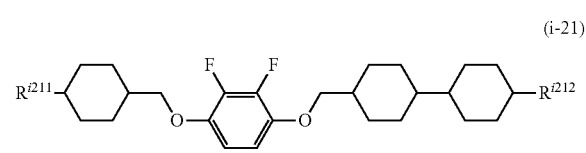

(i-21)

In the formula, $R^{i211}$ and $R^{i212}$ each independently represent the same meanings as $R^{i1}$ and $R^{i2}$ in General Formula (i).

$R^{i211}$ and $R^{i212}$ are preferably an alkyl group having 1 to 5 carbon atoms or an alkenyl group having 2 to 5 carbon atoms, and more preferably an ethyl group, a propyl group, a butyl group, and an alkenyl group having 2 to 3 carbon atoms. In order to improve the transmittance of the liquid crystal display element, it is preferable that at least one group of $R^{i211}$ or $R^{i212}$ be an alkyl group or an alkoxy group.

It is also possible for the compound represented by General Formula (i-21) to be used alone, and it is also possible to use a combination of two or more compounds. There are no particular restrictions on the types of compound which are able to be combined, but the compounds are used in combination as appropriate according to the required performances such as solubility at low temperature, transition temperature, electrical reliability, birefringence, and the like. As the types of the compound to be used, for example, one embodiment of the present invention may have one type, two types, three types, four types, or five or more types.

In the case where emphasis is placed on improving Δε, it is preferable to set the content to be higher, in the case where emphasis is placed on the solubility at low temperature, setting the content to be increased is effective, and, in the case where emphasis is placed on $T_{NI}$, setting the content to be increased is effective. Furthermore, in the case of improving the drip mark or burn-in characteristics, it is preferable to set the content range to a medium level.

The lower limit value of the preferable content of the compound represented by formula (i-21) with respect to the total amount of the composition of the present invention is 5%, 10%, 13%, 15%, 17%, or 20%. The upper limit value of the preferable content with respect to the total amount of the composition of the present invention is 35%, 30%, 28%, 25%, 23%, 20%, 18%, 15%, or 13%.

The compound represented by General Formula (ii) is preferably a compound represented by General Formula (ii-1A), General Formula (ii-1B), or General Formula (ii-1C).

[Chem. 37]

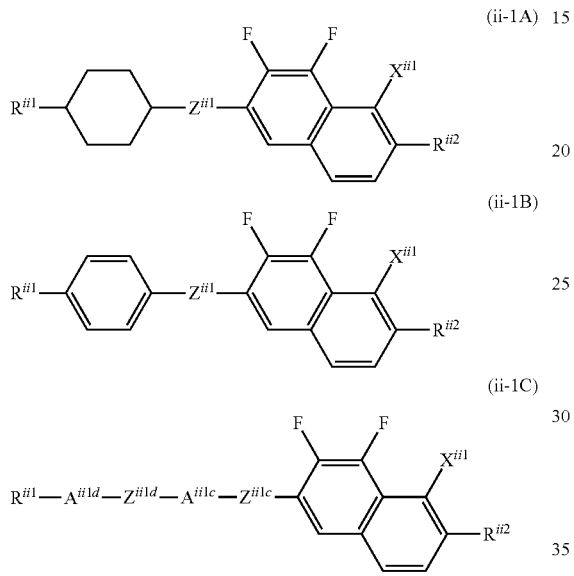

In the formulas, $R^{ii1}$, $R^{ii2}$, $Z^{ii1}$ and $X^{ii1}$ independently represent the same meanings as $R^{ii1}$, $R^{ii2}$, $Z^{ii1}$ and $X^{ii1}$ in General Formula (ii), $A^{ii1c}$ and $A^{ii1d}$ each independently represent a 1,4-cyclohexylene group or a 1,4-phenylene group, but one —CH$_2$— or two or more non-adjacent —CH$_2$— present in the 1,4-cyclohexylene group may be substituted with —O— or —S—, one hydrogen atom present in the 1,4-phenylene group may be independently substituted with a fluorine atom or a chlorine atom, $Z^{ii1c}$ and $Z^{ii1d}$ each independently represent a single bond, —OCH$_2$—, —CH=O—, —OCF$_2$—, —CF$_2$O—, —CH=CH$_2$—, or —CF$_2$CF$_2$—.

In the compound represented by General Formula (ii-1A) or General Formula (ii-1B), it is preferable that $Z^{ii1}$ represent a single bond, —OCH$_2$—, —CH$_2$O— or —CH$_2$CH$_2$.

The compound represented by General Formula (ii-1C) is preferably a compound represented by the following General Formula (ii-1C-1) to General Formula (i-1C-6).

[Chem. 38]

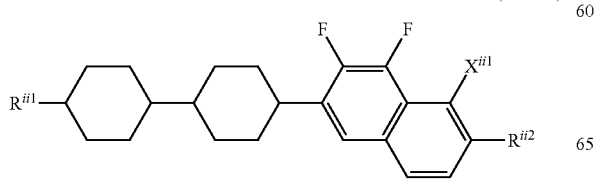

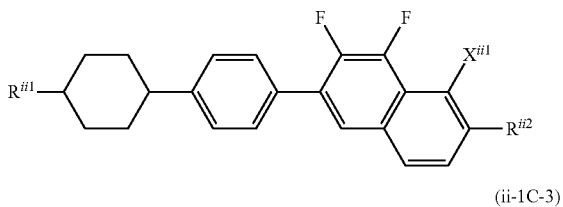

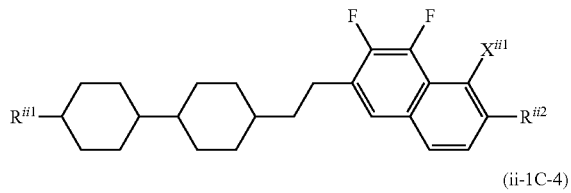

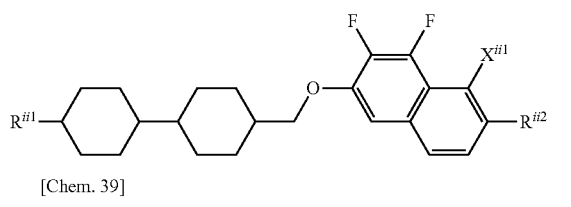

[Chem. 39]

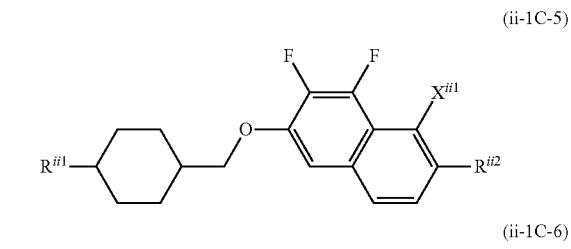

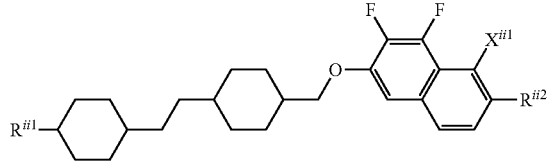

In the formulas, $R^{ii1}$ and $R^{ii2}$ each independently represent the same meanings as $R^{ii1}$ and $R^{ii2}$ in General Formula (ii).

The compound represented by General Formula (iii) is preferably the compound represented by General Formula (ii-1A), General Formula (ii-1B), or General Formula (ii-1C).

[Chem. 40]

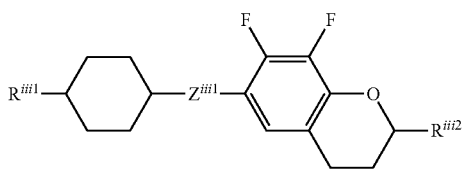

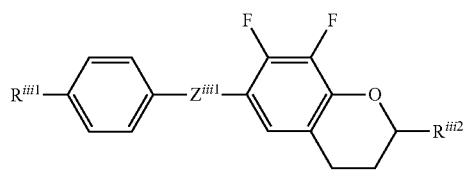
(iii-1B)

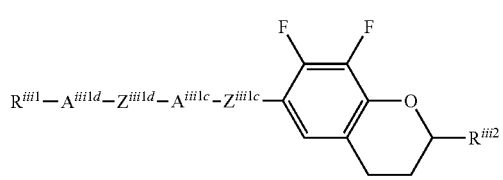
(iii-1C)

In the formula, $R^{iii1}$, $R^{iii2}$ and $Z^{iii1}$ each independently represent the same meanings as $R^{iii1}$, $R^{iii2}$ and $Z^{iii1}$ in General Formula (iii), $A^{iii1c}$ and $A^{iii1d}$ are each independently a 1,4-cyclohexylene group or a 1,4-phenylene group, but one —$CH_2$— or two or more non-adjacent —$CH_2$— present in the 1,4-cyclohexylene group may be substituted with —O— or —S—, and one hydrogen atom present in the 1,4-phenylene group may be independently substituted with a fluorine atom or a chlorine atom, and $Z^{iii1c}$ and $Z^{iii1d}$ each independently represent a single bond, —$OCH_2$—, —$CH_2O$—, —$OCF_2$—, —$CF_2O$—, —$CH_2CH_2$— or —$CF_2CF_2$—.

In the compound represented by General Formula (iii-1A) or General Formula (iii-1B), $Z^{iii1}$ preferably represents a single bond, —$OCH_2$—, —$CH_2O$—, or —$CH_2CH_2$—.

The compound represented by General Formula (iii-1C) is preferably a compound represented by the following General Formula (ii-1C-1) to General Formula (i-1C-3).

[Chem. 41]

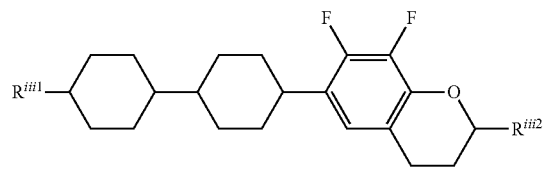
(iii-1C-1)

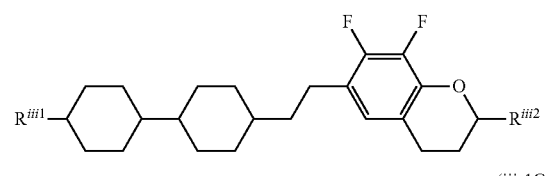
(iii-1C-2)

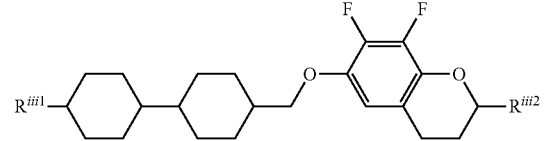
(iii-1C-3)

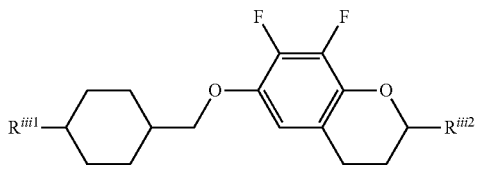
(iii-1C-4)

In the formulas, $R^{iii1}$ and $R^{iii2}$ each independently represent the same meanings as $R^{iii1}$ and $R^{iii2}$ in General Formula (iii).

In the liquid crystal composition of the present invention, in the case where two or more types of the compound represented by General Formulas (i) to (iii) are contained, two types or more of compounds selected from any one formula out of the compounds represented by General Formulas (i) to (iii) may be contained, and two or more types of compounds selected from two or more formulas selected from the compounds represented by General Formulas (i) to (iii) may be contained.

The total content of the compounds represented by General Formulas (i), (ii) and (iii) is preferably 10 to 90% by mass, more preferably 20 to 80% by mass, more preferably 20 to 70% by mass, still more preferably 20 to 60% by mass, still more preferably 20 to 55% by mass, still more preferably 25 to 55% by mass, and particularly preferably 30 to 55% by mass.

More specifically, the lower limit value of the total content of the compounds represented by General Formulas (i), (ii), and (iii) in the composition (below, % in the composition represents % by mass) is preferably 1% by mass or more, preferably 5% or more, more preferably 10% or more, more preferably 13% or more, more preferably 15% or more, more preferably 18% or more, more preferably 20% or more, more preferably 23% or more, more preferably 25% or more, more preferably 28% or more, more preferably 30% or more, more preferably 33% or more, more preferably 35% or more, more preferably 38% or more, and more preferably 40% or more. In addition, the upper limit value is preferably 95% or less, more preferably 90% or less, more preferably 88% or less, more preferably 85% or less, more preferably 83% or less, more preferably 80% or less, more preferably 78% or less, more preferably 75% or less, more preferably 73% or less, more preferably 70% or less, more preferably 68% or less, more preferably 65% or less, more preferably 63% or less, more preferably 60% or less, more preferably 55% or less, more preferably 50% or less, and more preferably 40% or less.

The liquid crystal composition of the present invention contains one type or two or more types of compounds represented by General Formula (IV).

[Chem. 42]

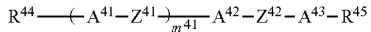
(IV)

In General Formula (IV), $R^{44}$ and $R^{45}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and are preferably linear. An alkenyl group is preferable in the case where emphasis is placed on improving the response speed of the display element, and an alkyl group is preferable in the case where emphasis is placed on reliability such as the voltage holding ratio. In the case where $R^{44}$ and $R^{45}$ are an alkenyl group, it is preferably selected from a group represented by any one of formula (R1) to formula (R5).

[Chem. 43]

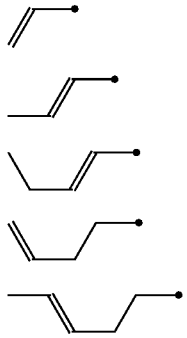

(R1)

(R2)

(R3)

(R4)

(R5)

The black dot in each formula represents a point connecting with a ring.

In order to improve the transmittance of the liquid crystal display element, particularly in the case where $m^{41}$ is 1 or 2, at least one group of $R^{44}$ or $R^{45}$ is preferably a group other than formula (R2), and more preferably an alkyl group or an alkoxy group.

The combination of $R^{44}$ and $R^{45}$ is not particularly limited; however, a combination where both represent an alkyl group, a combination where one represents an alkyl group and the other represents an alkenyl group, or a combination where one represents an alkyl group and the other represents alkoxy, or a combination where one represents an alkyl group and the other represents an alkenyloxy group is preferable. In the case where emphasis is placed on reliability, it is preferable that both $R^{44}$ and $R^{45}$ be alkyl groups, and in the case where emphasis is placed on reducing the volatility of the compound, $R^{44}$ and $R^{45}$ are preferably an alkoxy group, and in the case where importance is placed on a reduction in viscosity, at least one is preferably an alkenyl group.

In the case where it is necessary to increase Δn, $A^{41}$ to $A^{43}$ are preferably aromatic, and are preferably aliphatic in order to improve the response speed, and each independently preferably represent a trans-1,4-cyclohexylene group, a 1,4-phenylene group, a 2-fluoro-1,4-phenylene group, a 3-fluoro-1,4-phenylene group, a 2,5-difluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, and any of the following structures:

[Chem. 44]

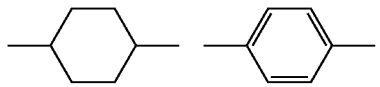

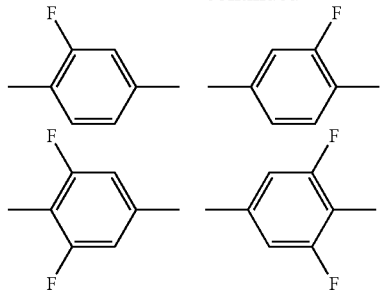

is preferable.

[Chem. 45]

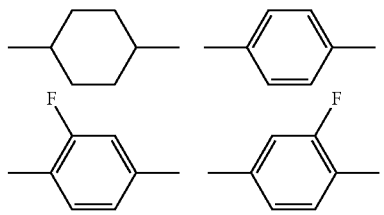

Any of the above structures is more preferable.

$Z^{41}$ and $Z^{42}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, more preferably a single bond, —CH$_2$CH$_2$—, —OCF$_2$— or —CF$_2$O—, and particularly preferably a single bond.

$m^{41}$ preferably represents an integer of 1 or 2. In the case where there is a plurality of $A^{41}$ and $Z^{41}$, these may be the same or different.

The compound represented by General Formula (IV) may be used alone, and it is also possible to use a combination thereof. There are no particular restrictions on the types of compound which are able to be combined, but the compounds are used in combination as appropriate according to the desired performances such as solubility at low temperature, transition temperature, electrical reliability, birefringence, and the like. As the types of the compound to be used, for example, one embodiment of the present invention may have one type. Alternatively, other embodiments of the present invention may have two types, three types, four types, five types, six types, seven types, eight types, nine types, or ten or more types.

In the composition of the present invention, the content of the compound represented by General Formula (IV) is appropriately adjusted according to the desired performances such as the solubility at a low temperature, the transition temperature, the electrical reliability, the birefringence, the process adaptability, the drip marks, the burn-in, and dielectric anisotropy.

The content of the compound represented by General Formula (IV) is preferably 1% by mass to 80% by mass, more preferably 1% by mass to 70% by mass, more preferably 1% by mass to 60% by mass, more preferably 10% by mass to 50% by mass, more preferably 10% by mass to 40% by mass, and more preferably 15% by mass to 40% by mass.

More specifically, the lower limit value of the content of the compound represented by General Formula (IV) is preferably 0.5% by mass or more in the composition (below, % in the composition represents % by mass), preferably 1% or more, more preferably 3% or more, more preferably 5% or more, more preferably 8% or more, more preferably 10% or more, more preferably 13% or more, more preferably 15% or more, more preferably 18% or more, and more preferably 20% or more. In addition, the upper limit value is preferably 80% or less, more preferably 70% or less, more preferably 65% or less, more preferably 60% or less, more preferably 55% or less, more preferably 50% or less, more preferably 45% or less, more preferably 40% or less, more preferably 38% or less, more preferably 35% or less, more preferably 33% or less, more preferably 30% or less, more preferably 28% or less, and more preferably 25% or less.

As the compound represented by General Formula (IV), it is preferable that one type or two or more types of compounds represented by General Formula (IV-1) be contained.

[Chem. 46]

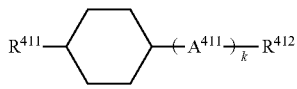
(IV-1)

In the formula, $R^{411}$ and $R^{412}$ each independently represent an alkyl group having 1 to 8 carbon atoms, an alkenyl group having 2 to 8 carbon atoms, an alkoxy group having 1 to 8 carbon atoms or an alkenyloxy group having 2 to 8 carbon atoms, $A^{411}$ represents a 1,4-phenylene group or a trans-1,4-cyclohexylene group, and k represents 1 or 2, and two A's may be the same or different in the case where k is 2.

The total content of the compounds represented by General Formula (IV-1) in the total content of the composition is preferably 1% by mass to 80% by mass, more preferably 1% by mass to 70% by mass, more preferably 1% by mass to 60% by mass, more preferably 10% by mass to 50% by mass, more preferably 10% by mass to 40% by mass, and more preferably 15% by mass to 40% by mass.

More specifically, the lower limit value of the content of the compound represented by General Formula (IV-1) is preferably 0.5% by mass or more in the composition (below, % in the composition represents % by mass), more preferably 1% or more, more preferably 3% or more, more preferably 5% or more, more preferably 8% or more, more preferably 10% or more, more preferably 13% or more, more preferably 15% or more, more preferably 18% or more, and more preferably 20% or more. In addition, the upper limit value is preferably 80% or less, more preferably 70% or less, more preferably 65% or less, more preferably 60% or less, more preferably 55% or less, more preferably 50% or less, more preferably 45% or less, more preferably 40% or less, more preferably 38% or less, more preferably 35% or less, more preferably 33% or less, more preferably 30% or less, more preferably 28% or less, and more preferably 25% or less.

Specific examples of the compound represented by General Formula (IV-1) include compounds represented by the compound group represented by the following General Formula (IV-1a) to General Formula (IV-1f).

[Chem. 47]

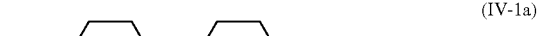
(IV-1a)

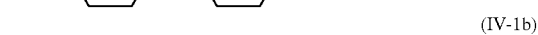
(IV-1b)

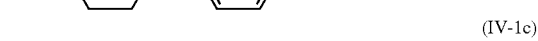
(IV-1c)

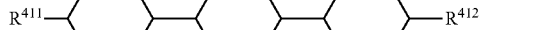
(IV-1d)

(IV-1e)

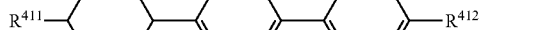
(IV-1f)

In the formulas, $R^{411}$ and $R^{412}$ each independently represent the same meanings as $R^{411}$ and $R^{412}$ in General Formula (IV-1).

$R^{411}$ and $R^{412}$ each independently preferably represent an alkyl group having 1 to 8 carbon atoms, an alkenyl group having 2 to 8 carbon atoms or an alkoxy group having 2 to 8 carbon atoms, and more preferably an alkyl group having 1 to 5 carbon atoms, an alkenyl group having 2 to 5 carbon atoms, and an alkoxy group of 2 to 5 carbon atoms. Alternatively, $R^{411}$ and $R^{412}$ may be the same or different, but preferably represent different substituents.

The compound selected from the group of compounds represented by General Formula (IV-1a) to General Formula (IV-1f) preferably contains 1 type to 10 types, particularly preferably 1 type to 8 types, particularly preferably 1 type to 5 types, and 2 types or more of the compounds are also preferable. It is preferable that the compound represented by General Formula (IV-1a) be contained. In the compound represented by General Formula (IV-1a), in the case where $R^{411}$ represents an alkenyl group, for example, it is preferable at least one type of compound selected from compounds represented by General Formula (IV-1a1) be contained.

[Chem. 48]

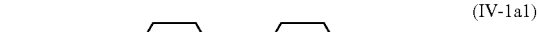
(IV-1a1)

In the formula, $R^{413}$ represents a hydrogen atom or a methyl group, $R^{414}$ represents an alkyl group having 1 to 5 carbon atoms, an alkenyl group having 2 to 5 carbon atoms, or an alkoxy group having 1 to 4 carbon atoms.

More specifically, the compound represented by General Formula (IV-1a1) is preferably the compound described below.

[Chem. 49]

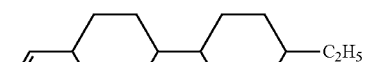 (IV-1a1-1)

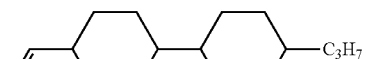 (IV-1a1-2)

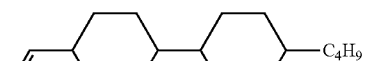 (IV-1a1-3)

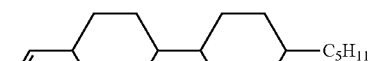 (IV-1a1-4)

[Chem. 50]

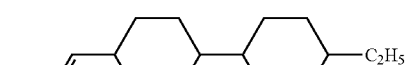 (IV-1a1-5)

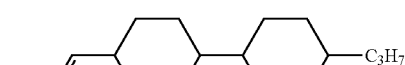 (IV-1a1-6)

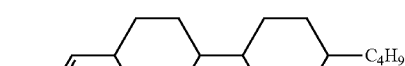 (IV-1a1-7)

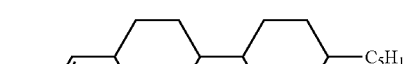 (IV-1a1-8)

In the case where the compound represented by General Formula (IV-1a1) is contained, the lower limit value of the content of the compound represented by General Formula (IV-1a1) in the liquid crystal composition is preferably 1% by mass, preferably 5% by mass, more preferably 15% by mass, still more preferably 20% by mass, particularly preferably 23% by mass, and most preferably 25% by mass, and the upper limit value is preferably 70% by mass, more preferably 60% by mass, still more preferably 55% by mass, particularly preferably 52% by mass, and most preferably 50% by mass. More specifically, in the case where emphasis is placed on the response speed, the lower limit value is preferably 20% by mass, more preferably 30% by mass, even more preferably 35% by mass, particularly preferably 38% by mass, and most preferably 35% by mass, and the upper limit value is preferably 70% by mass, more preferably 60% by mass, even more preferably 55% by mass, particularly preferably 52% by mass, and most preferably 50% by mass. In the case where more emphasis is placed on the driving voltage, the lower limit value is preferably 5% by mass, more preferably 15% by mass, even more preferably 20% by mass, particularly preferably 23% by mass, and most preferably 25% by mass, and the upper limit value is preferably 60% by mass, more preferably 50% by mass, even more preferably 45% by mass, particularly preferably 42% by mass, and most preferably 40% by mass. The ratio of the compound represented by General Formula (III) is such that the lower limit value of the content of the compound represented by General Formula (III) in the total content of the compound represented by General Formula (I) in the liquid crystal composition is preferably 60% by mass, more preferably 70% by mass, even more preferably 75% by mass, particularly preferably 78% by mass, and most preferably 80% by mass, and the upper limit value is preferably 90% by mass, more preferably 95% by mass, even more preferably 97% by mass, still more preferably 99% by mass, and particularly preferably 100% by mass.

In addition, as the compound represented by General Formula (IV-1a) to General Formula (IV-1e) other than the compound represented by General Formula (IV-1a1), more specifically, the following are preferable.

[Chem. 51]

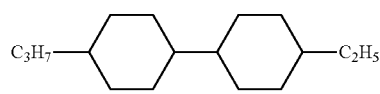 (IV-1a2)

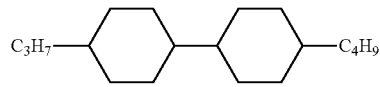 (IV-1a3)

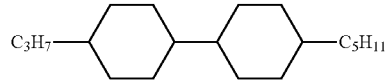 (IV-1a4)

[Chem. 52]

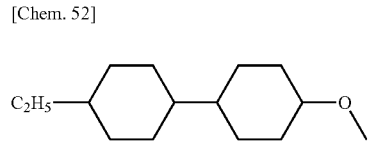 (IV-1a5)

(IV-1a6)

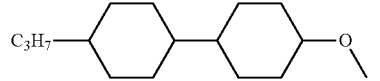 (IV-1a7)

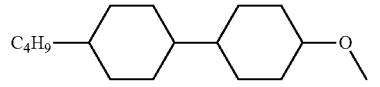 (IV-1a8)

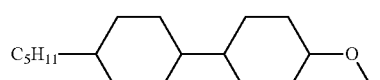 (IV-1a9)

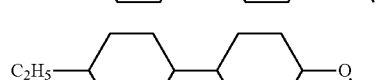 (IV-1a10)

 (IV-1a11)

 (IV-1a12)

[Chem. 53]
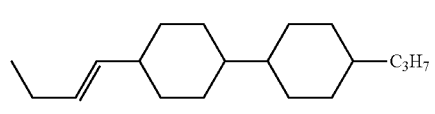
(IV-1a13)
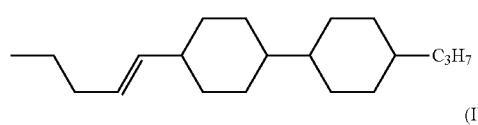
(IV-1a14)
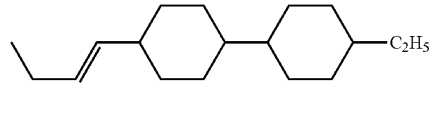
(IV-1a15)
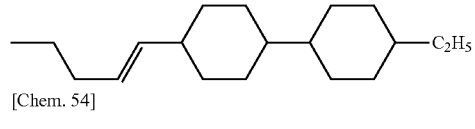
(IV-1a16)
[Chem. 54]
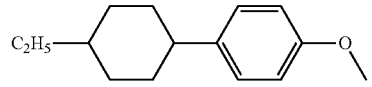
(IV-1b1)
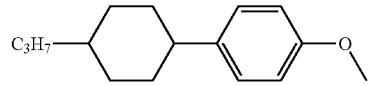
(IV-1b2)
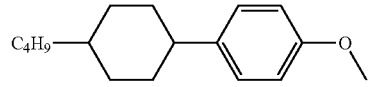
(IV-1b3)
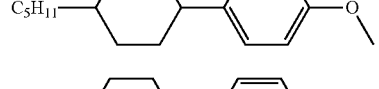
(IV-1b4)
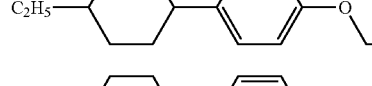
(IV-1b5)
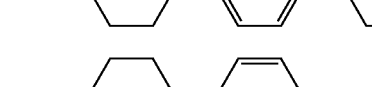
(IV-1b6)
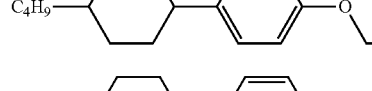
(IV-1b7)
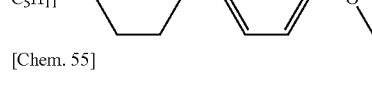
(IV-1b8)
[Chem. 55]
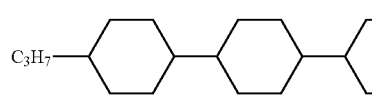
(IV-1c1)
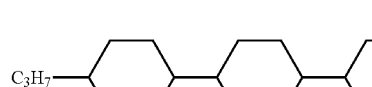
(IV-1c2)
[Chem. 56]
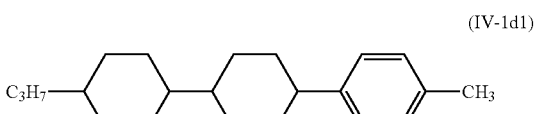
(IV-1d1)
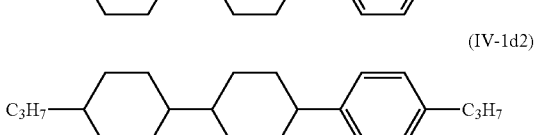
(IV-1d2)
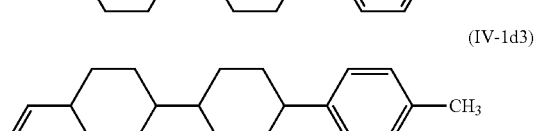
(IV-1d3)
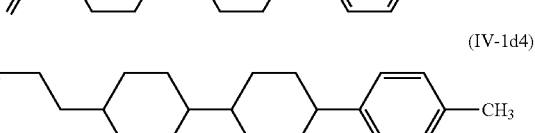
(IV-1d4)
[Chem. 57]
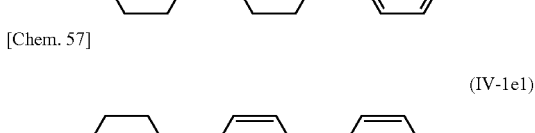
(IV-1e1)
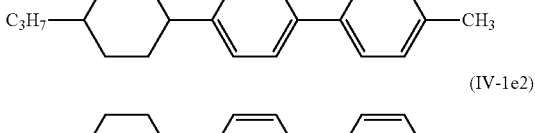
(IV-1e2)
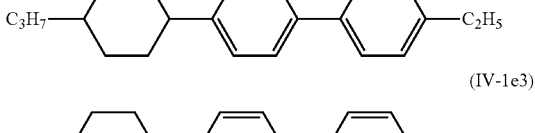
(IV-1e3)
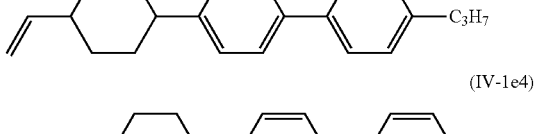
(IV-1e4)
[Chem. 58]
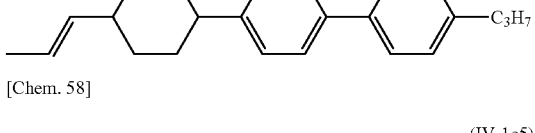
(IV-1e5)
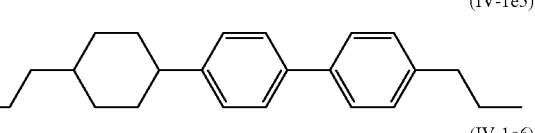
(IV-1e6)
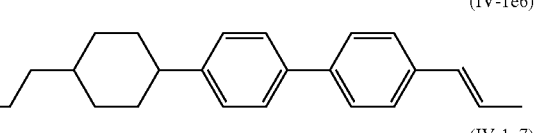
(IV-1e7)
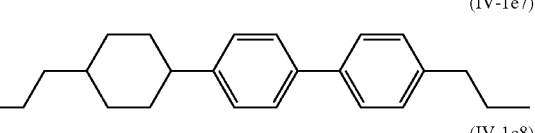
(IV-1e8)
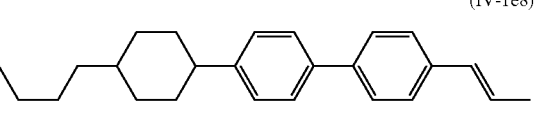

-continued (IV-1e9)
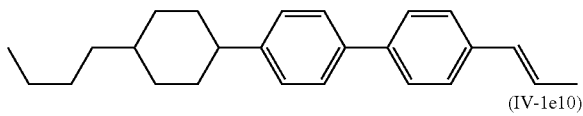

(IV-1e10)
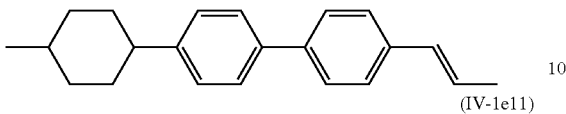

(IV-1e11)
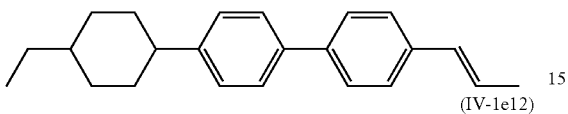

(IV-1e12)
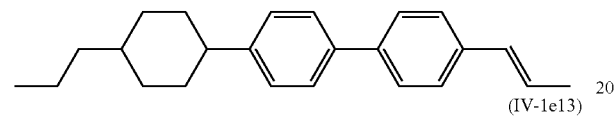

(IV-1e13)
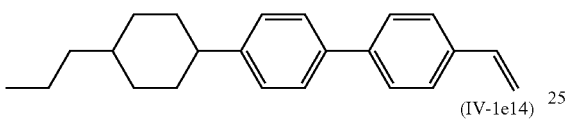

(IV-1e14)
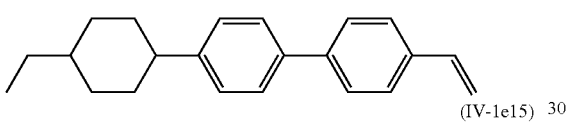

(IV-1e15)
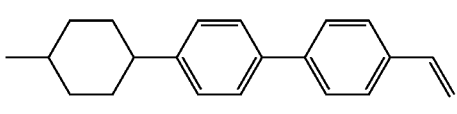

Among the above, the compounds represented by formula (IV-1a1-2), formula (IV-1a1-4), formula (IV-1a1-6), formula (I-1a2) to formula (IV-1a7), formula (IV-1b2), formula (IV-1b6), formula (IV-1d1), formula (IV-1d2), formula (IV-1d3), formula (IV-1e2), formula (IV-1e3), and formula (IV-1e4) are preferable.

In addition, the compound represented by General Formula (IV) is preferably a compound represented by the following General Formula (IV-2) to General Formula (IV-7).

[Chem. 59]

(IV-2)
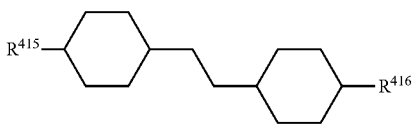

(IV-3)
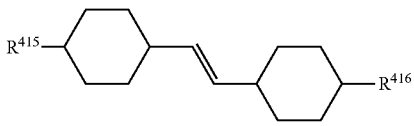

(IV-4)
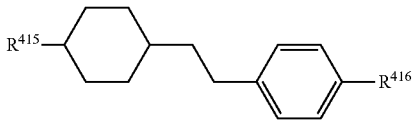

-continued (IV-5)
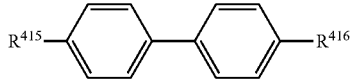

(IV-6)

(IV-7)
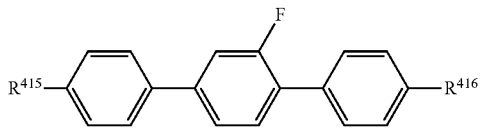

In the formulas, $R^{415}$ and $R^{416}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

In addition, as the compound represented by General Formula (IV), compounds represented by General Formula (IV-8), General Formula (IV-9), or General Formula (VI-10) are preferably contained as 1 type or 2 types or more.

[Chem. 60]

(IV-8)
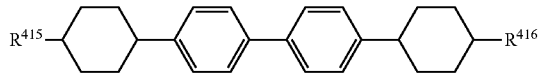

(IV-9)
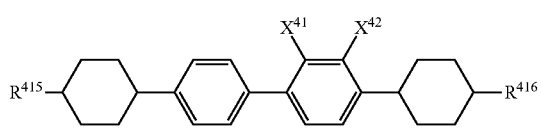

(IV-10)
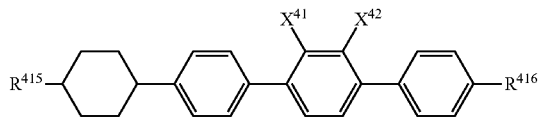

In the formulas, $R^{415}$ and $R^{416}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $X^{41}$ and $X^{42}$ each independently represent a fluorine atom or a hydrogen atom, either one of $X^{41}$ and $X^{42}$ is a fluorine atom, the other one is a hydrogen atom.

In addition, as the compound represented by General Formula (IV), one type or two or more types of compounds represented by General Formula (IV-11-1) to General Formula (IV-11-3) may be contained.

[Chem. 61]

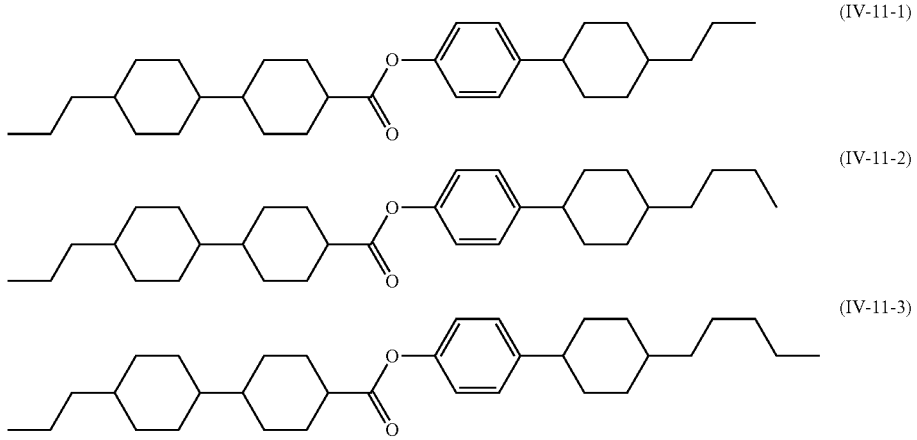

In addition, as the compound represented by General Formula (III), one type or two or more types of compounds represented by General Formula (N-001) may be contained.

[Chem. 62]

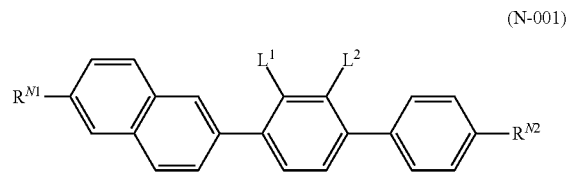

In the formula, $R^{N1}$ and $R^{N2}$ each independently represent an alkyl group having 1 to 8 carbon atoms, an alkoxyl group having 1 to 8 carbon atoms, an alkenyl group having 2 to 8 carbon atoms, or an alkenyloxyl group having 2 to 8 carbon atoms, and $L^1$ and $L^2$ each independently represent a hydrogen atom, a fluorine atom, or $CH_3$ or $CF_3$, but compounds in which both of $L^1$ and $L^2$ represent a fluorine atom are excluded.

It is preferable that $R^{N1}$ and $R^{N2}$ represent an alkyl group having 1 to 5 carbon atoms.

The 1,4-cyclohexylene group in the present application is preferably a trans-1,4-cyclohexylene group.

In the liquid crystal composition of the present invention, the total content of the compound selected from the group of compounds represented by General Formula (i) to General Formula (iii) and the compound represented by General Formula (IV) is preferably 50 to 99% by mass, more preferably 55 to 99% by mass, even more preferably 60 to 99% by mass, even more preferably 65 to 99% by mass, even more preferably 70 to 99% by mass, and particularly preferably 75 to 99% by mass.

More specifically, the lower limit value of the total content of the compound selected from the group of compounds represented by General Formula (i) to General Formula (iii) and the compound represented by General Formula (IV) is preferably contained as 30% by mass (below, % in the composition represents % by mass) or more in the composition, more preferably contained as 35% or more, more preferably contained as 40% or more, more preferably contained as 45% or more, more preferably contained as 50% or more, more preferably contained as 55% or more, more preferably contained as 60% or more, more preferably contained as 65% or more, more preferably contained as 70% or more, more preferably contained as 75% or more, more preferably contained as 78% or more, more preferably contained as 80% or more, more preferably contained as 83% or more, more preferably contained as 85% or more, more preferably contained as 90% or more, and more preferably contained as 91% or more. In addition, the upper limit value is preferably 100% or less, more preferably 99% or less, more preferably 95% or less, more preferably 90% or less, more preferably 85% or less, more preferably 80% or less, more preferably 75% or less, more preferably 70% or less, more preferably 65% or less, more preferably 60% or less, more preferably 55% or less, and more preferably 50% or less.

It is preferred that the liquid crystal composition of the present invention does not contain a compound having a structure in which oxygen atoms are bonded to each other, such as a peracid (—CO—OO—) structure, in the molecule.

In the case where emphasis is placed on the reliability and long-term stability of the liquid crystal composition, the content of the compound having a carbonyl group with respect to the total mass of the composition is preferably 5% by mass or less, more preferably 3% by mass or less, even more preferably 1% by mass or less, and most preferably substantially not contained.

It is preferable to increase the content of the compound in which all the ring structures in the molecule are 6-membered rings, and the content of the compound in which all the ring structures in the molecule are 6-membered rings with respect to the total mass of the composition is preferably 80% by mass or more, more preferably 90% by mass or more, even more preferably 95% by mass or more, and the liquid crystal composition is most preferably formed only by the compound in which substantially all the ring structures in the molecule are 6-membered rings.

In order to suppress deterioration due to oxidation of the liquid crystal composition, it is preferable to reduce the content of the compound having a cyclohexenylene group as a ring structure, and the content of the compound having a cyclohexenylene group with respect to the total mass of the composition is preferably 10% by mass or less, more preferably 5% by mass or less, and even more preferably substantially not contained.

In order to suppress the deterioration due to oxidation of the liquid crystal composition, it is preferable to reduce the content of the compound having —CH═CH— as a linking group, and the content of the compound with respect to the total mass of the composition is preferably 10% by mass or less, more preferably 5% by mass or less, and the compound is even more preferably substantially not contained.

In the case where emphasis is placed on improvement in viscosity and improvement in $T_{NI}$, the content of a compound having a 2-methylbenzene-1,4-diyl group in the molecule in which a hydrogen atom may be substituted with a halogen is preferably reduced, the content of the compound having the 2-methylbenzene-1,4-diyl group in the molecule with respect to the total mass of the composition is preferably 10% by mass or less, more preferably 5% by mass or less, and the compound is even more preferably substantially not contained.

In the case where the compound contained in the composition of the present invention has an alkenyl group as a side chain, in the case where the alkenyl group is bonded to cyclohexane, the number of carbon atoms of the alkenyl group is preferably 2 to 5, and in the case where the alkenyl group is bonded to benzene, the number of carbon atoms of the alkenyl group is preferably 4 to 5, and the unsaturated bond of the alkenyl group and the benzene are preferably not directly bonded. In addition, in the case where emphasis is placed on the stability of the liquid crystal composition, it is preferable to reduce the content of the compound having an alkenyl group as a side chain and having a 2,3-difluorobenzene-1,4-diyl group, the content of the compound with respect to the total mass of the composition is preferably 10% by mass or less, more preferably 5% by mass or less, and the compound is even more preferably substantially not contained.

The liquid crystal composition of the present invention may contain additives such as ordinary nematic liquid crystal, smectic liquid crystal, cholesteric liquid crystal, antioxidants, ultraviolet absorbers, and infrared absorbers in addition to the above compound.

The following are preferable as additives which are able to be used in the present invention.

[Chem. 63]

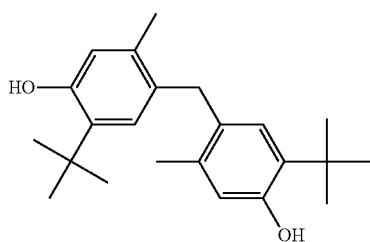
(III-1)

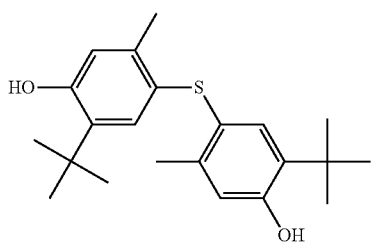
(III-2)

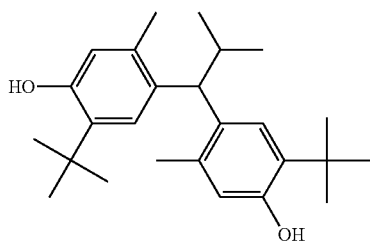
(III-3)

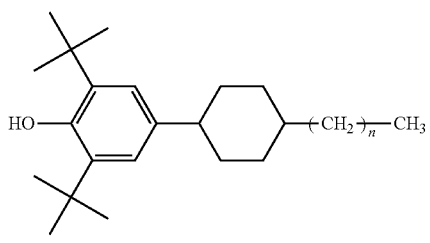
(III-4)

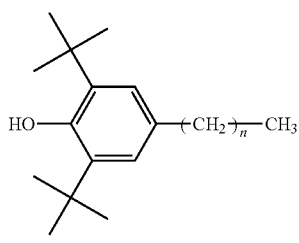
(III-5)

[Chem. 64]

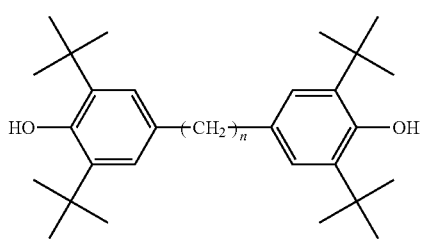
(III-6)

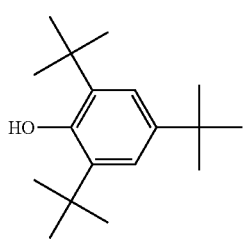
(III-7)

(III-8)
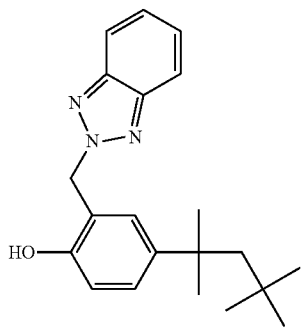
(III-9)
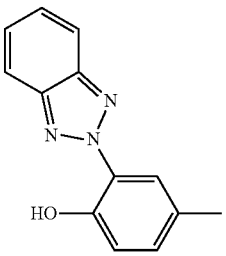
(III-10)
[Chem. 65]
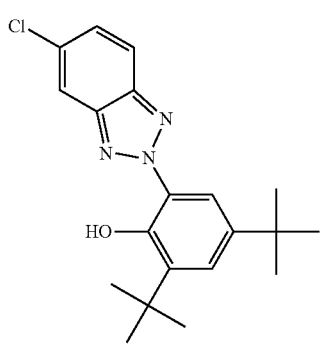
(III-11)
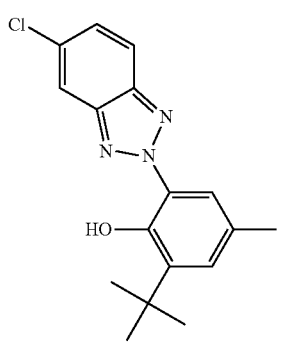
(III-12)
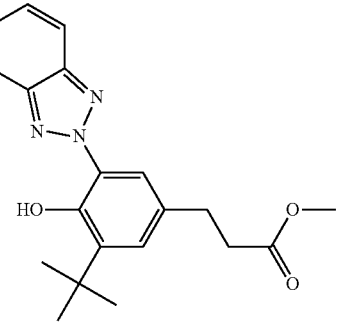
(III-13)
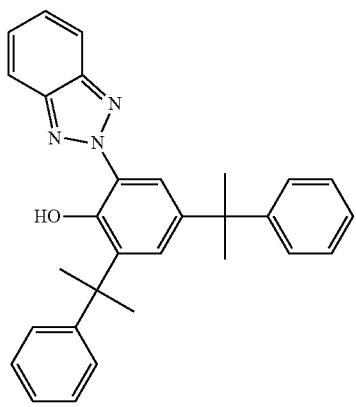
(III-14)
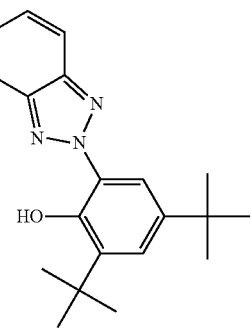

(III-15)
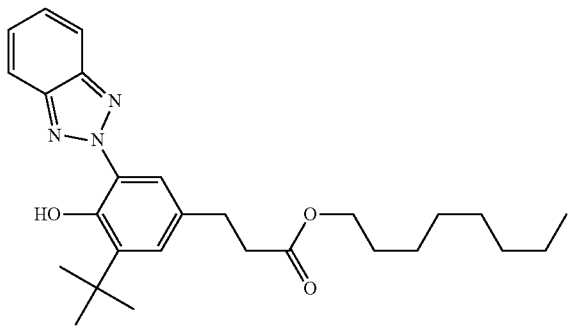
[Chem. 66]
(III-16)
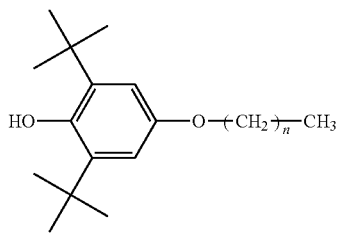
(III-17)
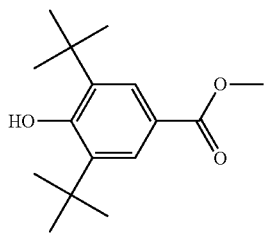
(III-18)
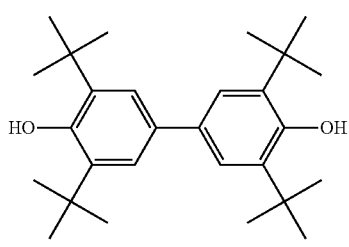
(III-19)
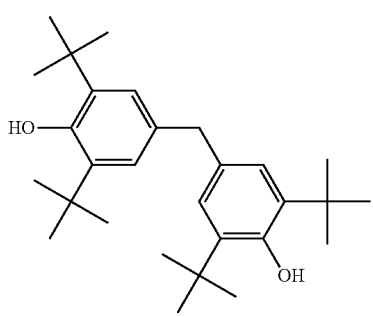
(III-20)
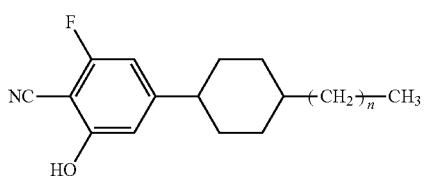
[Chem. 67]
(III-21)
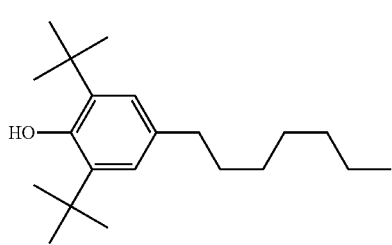
(III-22)
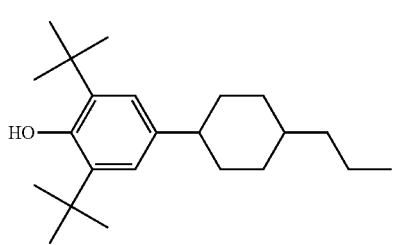
(III-23)
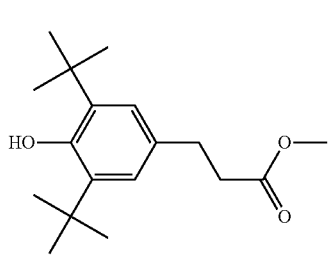
(III-24)
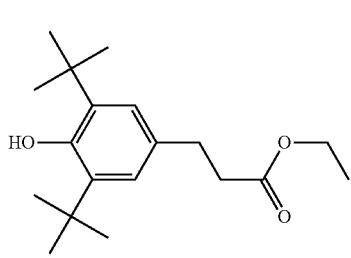

(III-25)
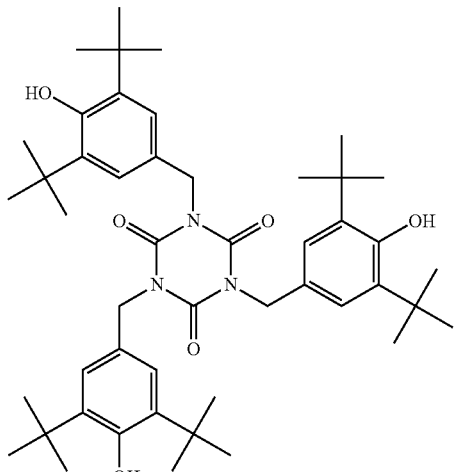
[Chem. 68]
(III-26)
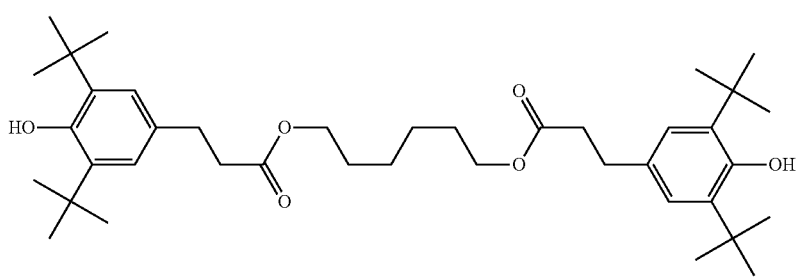
(III-27)
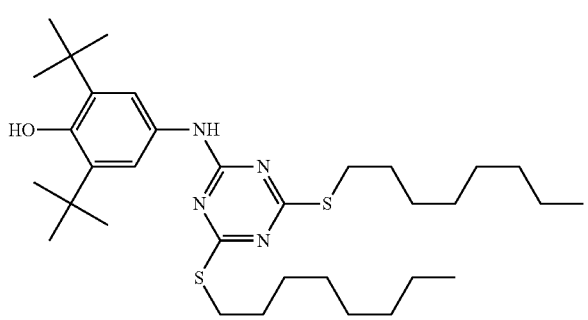
(III-28)
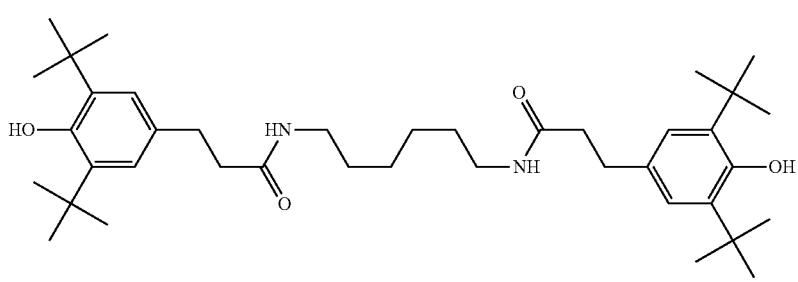
(III-29)
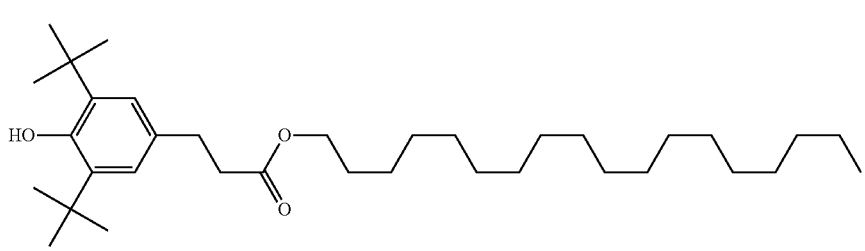

-continued
(III-30)
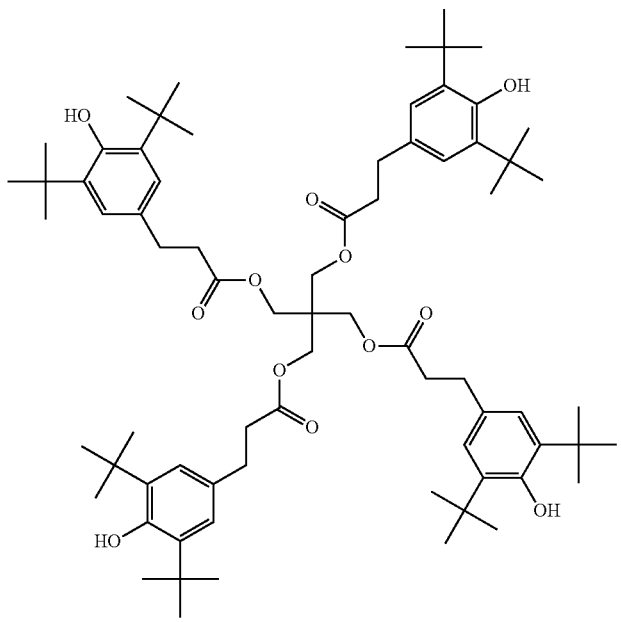
[Chem. 69]
(III-31)
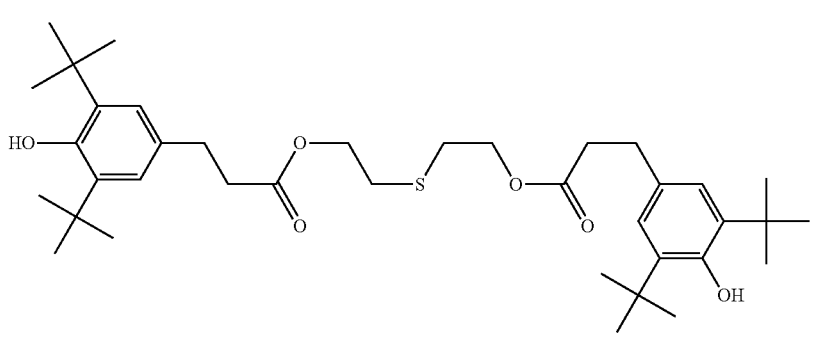
(III-32)
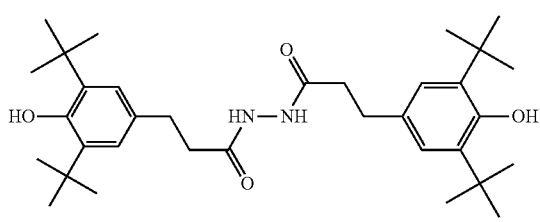
(III-33)
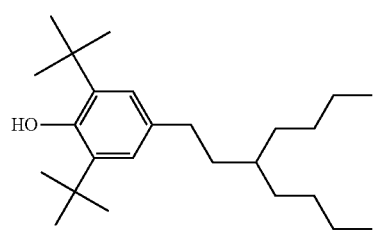
(III-34)
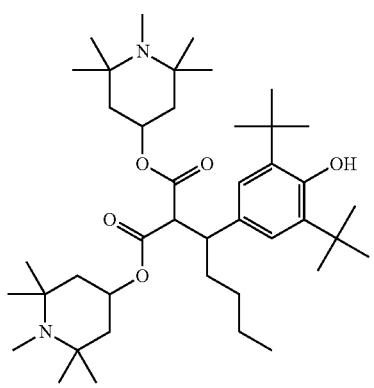
(III-35)
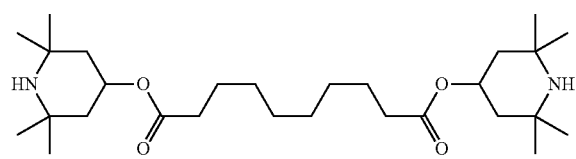

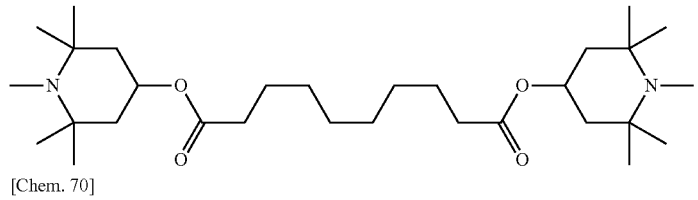
(III-36)

[Chem. 70]

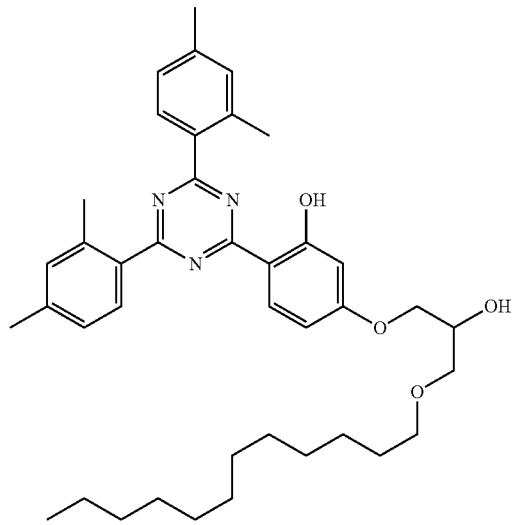
(III-37)

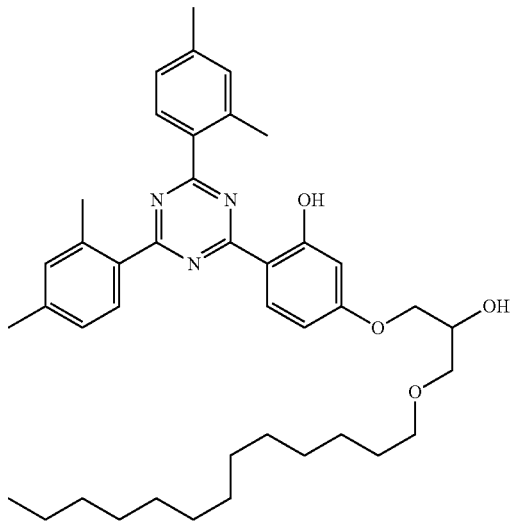
(III-38)

In the formula, n represents an integer of 0 to 20.

The value of the dielectric anisotropy Δε of the liquid crystal composition of the present invention has negative dielectric anisotropy, and the absolute value of the dielectric anisotropy is 2 or more. The value of the dielectric anisotropy Δε is preferably −2.0 to −6.0 at 25° C., more preferably −2.5 to −5.0, and even more preferably −2.5 to −4.0 and in more detail, preferably −2.5 to −3.4 in the case where emphasis is placed on the response speed, and preferably −3.4 to −4.0 in the case where emphasis is placed on the driving voltage.

The value of the refractive index anisotropy Δn of the liquid crystal composition in the present invention is preferably 0.08 to 0.13 at 25° C. and 0.09 to 0.12 is more preferable. More specifically, preferably 0.10 to 0.12 in the case of corresponding to a thin cell gap, and preferably 0.08 to 0.10 in the case of corresponding to a thick cell gap.

The rotational viscosity ($\gamma_1$) of the liquid crystal composition in the present invention is preferably 150 or less, more preferably 130 or less, and particularly preferably 120 or less.

In the liquid crystal composition of the present invention, it is preferable that Z, which is a function of the rotational viscosity and refractive index anisotropy, exhibits a specific value.

$$Z = \gamma_1 / \Delta n^2 \qquad \text{[Formula 1]}$$

In the formula, $\gamma_1$ represents rotational viscosity and Δn represents refractive index anisotropy.

Z is preferably 13,000 or less, more preferably 12,000 or less, and particularly preferably 11,000 or less.

The nematic phase-isotropic liquid phase transition temperature ($T_{NI}$) of the liquid crystal composition of the present invention is 60° C. or more, preferably 75° C. or more, more preferably 80° C. or more, and even more preferably 90° C. or more.

The liquid crystal composition of the present invention needs to have a specific resistance of $10^{12}$ (Ω·m) or more, preferably $10^{13}$ (Ω·m), and more preferably $10^{14}$ (Ω·m) or more.

The liquid crystal composition of the present invention may contain ordinary nematic liquid crystals, smectic liquid crystals, cholesteric liquid crystals, antioxidants, ultraviolet absorbers, and the like in addition to the compounds described above depending on the application and in the case where chemical stability of the liquid crystal composition is required, it is preferable not to have a chlorine atom in the molecule, and in the case where stability of light such as ultraviolet rays is required in the liquid crystal composition, it is desirable not to have a condensed ring or the like representing a naphthalene ring or the like having a long conjugation length and an absorption peak in the ultraviolet region in the molecule.

(Liquid Crystal Display Element)

The liquid crystal composition of the present invention as described above is applied to an FFS mode liquid crystal display element. Below, an example of the FFS mode liquid crystal display element according to the present invention will be described with reference to FIGS. 1 to 6.

FIG. 1 is a diagram schematically showing a configuration of a liquid crystal display element. In FIG. 1, the constituent elements are illustrated separately for the sake of convenience. As shown in FIG. 1, the configuration of the liquid crystal display element 10 according to the present invention is an FFS mode liquid crystal display element which has a liquid crystal composition (or a liquid crystal layer 5) interposed between a first transparent insulating substrate 2 and a second transparent insulating substrate 8 disposed to oppose each other, in which the liquid crystal composition of the present invention is used as the liquid crystal composition. In the first transparent insulating substrate 2, a first electrode layer 3 is formed on the surface of the liquid crystal layer 5 side and, in the second transparent insulating substrate 8, a second electrode layer 7 is formed on the surface of the liquid crystal layer 5 side. In addition, the liquid crystal display element 10 also has a liquid crystal layer 5 and a pair of alignment films 4 for inducing homogeneous alignment by directly coming into contact with the liquid crystal composition forming the liquid crystal layer 5 between the first transparent insulating substrate 2 and the second transparent insulating substrate 7, and the liquid crystal molecules in the liquid crystal composition are aligned to be substantially parallel with respect to the substrates 2 and 7 when no voltage is applied. As shown in FIG. 1 and FIG. 3, the first substrate 2 and the second substrate 7 may be interposed between a pair of polarizing plates 1 and 8. Furthermore, in FIG. 1, a color filter 6 is provided between the second substrate 7 and the alignment film 4.

That is, the liquid crystal display element 10 according to the present invention is formed by sequentially laminating a first polarizing plate 1, a first substrate 2, a first electrode layer 3 including a thin film transistor, an alignment film 4, the liquid crystal layer 5 including a liquid crystal composition, the alignment film 4, the color filter 6, the second electrode layer 7, the second substrate 8, and the second polarizing plate 8. As the first substrate 2 and the second substrate 7, it is possible to use a transparent material having flexibility such as glass or plastic, and one substrate may be an opaque material such as silicon. The two substrates 2 and 7 are bonded together by a sealing material and a sealant such as an epoxy type thermosetting composition or the like disposed in the peripheral region and, in order to maintain the distance between the substrates, for example, a granular spacer such as glass particles, plastic particles, alumina particles or the like or a spacer column made of a resin formed by a photolithography method may be disposed therebetween.

FIG. 2 is an enlarged plan view of a region surrounded by the II line of the electrode layer 3 formed on the substrate 2 in FIG. 1. FIG. 3 is a cross-sectional view of the liquid crystal display element shown in FIG. 1 taken along the line III-III in FIG. 2. As shown in FIG. 2, the electrode layer 3 including the thin film transistor formed on the surface of the first substrate 2 includes a plurality of gate bus lines 26 for supplying scanning signals and a plurality of data bus lines 25 for supplying display signals, which are disposed in a matrix shape to cross each other. Note that, in FIG. 2, only a pair of gate bus lines 25 and a pair of data bus lines 24 are shown.

A region surrounded by the plurality of gate bus lines 26 and the plurality of data bus lines 25 forms a unit pixel of the liquid crystal display device, and the pixel electrode 21 and the common electrode 22 are formed in the unit pixel. Thin film transistors including a source electrode 27, a drain electrode 24, and a gate electrode 28 are provided in the vicinity of the intersections where the gate bus lines 26 and the data bus lines 25 intersect each other. This thin film transistor is connected to the pixel electrode 21 as a switch element for supplying a display signal to the pixel electrode 21. In addition, a common line 29 is provided in parallel with the gate bus line 26. This common line 29 is connected to the common electrode 22 in order to supply a common signal to the common electrode 22.

As shown in FIG. 3, a preferable aspect of the structure of the thin film transistor has, for example, a gate electrode 11 formed on the surface of the substrate 2, a gate insulating layer 12 provided so as to cover the gate electrode 11 and to cover substantially the entire surface of the substrate 2, a semiconductor layer 13 formed on the surface of the gate insulating layer 12 so as to oppose the gate electrode 11, a protective film 14 provided so as to cover a part of the surface of the semiconductor layer 13, a drain electrode 16 provided so as to cover one side end section of the protective film 14 and the semiconductor layer 13 and to come into contact with the gate insulating layer 12 formed on the substrate 2 surface, a source electrode 17 provided so as to cover the other side end portion of the protective film 14 and the semiconductor layer 13 and to come into contact with the gate insulating layer 12 formed on the substrate 2 surface, and an insulating protective layer 18 provided so as to cover the drain electrode 16 and the source electrode 17. An anodic oxide coating (not shown) may be formed on the surface of the gate electrode 11 for a reason such as eliminating a step difference with the gate electrode.

For the semiconductor layer 13, it is possible to use amorphous silicon, polycrystalline polysilicon or the like and when a transparent semiconductor film such as ZnO, IGZO (In—Ga—Zn—O), ITO or the like is used, it is possible to suppress adverse effects on the light carrier caused by light absorption, which is preferable from the viewpoint of increasing the opening ratio of the element.

Furthermore, for the purpose of reducing the width and the height of the Schottky barrier, an ohmic contact layer 15 may be provided between the semiconductor layer 13 and the drain electrode 16 or the source electrode 17. For the ohmic contact layer, it is possible to use a material obtained by adding an impurity such as phosphorus such as n-type amorphous silicon or n-type polycrystalline silicon at a high concentration.

The gate bus lines 26, the data bus lines 25 and the common lines 29 are preferably metal films, more preferably Al, Cu, Au, Ag, Cr, Ta, Ti, Mo, W, Ni or an alloy thereof, and a wiring of Al or an alloy thereof is particularly preferably used. In addition, the insulating protective layer 18 is a layer having an insulating function, and is formed of silicon nitride, silicon dioxide, a silicon oxynitride film, or the like.

In the embodiment shown in FIGS. 2 and 3, the common electrode 22 is a flat, plate-shaped electrode formed on substantially the entire surface of the gate insulating layer 12, while the pixel electrode 21 is a comb shaped electrode formed on the insulating protective layer 18 covering the common electrode 22. That is, the common electrode 22 is disposed at a position closer to the first substrate 2 than the pixel electrode 21, and these electrodes are disposed to overlap with the insulating protective layer 18 interposed therebetween. The pixel electrode 21 and the common electrode 22 are formed of a transparent conductive material such as Indium Tin Oxide (ITO), Indium Zinc Oxide (IZO), Indium Zinc Tin Oxide (IZTO), or the like. Since the pixel electrode 21 and the common electrode 22 are formed of a transparent conductive material, the area to be opened in the unit pixel area is increased, and the opening ratio and the transmittance are increased.

In order to form a fringe electric field between the electrodes, the pixel electrode 21 and the common electrode 22 are formed such that an inter-electrode distance R in the horizontal direction on the substrate between the pixel electrode 21 and the common electrode 22 is smaller than the distance G between the first substrate 2 and the second substrate 7. Note that, the inter-electrode distance R represents the horizontal direction distance between the electrodes on the substrate. FIG. 3 shows an example in which, since the flat, plate-shaped common electrode 22 and the comb-shaped pixel electrode 21 are overlapped with each other, the inter-electrode distance R=0, and since the inter-electrode distance R is smaller than the distance (that is, cell gap) G between the first substrate 2 and the second substrate 7, the electric field E of the fringe is formed. Accordingly, in the FFS type liquid crystal display element, it is possible to use a horizontal electric field formed in a direction perpendicular with respect to a line forming the comb shape of the pixel electrode 21 and a parabolic electric field. The electrode width 1 of the comb-shaped portion of the pixel electrode 21 and the width m of the gap of the comb-shaped portion of the pixel electrode 21 are preferably formed at a width such that all the liquid crystal molecules in the liquid crystal layer 5 are able to be driven by the generated electric field.

From the viewpoint of preventing the leakage of light, it is preferable that the color filter 6 form a black matrix (not shown) in a portion corresponding to the thin film transistor and the storage capacitor 23.

The second electrode layer 7 is a flat plate-shaped electrode formed on substantially the entire surface of the second substrate 8. The second electrode layer 7 is formed of a transparent conductive material such as Indium Tin Oxide (ITO), Indium Zinc Oxide (IZO), Indium Zinc Tin Oxide (IZTO), for example.

On the first electrode layer 3 and the color filter 6, a pair of alignment films 4 directly coming into contact with the liquid crystal composition forming the liquid crystal layer 5 to induce homogeneous alignment are provided. The alignment film 4 is, for example, a polyimide film subjected to a rubbing treatment, and the alignment directions of each alignment film are in parallel. Note that, the rubbing direction (alignment direction of the liquid crystal composition) of the alignment film 4 in the present embodiment will be described using FIG. 4. FIG. 4 is a diagram schematically showing the alignment direction of the liquid crystal induced by the alignment film 4. In the present invention, a liquid crystal composition having negative dielectric anisotropy is used. Accordingly, when the direction perpendicular to the line forming the comb shape of the pixel electrode 21 (the direction in which the horizontal electric field is formed) is the x axis, the angle θ formed by the x axis and the major axis direction of the liquid crystal molecule 30 is preferably aligned to be approximately 0 to 45°. In the example shown in FIG. 3, an example is shown in which the angle θ between the x axis and the major axis direction of the liquid crystal molecule 30 is approximately 0°. The reason why the alignment direction of the liquid crystal is induced is to increase the maximum transmittance of the liquid crystal display device.

In addition, the polarizing plate 1 and the polarizing plate 8 are able to be adjusted such that the viewing angle and contrast are favorable by adjusting the polarizing axes of the respective polarizing plates, and it is preferable to have transmission axes orthogonal to each other such that these transmission axes are operated in a normally black mode. In particular, it is preferable that any one of the polarizing plate 1 and the polarizing plate 8 be disposed so as to have a transmission axis parallel to the alignment direction of the liquid crystal molecules 30. In addition, it is preferable to adjust the product of the refractive index anisotropy Δn of the liquid crystal and the cell thickness d so that the contrast is maximized. Furthermore, it is also possible to use a retardation film for widening the viewing angle.

In the FFS type liquid crystal display element 10 formed as described above, by supplying an image signal (voltage) to the pixel electrode 21 via the thin film TFT, a fringe electric field is formed between the pixel electrode 21 and the common electrode 22 and the liquid crystal is driven by this electric field. That is, in a state in which no voltage is applied, the liquid crystal molecules 30 are disposed such that the major axis direction thereof is parallel to the alignment direction of the alignment film 4. When a voltage is applied, an equipotential line of a parabolic electric field is formed between the pixel electrode 21 and the common electrode 22 up to the upper portion of the pixel electrode 21 and the common electrode 22, and the liquid crystal molecules 30 in the liquid crystal layer 5 rotate in the liquid crystal layer 5 along the formed electric field. In the present invention, since the liquid crystal molecules 30 having negative dielectric anisotropy are used, the major axis direction of the liquid crystal molecules 30 rotates so as to be orthogonal to the generated electric field direction. The liquid crystal molecules 30 positioned near the pixel electrode 21 are susceptible to the influence of the fringe electric field, but the liquid crystal molecules 30 having the negative dielectric anisotropy have a polarization direction on the minor axis of the molecule, the major axis direction does not rotate in the direction orthogonal with respect to the alignment film 4 and the major axis direction of all of the liquid crystal molecules 30 in the liquid crystal layer 5 is able to be maintained in a parallel direction with respect to the alignment film 4. Accordingly, in comparison with an FFS type liquid crystal display element using the liquid crystal molecules 30 having positive dielectric anisotropy, it is possible to obtain excellent transmittance characteristics.

In addition, in the liquid crystal display element 10, by applying the first electrode layer 2 and the second electrode layer 7 to generate an electric field between the first electrode layer 2 and the second electrode layer, it is possible to suppress variations in the driving of the liquid crystal molecules driven by the fringe electric field. That is, since the liquid crystal molecules 30 are influenced by the fringe electric field as described above, when the liquid crystal molecules 30 are driven along the fringe electric field, there are portions where the liquid crystal molecules 30 slightly deviate (bounce) from the direction parallel to the alignment film 4; however, when an electric field is generated between the first electrode layer 2 and the second electrode layer, the major axis direction of the liquid crystal molecules 30 having negative dielectric anisotropy moves so as to be orthogonal to this electric field direction, thus the liquid crystal molecules 30 enter a state of being aligned in the direction parallel to the alignment film 4, and it is possible to suppress alignment unevenness.

The FFS type liquid crystal display element described with reference to FIG. 1 to FIG. 4 is merely an example and various other embodiments are possible as long as these embodiments do not depart from the technical idea of the present invention. For example, FIG. 5 is another example of a plan view enlarging a region surrounded by the II line of the electrode layer 3 formed on the substrate 2 in FIG. 1. As shown in FIG. 5, the pixel electrode 21 may be formed to have a slit. In addition, the slit pattern may be formed so as to have an inclination angle with respect to the gate bus lines 26 or the data bus lines 25.

In addition, FIG. 6 is another example of a cross-sectional view of the liquid crystal display element shown in FIG. 1 taken along the line III-III in FIG. 2. In the example shown in FIG. 6, a common electrode 22 having a comb shape or a slit is used, and the inter-electrode distance in the horizontal direction on the substrate of the pixel electrode 21 and the common electrode 22 is R=α. Furthermore, an example is given in FIG. 3 in which the common electrode 22 is formed on the gate insulating film 12; however, as shown in FIG. 6, the common electrode 22 may be formed on the first substrate 2 and the pixel electrode 21 may be provided via the gate insulating film 12. The electrode width 1 of the pixel electrode 21, the electrode width n of the common electrode 22, and the inter-electrode distance R are preferably appropriately adjusted to a width such that all the liquid crystal molecules in the liquid crystal layer 5 can be driven by the generated electric field.

In addition, as shown in FIG. 7, a pixel electrode 41 and a common electrode 42 may be provided in a state of being meshed while spaced apart on the same surface. Also in the FFS type display element having the structure shown in FIG. 7, the distance R between the electrodes in the horizontal direction on the substrate is formed to be smaller than the distance G between the first substrate 2 and the second substrate 7.

In addition, the second electrode layer 7 of the FFS type liquid crystal display element described with reference to FIG. 1 to FIG. 6 is shown as an example of a planar electrode formed on substantially the entire surface of the second substrate 8; however, an electrode having a comb shape or a slit may be formed on the second substrate 8.

Since the FFS mode liquid crystal display element according to the present invention uses a specific liquid crystal composition, it is possible to achieve both a high-speed response and suppression of display failure at the same time.

In addition, in the FFS mode liquid crystal display element, when injecting the liquid crystal layer 5 between the first substrate 2 and the second substrate 7, for example, a vacuum injection method, a one drop fill (ODF) method, or the like is performed; however, in the present embodiment, in the ODF method, it is possible to suppress the occurrence of drip marks when the liquid crystal composition is dropped onto the substrate. Note that, a drip mark is defined as a phenomenon in which a white mark appears where the liquid crystal composition is dropped when black is displayed.

Although the occurrence of drip marks is greatly affected by the liquid crystal material to be injected, it is not possible to avoid the influence thereof even through the configuration of the display element. In the FFS mode liquid crystal display element, for the thin film transistor formed in the display element, the pixel electrode 21 having a comb shape or a slit, and the like, since there is no member separating the liquid crystal composition except for the thin alignment film 4 or the thin alignment film 4, the thin insulating protective layer 18, and the like, there is a high possibility that it is not possible to completely block the ionic substance, and it is not possible to avoid the generation of drip marks due to the interaction between the metal material forming the electrode and the liquid crystal composition; however, by using a combination of the liquid crystal composition of the present invention in an FFS type liquid crystal display element, the occurrence of drip marks is able to be effectively suppressed.

In addition, in the manufacturing steps of the liquid crystal display element using the ODF method, it is necessary to drop an optimum amount of injected liquid according to the size of the liquid crystal display element; however, for example, with the liquid crystal composition of the present invention, since the influence with respect to sudden pressure changes or impacts in the dripping apparatus generated when dripping the liquid crystal is small and it is possible to continue stably dripping the liquid crystal over a long period, it is also possible to keep the yield of the liquid crystal display element high. In particular, for small liquid crystal display elements frequently used in smartphones which have recently come into wide use, control of the deviations from an optimum value within a certain range is itself difficult due to the optimum amount of injected liquid crystal being small; however, by using the liquid crystal composition of the present invention, it is possible to realize a stable discharging amount of the liquid crystal material even in small liquid crystal display elements.

EXAMPLES

Hereinafter, the present invention will be described in more detail with examples, and the present invention is not limited to the examples. In addition, "%" in the compositions of the following examples and comparative examples means "% by mass".

In the examples, the measured characteristics are as follows.

$T_{NI}$: nematic phase-isotropic liquid phase transition temperature (° C.)

Δn: refractive index anisotropy at 25° C.

Δε: dielectric anisotropy at 25° C.

η: viscosity (mPa·s) at 20° C.

$γ_1$: rotational viscosity (mPa·s) at 25° C.

VHR: voltage holding ratio (%) at 60° C. under the conditions of a frequency of 60 Hz and an applied voltage of 1 V.

Burn-in:

After displaying a predetermined fixed pattern in the display area for 1,000 hours, by visually inspecting the residual image level of the fixed pattern at the time when full screen was uniformly displayed, the evaluation of the burn-in on a liquid crystal display element was performed on a scale of four stages described below.

A: Residual image was not observed

B: Residual image was very slightly observed, however it was an acceptable level C: Residual image was observed, and it was an unacceptable level D: Residual image was observed, and it was a very severe level Drip Marks:

By visually observing drip marks appeared in white when the entire screen was displayed in black, the evaluation of the drip marks on a liquid crystal display device was performed on a scale of four stages described below.

A: Residual image was not observed

B: Residual image was very slightly observed, however it was an acceptable level C: Residual image was observed, and it was an unacceptable level D: Residual image was observed, and it was a very severe level Process Adaptability:

In ODF process, dropping the liquid crystal by 50 pL at one time was performed 100,000 times using a constant volume measuring pump, and the change in amount of liquid crystal dropped by each 100 times of the following "0 to 100 times, 101 to 200 times, 201 to 300 times, . . . , 99,901 to 100,000 times" was evaluated on a scale of four stages described below.

A: Change was extremely small (liquid crystal display element could be stably prepared)

B: Change was slightly observed, but it was an acceptable level

C: Change was observed, and it was an unacceptable level (yield was deteriorated by generation of spots)

D: Change was observed, and it was a very severe level (liquid crystal leakage or vacuum bubbles were generated)

Solubility at Low Temperatures:

After preparing a liquid crystal composition, 1 g of the liquid crystal composition was weighed and placed in a sample bottle of 2 mL, the temperature change having one cycle of "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid crystal composition was visually observed, and the solubility evaluation at low temperatures was performed on a scale of four stages described below.

A: Precipitates were not observed for equal to or longer than 600 hours.

B: Precipitates were not observed for equal to or longer than 300 hours.

C: Precipitates were observed within 150 hours.

D: Precipitates were observed within 75 hours.

Moreover, in the examples, the following abbreviations were used for describing the compounds.

(Side Chain)

-n —$C_nH_{2n+1}$ linear alkyl group having n carbon atoms

-On —$OC_nH_{2n+1}$ linear alkoxy group having n carbon atoms

—V —$CH=CH_2$ vinyl group

-Vn —$CH=C-C_nH_{2n+1}$ 1-alkene having (n+1) carbon atoms (Linking Group)
—$CF_2O$—  —$CF_2$—O—
—$OCF_2$—  —O—$CF_2$—
-1O—  —$CH_2$—O—
—O1-  —O—$CH_2$—
—COO—  —COO—

(Ring Structure)

[Chem. 71]

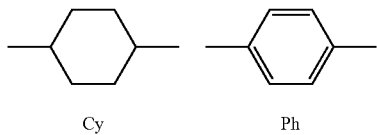

Cy   Ph

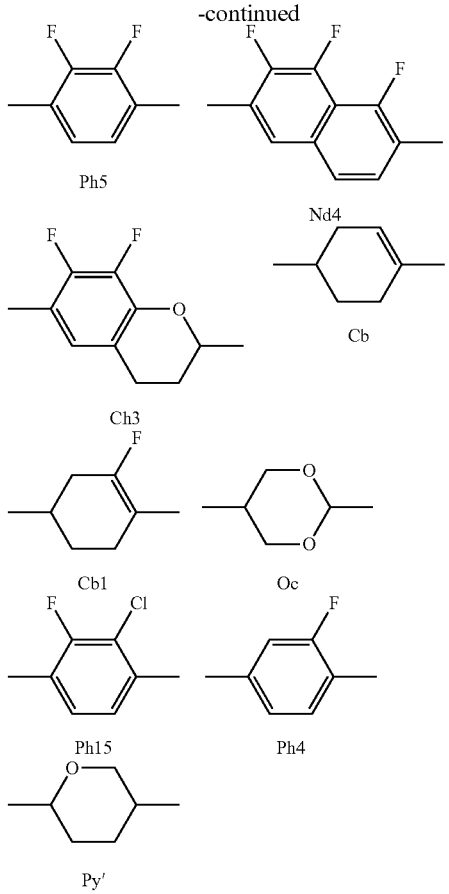

Example 1 (Liquid Crystal Composition 1)

The liquid crystal composition (liquid crystal composition 1) having the compositional ratio described below was prepared, and the physical properties thereof were measured. The results are shown in the following Table.

Using the liquid crystal composition 1, an FFS mode liquid crystal display element was produced having a cell thickness of 3.0 μm, which is common for TVs, and having electrode layers on the first substrate and the second substrate. The injection of the liquid crystal composition was carried out by a dripping method, and evaluations of burn-in, drip marks, process adaptability, and solubility at low temperature were carried out.

The references on the left side of the content are abbreviations of the compounds described above.

[Chem. 72]

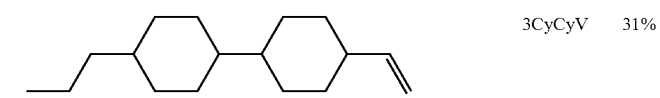

3CyCyV    31%

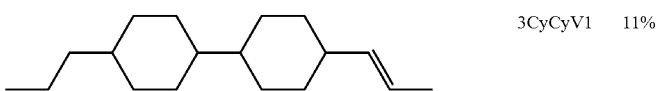

3CyCyV1    11%

-continued

[Chem. 72]

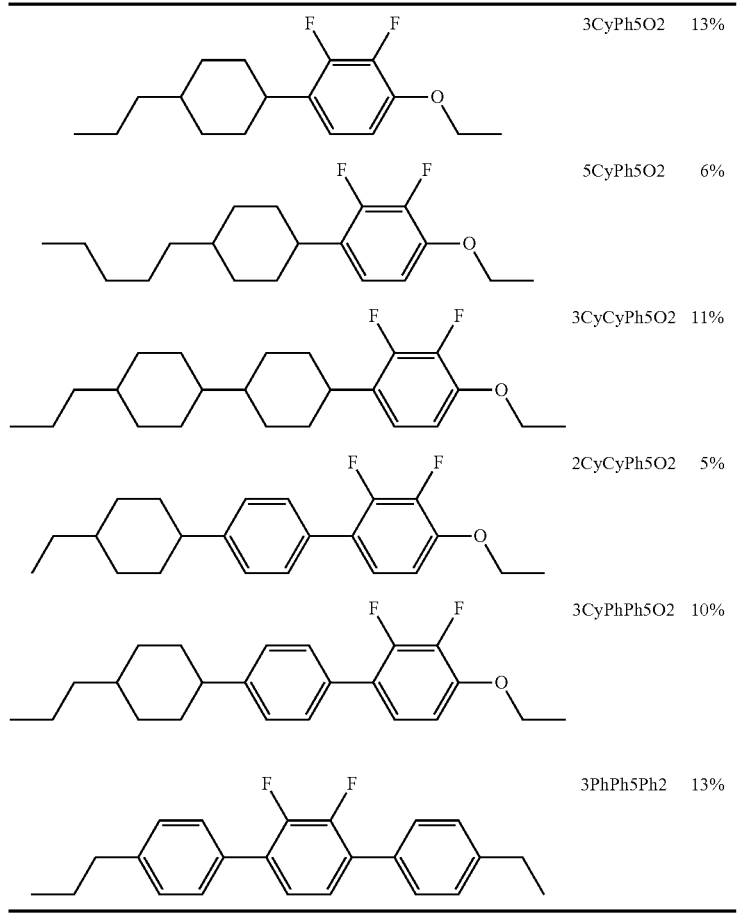

3CyPh5O2 13%

5CyPh5O2 6%

3CyCyPh5O2 11%

2CyCyPh5O2 5%

3CyPhPh5O2 10%

3PhPh5Ph2 13%

Example 1

TABLE 1

| | |
|---|---|
| $T_{NI}/°C$ | 75.6 |
| $\Delta n$ | 0.109 |
| $n_o$ | 1.483 |
| $\Delta\varepsilon$ | −3.07 |
| $\varepsilon_\perp$ | 6.62 |
| $\eta/mPa \cdot s$ | 15.2 |
| $\gamma_1/mPa \cdot s$ | 98 |
| $\gamma_1/\Delta n^2 \times 10^{-3}$ | 8.2 |
| $\gamma_1/\Delta n^2/|\Delta\varepsilon|$ | 2.69 |
| Initial voltage holding ratio % | 99.6 |
| Voltage holding ratio % after 1 hour at 150° C. | 99.0 |
| Burn in evaluation | A |
| Drip mark evaluation | A |
| Process adaptability evaluation | A |
| Solubility at low temperature evaluation | A |

The liquid crystal composition 1 has a $T_{NI}$ of 75.6° C., which is practical in terms of a liquid crystal composition for a TV, has a large $\Delta\varepsilon$ absolute value, a low $\eta$, and an optimum $\Delta n$. An FFS mode liquid crystal display element was produced using the liquid crystal composition 1 and evaluated for burn-in, drip marks, process adaptability, and solubility at low temperature using the method described above, and the evaluation results were extremely excellent.

In addition, a liquid crystal display element prepared under a polarizing microscope was installed and, when a voltage was applied in this state and observation was carried out, the driving was confirmed in a state where the liquid crystal molecules were uniformly aligned without unevenness. In addition, improvements in transmittance and contrast were confirmed in the measurement of electro-optical characteristics.

Example 2 (Liquid Crystal Composition 2)

A liquid crystal composition (liquid crystal composition 2) having the following composition having the following composition designed to have an equivalent $T_{NI}$, an equivalent $\Delta n$ value, and an equivalent $\Delta\varepsilon$ value to those of liquid crystal composition 1 was prepared, and the physical property values thereof were measured. The results are shown in the following table.

Using the liquid crystal composition 2, an FFS mode liquid crystal display element was produced in the same manner as in Example 1, and the results of evaluations of burn-in, drip mark, process adaptability, and solubility at low temperature are shown in the same table.

TABLE 2

| | |
|---|---|
| 3CyCyV | 32% |
| 3CyCyV1 | 12% |
| 3CyCyPh1 | 4% |
| 3CyPh5O2 | 7% |
| 3PnPh5O2 | 10% |
| 3CyCyPh5O2 | 10% |
| 4CyCyPh5O2 | 2% |
| 2CyPhPh5O2 | 5% |
| 3CyPhPh5O2 | 8% |
| 3PhPh5Ph2 | 5% |
| 4PhPh5Ph2 | 5% |
| $T_{NI}/°$ C. | 76.6 |
| $\Delta n$ | 0.110 |
| $n_o$ | 1.485 |
| $\Delta\varepsilon$ | −3.03 |
| $\varepsilon_\perp$ | 6.36 |
| $\eta$/mPa · s | 13.6 |
| $\gamma_1$/mPa · s | 90 |
| $\gamma 1/\Delta n^2 \times 10^{-3}$ | 7.4 |
| $\gamma_1/\Delta n^2/|\Delta\varepsilon|$ | 2.45 |
| Initial voltage holding ratio % | 99.5 |
| Voltage holding ratio % after 1 hour at 150° C. | 99.0 |
| Burn in evaluation | A |
| Drip mark evaluation | A |
| Process adaptability evaluation | A |
| Solubility at low temperature evaluation | A |

Example 2

It is understood that the liquid crystal composition 2 has a practical liquid crystal phase temperature range in terms of a liquid crystal composition for TVs, has a large dielectric anisotropy absolute value, and has a low viscosity and an optimum Δn. An FFS mode liquid crystal display element was produced using the liquid crystal composition 2 in the same manner as in Example 1 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Example 3 (Liquid Crystal Composition 3)

A liquid crystal composition (liquid crystal composition 3) having the following composition designed to have an equivalent $T_{NI}$, an equivalent Δn value, and an equivalent Δε value to those of the liquid crystal compositions 1 and 2 was prepared, and the physical property values thereof were measured. The results are shown in the following table.

Using the liquid crystal composition 3, an FFS mode liquid crystal display element was produced in the same manner as in Example 1, and the results of evaluations of burn-in, drip mark, process adaptability, and solubility at low temperature are shown in the same table.

TABLE 3

| | |
|---|---|
| 3CyCyV | 35% |
| 3CyCyV1 | 12% |
| 3CyCyPh1 | 2% |
| 3CyPhPh2 | 6% |
| 3CyPh5O2 | 4% |
| 3PhPh5O2 | 10% |
| 5PhPh5O2 | 4% |
| 3CyCyPh5O2 | 3% |
| 2CyPhPh5O2 | 12% |
| 3CyPhPh5O2 | 12% |
| $T_{NI}/°$ C. | 76.1 |
| $\Delta n$ | 0.110 |
| $n_o$ | 1.486 |
| $\Delta\varepsilon$ | −3.09 |
| $\varepsilon_\perp$ | 6.45 |
| $\eta$/mPa · s | 12.2 |
| $\gamma_1$/mPa · s | 81 |
| $\gamma 1/\Delta n^2 \times 10^{-3}$ | 6.7 |
| $\gamma_1/\Delta n^2/|\Delta\varepsilon|$ | 2.17 |
| Initial voltage holding ratio % | 99.6 |
| Voltage holding ratio % after 1 hour at 150° C. | 99.2 |
| Burn in evaluation | A |
| Drip mark evaluation | A |
| Process adaptability evaluation | A |
| Solubility at low temperature evaluation | A |

Example 3

It is understood that the liquid crystal composition 3 has a practical $T_{NI}$ in terms of a liquid crystal composition for TVs, has a large Δε absolute value, and has low η and an optimum Δn. An FFS mode liquid crystal display element was produced using the liquid crystal composition 3 in the same manner as in Example 1 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Comparative Examples 1 to 3

Using the liquid crystal compositions 1 to 3, vertically aligned liquid crystal display elements (VA mode liquid crystal display elements) having a cell thickness of 3.5 μm, which is commonly used for TVs, were produced.

The transmissivity, the contrast ratio, and the response speed were compared for the FFS mode liquid crystal display elements produced in Examples 1 to 3 and the VA mode liquid crystal display elements produced in Comparative Examples 1 to 3, respectively. The results are shown below. The transmittances of the liquid crystal display elements of Examples 1 to 3 and Comparative Examples 1 to 3 are the values when the transmittance of the element before injection of the liquid crystal composition in each mode is taken as 100%.

TABLE 4

|  | Example 1 | Comparative Example 1 | Example 2 | Comparative Example 2 | Example 3 | Comparative Example 3 |
|---|---|---|---|---|---|---|
| Display mode | n-FFS | VA | n-FFS | VA | n-FFS | VA |
| Used liquid crystal composition | Liquid crystal composition 1 | | Liquid crystal composition 2 | | Liquid crystal composition 3 | |
| Maximum transmittance | 89% | 87% | 90% | 86% | 90% | 87% |
| Contrast ratio | 289 | 280 | 293 | 277 | 302 | 288 |
| Response speed/ms | 4.7 | 8.3 | 4.4 | 7.6 | 3.7 | 6.6 |

The FFS mode display elements (Examples 1 to 3) produced using the liquid crystal compositions 1 to 3 exhibited excellent characteristics in all of the maximum transmittance, the contrast ratio, and the response speed compared with VA mode liquid crystal display elements (Comparative Examples 1 to 3) prepared using the same liquid crystal compositions respectively.

In an FFS mode liquid crystal display element in which liquid crystal molecules are aligned in parallel to the substrate and a fringe electric field is generated, basic liquid crystal characteristics are required which are different from VA mode liquid crystal display elements where the liquid crystal molecules are aligned to be orthogonal to the substrate and an electric field is generated vertically. By containing the compounds of General Formula (I) and General Formula (II) in which the liquid crystal compositions 1 to 3 are essential components of the present invention, an improvement in the transmittance which is a large feature of the FFS mode is achieved without impairing the basic characteristics as a liquid crystal display element. On the other hand, due to these differences in the FFS mode, effects such as burn-in and drip marks are hard to predict using conventional knowledge. The liquid crystal display element of the present invention also exhibits good characteristics in these points.

Example 4 (Liquid Crystal Composition 4)

A liquid crystal composition (liquid crystal composition 4) having the following composition designed to have an equivalent $T_{NI}$, an equivalent $\Delta n$ value, and an equivalent $\Delta \varepsilon$ value to those of the compositions 1 to 3 was prepared, and the physical property values thereof were measured. The results are shown in the following table.

TABLE 5

| 3CyCy2 | 25% |
|---|---|
| 3CyCy4 | 8% |
| 3CyCy5 | 5% |
| 3CyPh5O2 | 10% |
| 5CyPh5O2 | 9% |
| 3CyCyPh5O2 | 11% |
| 2CyPhPh5O2 | 10% |
| 3CyPhPh5O2 | 11% |
| 3PhPh5Ph2 | 5% |
| 4PhPh5Ph2 | 6% |
| $T_{NI}$/° C. | 75.9 |
| $\Delta n$ | 0.104 |
| $n_o$ | 1.483 |
| $\Delta \varepsilon$ | -3.06 |
| $\varepsilon_\perp$ | 6.56 |
| $\eta$/mPa · s | 19.9 |
| $\gamma_1$/mPa · s | 137 |
| $\gamma_1/\Delta n^2 \times 10^{-3}$ | 12.7 |
| $\gamma_1/\Delta n^2/|\Delta \varepsilon|$ | 4.14 |

Example 4

It is understood that the liquid crystal composition 4 has a practical $T_{NI}$ in terms of a liquid crystal composition for TVs, has a large $\Delta \varepsilon$ absolute value, and has low $\eta$ and an optimum $\Delta n$. When an FFS mode liquid crystal display element was produced using the liquid crystal composition 4, excellent display characteristics equivalent to those in Examples 1 to 3 were exhibited. In addition, when the prepared liquid crystal display element was subjected to polarizing microscopic observation and electro-optical characteristic measurement in the same manner as in Example 1, the evaluation results were excellent.

Example 5 (Liquid Crystal Composition 5)

A liquid crystal composition (liquid crystal composition 5) having the following composition designed to have an equivalent $T_{NI}$, an equivalent $\Delta n$ value, and an equivalent $\Delta \varepsilon$ value to those of the liquid crystal compositions 1 to 4 was prepared, and the physical property values thereof were measured. The results are shown in the following table.

TABLE 6

| 3CyCy2 | 25% |
|---|---|
| 3CyCy4 | 10% |
| 3CyCy5 | 5% |
| 3CyPh5O2 | 8% |
| 3PhPh5O2 | 9% |
| 3CyCyPh5O2 | 12% |
| 4CyCyPh5O2 | 2% |
| 2CyPhPh5O2 | 9% |
| 3CyPhPh5O2 | 9% |
| 3PhPh5Ph2 | 5% |
| 4PhPh5Ph2 | 6% |
| $T_{NI}$/° C. | 75.8 |
| $\Delta n$ | 0.108 |
| $n_o$ | 1.485 |
| $\Delta \varepsilon$ | -3.17 |
| $\varepsilon_\perp$ | 6.53 |
| $\eta$/mPa · s | 18.5 |
| $\gamma_1$/mPa · s | 131 |
| $\gamma_1/\Delta n^2 \times 10^{-3}$ | 11.2 |
| $\gamma_1/\Delta n^2/|\Delta \varepsilon|$ | 3.54 |

Example 5

It is understood that the liquid crystal composition 5 has a practical $T_{NI}$ in terms of a liquid crystal composition for TVs, has a large $\Delta \varepsilon$ absolute value, and has low viscosity $\eta$ and an optimum $\Delta n$. When an FFS mode liquid crystal display element was produced using the liquid crystal composition 5, excellent display characteristics equivalent to those in Examples 1 to 3 were exhibited. In addition, when the prepared liquid crystal display element was subjected to polarizing microscopic observation and electro-optical characteristic measurement in the same manner as in Example 1, the evaluation results were excellent.

Example 6 (Liquid Crystal Composition 6)

A liquid crystal composition (liquid crystal composition 6) having the following composition designed to have an equivalent $T_{NI}$, an equivalent Δn value, and an equivalent Δε value to those of the liquid crystal compositions 1 to 5 was prepared, and the physical property values thereof were measured. The results are shown in the following table.

TABLE 7

| | |
|---|---|
| 3CyCy2 | 25% |
| 3CyCy4 | 10% |
| 3CyCy5 | 6% |
| 3CyCyPh1 | 10% |
| 3CyPh5O2 | 5% |
| 3PhPh5O2 | 10% |
| 5PhPh5O2 | 4% |
| 3CyCyPh5O2 | 6% |
| 2CyPhPh5O2 | 12% |
| 3CyPhPh5O2 | 12% |
| $T_{NI}$/° C. | 78.1 |
| Δn | 0.101 |
| $n_o$ | 1.484 |
| Δε | −3.00 |
| $ε_⊥$ | 6.22 |
| η/mPa · s | 15.9 |
| $γ_1$/mPa · s | 111 |
| $γ1/Δn^2 × 10^{−3}$ | 10.9 |
| $γ_1/Δn^2/|Δε|$ | 3.63 |

Example 6

It is understood that the liquid crystal composition 6 has a practical $T_{NI}$ in terms of a liquid crystal composition for TVs, has a large Δε absolute value, and has low viscosity η and an optimum Δn. When an FFS mode liquid crystal display element was produced using the liquid crystal composition 6, excellent display characteristics equivalent to those in Examples 1 to 3 were exhibited. In addition, when the prepared liquid crystal display element was subjected to polarizing microscopic observation and electro-optical characteristic measurement in the same manner as in Example 1, the evaluation results were excellent.

Example 7 (Liquid Crystal Composition 7)

A liquid crystal composition (liquid crystal composition 7) having the following composition designed to have an equivalent Δn value, and a higher $T_{NI}$ and Δε value to those of the liquid crystal compositions 1 to 6 was prepared, and the physical property values thereof were measured. The results are shown in the following table. Using the liquid crystal composition 7, an FFS mode liquid crystal display element was produced in the same manner as in Example 1, and the results of evaluations of burn-in, drip mark, process adaptability, and solubility at low temperature are shown in the same table.

TABLE 8

| | |
|---|---|
| 3CyCyV | 24% |
| 3CyCyV1 | 10% |
| 3CyPh5O2 | 12% |
| 5CyPh5O2 | 8% |
| 3CyCyPh5O2 | 10% |
| 3CyCyPh5O3 | 8% |

TABLE 8-continued

| | |
|---|---|
| 4CyCyPh5O2 | 10% |
| 2CyPhPh5O2 | 5% |
| 3CyPhPh5O2 | 5% |
| 3PhPh5Ph2 | 8% |
| $T_{NI}$/° C. | 86.0 |
| Δn | 0.103 |
| $n_o$ | 1.481 |
| Δε | −3.95 |
| $ε_⊥$ | 7.76 |
| η/mPa · s | 21.8 |
| $γ_1$/mPa · s | 134 |
| $γ1/Δn^2 × 10^{−3}$ | 12.6 |
| $γ_1/Δn^2/|Δε|$ | 3.20 |
| Initial voltage holding ratio % | 99.9 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

Example 7

It is understood that the liquid crystal composition 7 has a practical $T_{NI}$ in terms of a liquid crystal composition for TVs, has a large Δε absolute value, and has low viscosity η and an optimum Δn. An FFS mode liquid crystal display element was produced using the liquid crystal composition 7 in the same manner as in Example 1 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Example 8 (Liquid Crystal Composition 8)

A liquid crystal composition (liquid crystal composition 8) having the following composition designed to have an equivalent $T_{NI}$, an equivalent Δn value, and an equivalent Δε value to those of the liquid crystal composition 7 was prepared, and the physical property values thereof were measured. The results are shown in the following table. Using the liquid crystal composition 8, an FFS mode liquid crystal display element was produced in the same manner as in Example 1, and the results of evaluations of burn-in, drip mark, process adaptability, and solubility at low temperature are shown in the same table.

TABLE 9

| | |
|---|---|
| 3CyCyV | 20% |
| 3CyCyV1 | 10% |
| 3CyCyPh1 | 7% |
| 3CyPh5O2 | 12% |
| 5CyPh5O2 | 6% |
| 3PhPh5O2 | 5% |
| 3CyCyPh5O2 | 12% |
| 3CyCyPh5O3 | 6% |
| 4CyCyPh5O2 | 10% |
| 2CyPhPh5O2 | 6% |
| 3PhPh5Ph2 | 6% |
| $T_{NI}$/° C. | 85.6 |
| Δn | 0.103 |
| $n_o$ | 1.482 |

TABLE 9-continued

| | |
|---|---|
| $\Delta\varepsilon$ | −4.05 |
| $\varepsilon_\perp$ | 7.74 |
| $\eta$/mPa · s | 21.2 |
| $\gamma_1$/mPa · s | 128 |
| $\gamma_1/\Delta n^2 \times 10^{-3}$ | 12.1 |
| $\gamma_1/\Delta n^2/|\Delta\varepsilon|$ | 2.98 |
| Initial voltage holding ratio % | 99.9 |
| Voltage holding ratio % after 1 hour at 150° C. | 99.5 |
| Burn in evaluation | A |
| Drip mark evaluation | A |
| Process adaptability evaluation | A |
| Solubility at low temperature evaluation | A |

Example 8

It is understood that the liquid crystal composition 8 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 8 in the same manner as in Example 1 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Example 9 (Liquid Crystal Composition 9)

A liquid crystal composition (liquid crystal composition 9) having the following composition designed to have an equivalent $T_{NI}$, an equivalent $\Delta n$ value, and an equivalent $\Delta\varepsilon$ value to those of the liquid crystal compositions 7 and 8 was prepared, and the physical property values thereof were measured. The results are shown in the following table. Using the liquid crystal composition 9, an FFS mode liquid crystal display element was produced in the same manner as in Example 1, and the results of evaluations of burn-in, drip mark, process adaptability, and solubility at low temperature are shown in the same table.

TABLE 10

| | |
|---|---|
| 3CyCyV | 23% |
| 3CyCyV1 | 10% |
| 3CyCyPh1 | 10% |
| 3CyPh5O2 | 10% |
| 5CyPh5O2 | 4% |
| 3PhPh5O2 | 8% |
| 3CyCyPh5O2 | 12% |
| 4CyCyPh5O2 | 7% |
| 2CyPhPh5O2 | 8% |
| 3CyPhPh5O2 | 8% |
| $T_{NI}$/° C. | 86.2 |
| $\Delta n$ | 0.103 |
| $n_o$ | 1.483 |
| $\Delta\varepsilon$ | −3.96 |
| $\varepsilon_\perp$ | 7.56 |
| $\eta$/mPa · s | 18.7 |
| $\gamma_1$/mPa · s | 112 |
| $\gamma_1/\Delta n^2 \times 10^{-3}$ | 10.6 |
| $\gamma_1/\Delta n^2/|\Delta\varepsilon|$ | 2.67 |
| Initial voltage holding ratio % | 99.8 |
| Voltage holding ratio % after 1 hour at 150° C. | 99.3 |
| Burn in evaluation | A |
| Drip mark evaluation | A |
| Process adaptability evaluation | A |
| Solubility at low temperature evaluation | A |

Example 9

It is understood that the liquid crystal composition 9 has a practical $T_{N1}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 9 in the same manner as in Example 1 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Comparative Examples 4 to 6

Using the liquid crystal compositions 7 to 9, VA mode liquid crystal display elements were produced in the same manner as in Comparative Examples 1 to 3.

The transmissivity, the contrast ratio, and the response speed were compared for the FFS mode liquid crystal display elements produced in Examples 7 to 9 and the VA mode liquid crystal display elements produced in Comparative Examples 4 to 6, respectively. The results are shown below.

TABLE 11

| | Example 7 | Comparative Example 4 | Example 8 | Comparative Example 5 | Example 9 | Comparative Example 6 |
|---|---|---|---|---|---|---|
| Display mode | n-FFS | VA | n-FFS | VA | n-FFS | VA |
| Used liquid crystal composition | Liquid crystal composition 7 | Liquid crystal composition 7 | Liquid crystal composition 8 | Liquid crystal composition 8 | Liquid crystal composition 9 | Liquid crystal composition 9 |
| Maximum transmittance | 88% | 85% | 88% | 86% | 89% | 87% |
| Contrast ratio | 278 | 268 | 285 | 265 | 294 | 260 |
| Response speed/ms | 7.4 | 13.0 | 7.1 | 12.7 | 6.5 | 10.8 |

The FFS mode display elements (Examples 7 to 9) produced using the liquid crystal compositions 7 to 9 exhibited excellent characteristics in all of the maximum transmittance, the contrast ratio, and the response speed compared with VA mode liquid crystal display elements (Comparative Examples 4 to 6) prepared using the same liquid crystal compositions respectively.

Example 10 (Liquid Crystal Composition 10)

A liquid crystal composition (liquid crystal composition 10) having the following composition designed to have an equivalent $T_{NI}$, an equivalent $\Delta n$ value, and an equivalent $\Delta \varepsilon$ value to those of the liquid crystal compositions 7 to 9 was prepared, and the physical property values thereof were measured. The results are shown in the following table.

TABLE 12

| | |
|---|---|
| 3CyCy2 | 22% |
| 3CyCy4 | 4% |
| 3CyCyPh1 | 4% |
| 3CyPh5O2 | 12% |
| 5CyPh5O2 | 10% |
| 3CyCyPh5O2 | 10% |
| 3CyCyPh5O3 | 6% |
| 4CyCyPh5O2 | 9% |
| 2CyPhPh5O2 | 8% |
| 3CyPhPh5O2 | 8% |
| 3PhPh5Ph2 | 4% |
| 4PhPh5Ph2 | 3% |
| $T_{NI}/°$ C. | 85.7 |
| $\Delta n$ | 0.103 |
| $n_o$ | 1.482 |
| $\Delta \varepsilon$ | −4.08 |
| $\varepsilon_\perp$ | 7.92 |
| $\eta/mPa \cdot s$ | 26.6 |
| $\gamma_1/mPa \cdot s$ | 172 |
| $\gamma_1/\Delta n^2 \times 10^{-3}$ | 16.2 |
| $\gamma_1/\Delta n^2/|\Delta \varepsilon|$ | 3.97 |

Example 10

It is understood that the liquid crystal composition 10 has a practical $T_{NI}$ in terms of a liquid crystal composition for TVs, has a large $\Delta \varepsilon$ absolute value, and has low viscosity $\eta$ and an optimum $\Delta n$. An FFS mode liquid crystal display element was produced using the liquid crystal composition 10 and, when the burn-in, drip mark, process adaptability, and solubility at low temperature were evaluated using the method described above, the evaluation results were excellent. In addition, when the prepared liquid crystal display element was subjected to polarizing microscopic observation and electro-optical characteristic measurement in the same manner as in Example 1, the evaluation results were excellent.

Example 11 (Liquid Crystal Composition 11)

A liquid crystal composition having the following composition designed to have an equivalent $T_{N1}$, an equivalent $\Delta n$ value, and an equivalent $\Delta \varepsilon$ value to those of the liquid crystal compositions 7 to 10 was prepared, and the physical property values thereof were measured. The results are shown in the following table.

TABLE 13

| | |
|---|---|
| 3CyCy2 | 24% |
| 3CyCy4 | 8% |
| 3CyPh5O2 | 9% |
| 3PhPh5O2 | 8% |
| 3CyCyPh5O2 | 12% |
| 3CyCyPh5O3 | 10% |
| 4CyCyPh5O2 | 10% |
| 2CyPhPh5O2 | 6% |
| 3CyPhPh5O2 | 6% |
| 3PhPh5Ph2 | 4% |
| 4PhPh5Ph2 | 3% |
| $T_{NI}/°$ C. | 86.0 |
| $\Delta n$ | 0.103 |
| $n_o$ | 1.483 |
| $\Delta \varepsilon$ | −4.03 |
| $\varepsilon_\perp$ | 7.67 |
| $\eta/mPa \cdot s$ | 24.3 |
| $\gamma_1/mPa \cdot s$ | 164 |
| $\gamma_1/\Delta n^2 \times 10^{-3}$ | 15.5 |
| $\gamma_1/\Delta n^2/|\Delta \varepsilon|$ | 3.84 |

Example 11

It is understood that the liquid crystal composition 11 has a practical $T_{NI}$ in terms of a liquid crystal composition for TVs, has a large $\Delta \varepsilon$ absolute value, and has low viscosity $\eta$ and an optimum $\Delta n$. An FFS mode liquid crystal display element was produced using the liquid crystal composition 11 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 12 (Liquid Crystal Composition 12)

A liquid crystal composition (liquid crystal composition 12) having the following composition designed to have an equivalent $T_{NI}$, an equivalent $\Delta n$ value, and an equivalent $\Delta \varepsilon$ value to those of the liquid crystal compositions 7 to 11 was prepared, and the physical property values thereof were measured. The results are shown in the following table.

TABLE 14

| | |
|---|---|
| 3CyCy2 | 24% |
| 3CyCy4 | 5% |
| 3CyCyPh1 | 9% |
| 3CyPh5O2 | 10% |
| 5CyPh5O2 | 3% |
| 3PhPh5O2 | 8% |
| 3CyCyPh5O2 | 10% |
| 4CyCyPh5O2 | 9% |
| 2CyPhPh5O2 | 11% |
| 3CyPhPh5O2 | 11% |
| $T_{NI}/°$ C. | 86.0 |
| $\Delta n$ | 0.103 |
| $n_o$ | 1.484 |
| $\Delta \varepsilon$ | −4.03 |
| $\varepsilon_\perp$ | 7.69 |
| $\eta/mPa \cdot s$ | 22.5 |
| $\gamma_1/mPa \cdot s$ | 145 |
| $\gamma_1/\Delta n^2 \times 10^{-3}$ | 13.7 |
| $\gamma_1/\Delta n^2/|\Delta \varepsilon|$ | 3.39 |

Example 12

It is understood that the liquid crystal composition 12 has a practical $T_{NI}$ in terms of a liquid crystal composition for TVs, has a large Δε absolute value, and has low viscosity η and an optimum Δn. An FFS mode liquid crystal display element was produced using the liquid crystal composition 12 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 13 (Liquid Crystal Composition 13)

A liquid crystal composition (liquid crystal composition 13) having the following composition designed to have an equivalent $T_{NI}$, an equivalent Δn value, and an equivalent Δε value to those of the liquid crystal compositions 7 to 12 was prepared, and the physical property values thereof were measured. The results are shown in the following table.

TABLE 15

| | |
|---|---|
| 3CyCyV | 20% |
| 3CyCyV1 | 10% |
| 3CyCyPh1 | 7% |
| 3CyPhPh2 | 3% |
| 3CyPh5O2 | 13% |
| 5CyPh5O2 | 12% |
| 3CyCyPh5O2 | 10% |
| 4CyCyPh5O2 | 5% |
| 2CyPhPh5O2 | 10% |
| 3CyPhPh5O2 | 10% |
| $T_{NI}/°$ C. | 85.8 |
| Δn | 0.103 |
| $n_o$ | 1.482 |
| Δε | −4.02 |
| $\varepsilon_\perp$ | 7.82 |
| η/mPa · s | 20.9 |
| $\gamma_1$/mPa · s | 123 |
| $\gamma_1/\Delta n^2 \times 10^{-3}$ | 11.6 |
| $\gamma_1/\Delta n^2/|\Delta\varepsilon|$ | 2.88 |

Example 13

It is understood that the liquid crystal composition 13 has a practical $T_{NI}$ in terms of a liquid crystal composition for TVs, has a large Δε absolute value, and has low viscosity η and an optimum Δn. An FFS mode liquid crystal display element was produced using the liquid crystal composition 13 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 14 (Liquid Crystal Composition 14)

A liquid crystal composition (liquid crystal composition 14) having the following composition designed to have an equivalent $T_{NI}$, an equivalent Δn value, and an equivalent Δε value to those of the liquid crystal compositions 7 to 13 was prepared, and the physical property values thereof were measured. The results are shown in the following table.

TABLE 16

| | |
|---|---|
| 3CyCy2 | 22% |
| 3CyCy4 | 3% |
| 3CyCyPh1 | 7% |
| 3CyCyPh2 | 4% |
| 3CyPh5O2 | 13% |
| 5CyPh5O2 | 12% |
| 3CyCyPh5O2 | 9% |
| 4CyCyPh5O2 | 6% |
| 2CyPhPh5O2 | 12% |
| 3CyPhPh5O2 | 12% |
| $T_{NI}/°$ C. | 85.0 |
| Δn | 0.103 |
| $n_o$ | 1.483 |
| Δε | −4.04 |
| $\varepsilon_\perp$ | 7.88 |
| η/mPa · s | 24.3 |
| $\gamma_1$/mPa · s | 152 |
| $\gamma_1/\Delta n^2 \times 10^{-3}$ | 14.3 |
| $\gamma_1/\Delta n^2/|\Delta\varepsilon|$ | 3.55 |

Example 14

It is understood that the liquid crystal composition 14 has a practical $T_{NI}$ in terms of a liquid crystal composition for TVs, has a large Δε absolute value, and has low viscosity η and an optimum Δn. An FFS mode liquid crystal display element was produced using the liquid crystal composition 14 in the same manner as Example 1 and evaluated for burn-in, drip marks, process adaptability, and solubility at low temperature using the method described above, and the evaluation results were excellent.

Example 15 (Liquid Crystal Composition 15)

A liquid crystal composition (liquid crystal composition 15) having the following composition was prepared and the physical property values thereof were measured. The results are shown in the following table. Using the liquid crystal composition 15, an FFS mode liquid crystal display element was produced in the same manner as in Example 1, and the results of evaluations of burn-in, drip mark, process adaptability, and solubility at low temperature are shown in the same table.

[Chem. 73]

| | |
|---|---|
| 3-Cy—Cy—V | 23% |
| 3-Cy—Cy—V1 | 10% |

-continued

[Chem. 73]

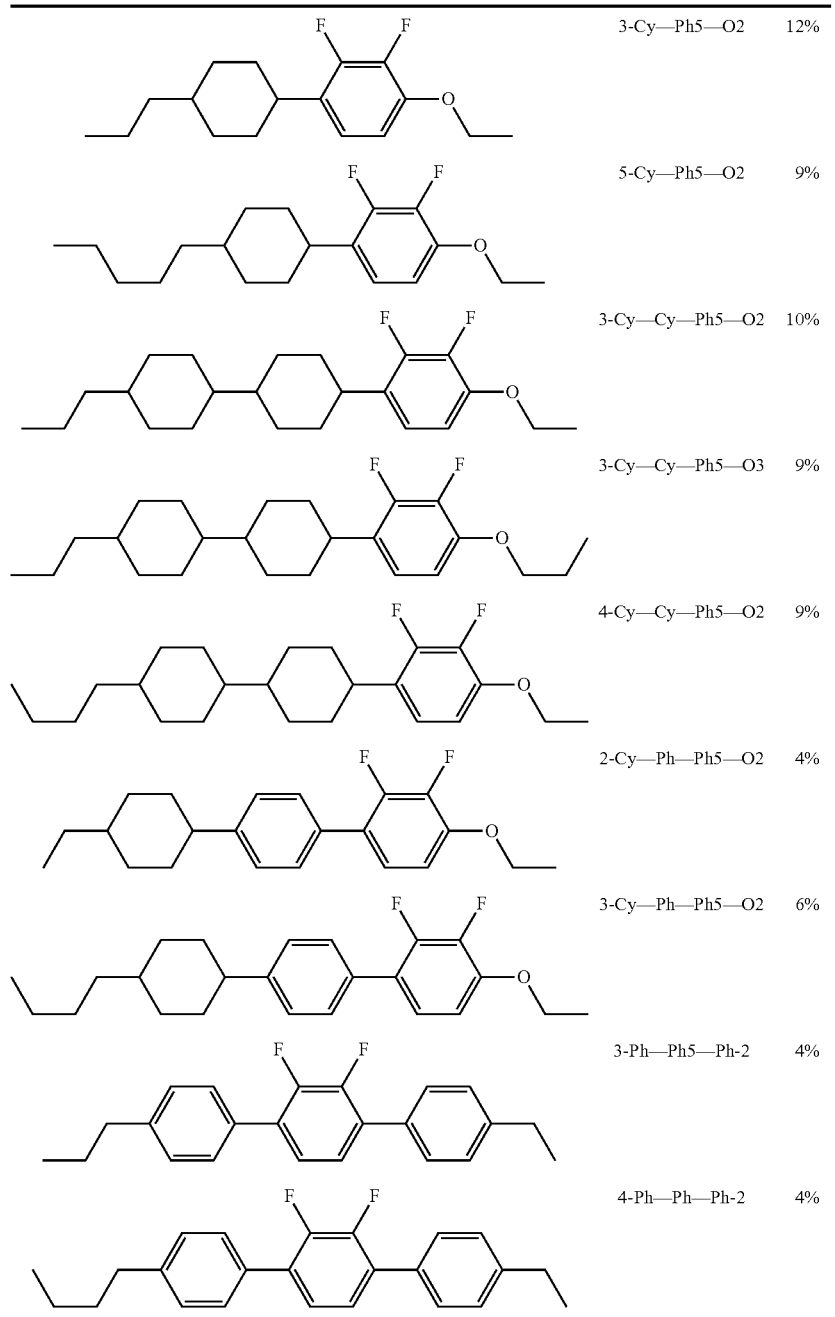

| | |
|---|---|
| 3-Cy—Ph5—O2 | 12% |
| 5-Cy—Ph5—O2 | 9% |
| 3-Cy—Cy—Ph5—O2 | 10% |
| 3-Cy—Cy—Ph5—O3 | 9% |
| 4-Cy—Cy—Ph5—O2 | 9% |
| 2-Cy—Ph—Ph5—O2 | 4% |
| 3-Cy—Ph—Ph5—O2 | 6% |
| 3-Ph—Ph5—Ph-2 | 4% |
| 4-Ph—Ph—Ph-2 | 4% |

TABLE 17

| | |
|---|---|
| $T_{NI}/°$ C. | 85.3 |
| Δn | 0.103 |
| Δε | −4.04 |
| η/mPa · s | 22.4 |
| $γ_1$/mPa · s | 137 |
| $γ_1/Δn^2 × 10^{-3}$ | 12.9 |
| $γ_1/Δn^2/|Δε|$ | 3.20 |
| Initial voltage holding ratio % | 99.9 |
| Voltage holding ratio % after 1 hour at 150° C. | 99.5 |

TABLE 17-continued

| | |
|---|---|
| Burn in evaluation | A |
| Drip mark evaluation | A |
| Process adaptability evaluation | A |
| Solubility at low temperature evaluation | A |

It is understood that the liquid crystal composition 15 has a practical $T_{NI}$ of 85.3° C. in terms of a liquid crystal composition for TVs, has a large Δε absolute value, and has low viscosity η and an optimum Δn. An FFS mode liquid crystal display element was produced using the liquid crystal composition 1 and evaluated for burn-in, drip marks, process adaptability, and solubility at low temperature using the method described above, and the evaluation results were extremely excellent. In addition, when the prepared liquid crystal display element was subjected to polarizing microscopic observation and electro-optical characteristic measurement in the same manner as in Example 1, the evaluation results were excellent.

Example 16 (Liquid Crystal Composition 16)

A liquid crystal composition (liquid crystal composition 16) having the following composition designed to have an equivalent $T_{NI}$, an equivalent $\Delta n$ value, and an equivalent $\Delta\varepsilon$ value to those of the liquid crystal composition 15 was prepared, and the physical property values thereof were measured. The results are shown in the following table. An FFS mode liquid crystal display element was produced using the liquid crystal composition 16 in the same manner as in Example 1, and the results of evaluations of burn-in, drip marks, process adaptability and solubility at low temperature are shown in the same table.

TABLE 18

| | |
|---|---|
| 3CyCyV | 22% |
| 3CyCyV1 | 10% |
| 3CyCyPh1 | 5% |
| 3CyPh5O2 | 12% |
| 5CyPh5O2 | 5% |
| 3CyCyPh5O2 | 11% |
| 3CyCyPh5O3 | 7% |
| 4CyCyPh5O2 | 11% |
| 2CyPhPh5O2 | 2% |
| 3CyPhPh5O2 | 4% |
| 3PhPh5O2 | 5% |
| 3PhPh5Ph2 | 6% |
| $T_{NI}/°$ C. | 86.0 |
| $\Delta n$ | 0.102 |
| $\Delta\varepsilon$ | −4.00 |
| $\eta$/mPa·s | 20.6 |
| $\gamma_1$/mPa·s | 125 |
| $\gamma_1/\Delta n^2 \times 10^{-3}$ | 12.0 |
| $\gamma_1/\Delta n^2/|\Delta\varepsilon|$ | 3.00 |
| Initial voltage holding ratio % | 99.8 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 16 has a practical liquid crystal phase temperature range in terms of a liquid crystal composition for TVs, has a large dielectric anisotropy absolute value, and has a low viscosity and an optimum $\Delta n$. An FFS mode liquid crystal display element was produced using the liquid crystal composition 16 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 17 (Liquid Crystal Composition 17)

A liquid crystal composition (liquid crystal composition 17) having the following composition designed to have an equivalent $T_{NI}$, an equivalent $\Delta n$ value, and an equivalent $\Delta\varepsilon$ value to those of the liquid crystal compositions 15 and 16 was prepared, and the physical property values thereof were measured. The results are shown in the following table. An FFS mode liquid crystal display element was produced using the liquid crystal composition 17 in the same manner as in Example 1, and the results of evaluations of burn-in, drip mark, process adaptability, and solubility at low temperature are shown in the same table.

TABLE 19

| | |
|---|---|
| 3CyCyV | 24% |
| 3CyCyV1 | 10% |
| 3CyCyPh1 | 9% |
| 3CyPh5O2 | 10% |
| 5CyPh5O2 | 4% |
| 3CyCyPh5O2 | 11% |
| 4CyCyPh5O2 | 8% |
| 2CyPhPh5O2 | 7% |
| 3CyPhPh5O2 | 9% |
| 3PhPh5O2 | 8% |
| $T_{NI}/°$ C. | 85.5 |
| $\Delta n$ | 0.102 |
| $\Delta\varepsilon$ | −3.95 |
| $\eta$/mPa·s | 18.3 |
| $\gamma_1$/mPa·s | 110 |
| $\gamma_1/\Delta n^2 \times 10^{-3}$ | 10.6 |
| $\gamma_1/\Delta n^2/|\Delta\varepsilon|$ | 2.68 |
| Initial voltage holding ratio % | 99.8 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 17 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 17 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Comparative Examples 7 to 9

VA mode liquid crystal display elements were produced using liquid crystal compositions 15 to 17 in the same manner as in Comparative Examples 1 to 3.

The transmissivity, the contrast ratio, and the response speed were compared for the FFS mode liquid crystal display elements produced in Examples 15 to 17 and the VA mode liquid crystal display elements prepared in Comparative Examples 7 to 9, respectively. The results are shown below.

TABLE 20

|  | Example 15 | Comparative Example 7 | Example 16 | Comparative Example 8 | Example 17 | Comparative Example 9 |
|---|---|---|---|---|---|---|
| Display mode | n-FFS | VA | n-FFS | VA | n-FFS | VA |
| Used liquid crystal composition | Liquid crystal composition 15 | | Liquid crystal composition 16 | | Liquid crystal composition 17 | |
| Maximum transmittance | 89% | 86% | 87% | 85% | 86% | 84% |
| Contrast ratio | 275 | 261 | 280 | 263 | 291 | 257 |
| Response speed/ms | 7.2 | 12.5 | 6.8 | 12.3 | 6.2 | 10.1 |

The FFS mode display elements (Examples 15 to 17) produced using the liquid crystal compositions 15 to 17 exhibited excellent characteristics in all of the maximum transmittance, the contrast ratio, and the response speed compared with VA mode liquid crystal display elements (Comparative Examples 7 to 9) prepared using the same liquid crystal compositions respectively.

In an FFS mode liquid crystal display element in which liquid crystal molecules are aligned in parallel to the substrate and a fringe electric field is generated, basic liquid crystal characteristics are required which are different from VA mode liquid crystal display elements where the liquid crystal molecules are aligned to be orthogonal to the substrate and an electric field is generated vertically. By the liquid crystal compositions 15 to 17 containing the essential components of the present invention, an improvement in the transmittance which is a large feature of the FFS mode is achieved without impairing the basic characteristics as a liquid crystal display element. On the other hand, due to these differences in the FFS mode, effects such as burn-in and drip marks are hard to predict using conventional knowledge. The liquid crystal display element of the present invention also exhibits good characteristics in these points.

Example 18 (Liquid Crystal Composition 18)

A liquid crystal composition (liquid crystal composition 18) having the following composition designed to have an equivalent $T_{NI}$, an equivalent $\Delta n$ value, and an equivalent $\Delta \varepsilon$ value to those of the liquid crystal compositions 15 to 17 was prepared, and the physical property values thereof were measured. The results are shown in the following table.

TABLE 21

| 3CyCy2 | 23% |
|---|---|
| 3CyCy4 | 3% |
| 3CyCyPh1 | 4% |
| 3CyPh5O2 | 11% |
| 5CyPh5O2 | 11% |
| 3CyCyPh5O2 | 10% |
| 3CyCyPh5O3 | 5% |
| 4CyCyPh5O2 | 10% |
| 2CyPhPh5O2 | 7% |
| 3CyPhPh5O2 | 9% |
| 3PhPh5Ph2 | 3% |
| 4PhPh5Ph2 | 4% |
| $T_{NI}/°$ C. | 85.7 |
| $\Delta n$ | 0.103 |
| $\Delta \varepsilon$ | −4.06 |
| $\eta$/mPa · s | 26.5 |
| $\gamma_1$/mPa · s | 173 |
| $\gamma_1/\Delta n^2 \times 10^{-3}$ | 16.3 |
| $\gamma_1/\Delta n^2/|\Delta \varepsilon|$ | 4.02 |

It is understood that the liquid crystal composition 18 has a practical $T_{NI}$ in terms of a liquid crystal composition for TVs, has a large $\Delta \varepsilon$ absolute value, and has low viscosity $\eta$ and an optimum $\Delta n$. When an FFS mode liquid crystal display element was produced using the liquid crystal composition 18, excellent display characteristics equivalent to those in Examples 15 to 17 were exhibited. In addition, when the prepared liquid crystal display element was subjected to polarizing microscopic observation and electro-optical characteristic measurement in the same manner as in Example 1, the evaluation results were excellent.

Example 19 (Liquid Crystal Composition 19)

A liquid crystal composition (liquid crystal composition 19) having the following composition designed to have an equivalent $T_{NI}$, an equivalent $\Delta n$ value, and an equivalent $\Delta \varepsilon$ value to those of the liquid crystal compositions 15 to 18 was prepared, and the physical property values thereof were measured. The results are shown in the following table.

TABLE 22

| 3CyCy2 | 25% |
|---|---|
| 3CyCy4 | 7% |
| 3CyCy5O2 | 7% |
| 5CyPh5O2 | 2% |
| 3CyCyPhO2 | 11% |
| 3CyCyPh5O3 | 10% |
| 4CyCyPh5O2 | 11% |
| 2CyPhPh5O2 | 5% |
| 3CyPhPh5O2 | 7% |
| 3PhPh5O2 | 8% |
| 3PhPh5Ph2 | 3% |
| 4PhPh5Ph2 | 4% |
| $T_{NI}/°$ C. | 86.2 |
| $\Delta n$ | 0.103 |
| $\Delta \varepsilon$ | −3.99 |
| $\eta$/mPa · s | 24.4 |
| $\gamma_1$/mPa · s | 166 |
| $\gamma_1/\Delta n^2 \times 10^{-3}$ | 15.6 |
| $\gamma_1/\Delta n^2/|\Delta \varepsilon|$ | 3.92 |

It is understood that the liquid crystal composition 19 has a practical $T_{NI}$ in terms of a liquid crystal composition for TVs, has a large $\Delta \varepsilon$ absolute value, and has low viscosity $\eta$ and an optimum $\Delta n$. When an FFS mode liquid crystal display element was produced using the liquid crystal composition 19, excellent display characteristics equivalent to those in Examples 15 to 17 were exhibited. In addition, when the prepared liquid crystal display element was subjected to polarizing microscopic observation and electro-optical characteristic measurement in the same manner as in Example 1, the evaluation results were excellent.

Example 20 (Liquid Crystal Composition 20)

A liquid crystal composition (liquid crystal composition 20) having the following composition designed to have an equivalent $T_{NI}$, an equivalent Δn value, and an equivalent Δε value to those of the liquid crystal compositions 15 to 19 was prepared, and the physical property values thereof were measured. The results are shown in the following table.

TABLE 23

| | |
|---|---|
| 3CyCy2 | 25% |
| 3CyCy4 | 4% |
| 3CyCyPh1 | 9% |
| 3CyPh5O2 | 8% |
| 5CyPh5O2 | 5% |
| 3CyCyPh5O2 | 8% |
| 3CyCyPh5O3 | 2% |
| 4CyCyPh5O2 | 9% |
| 2CyPhPh5O2 | 10% |
| 3CyPhPh5O2 | 12% |
| 3PhPh5Ph2 | 8% |
| $T_{NI}/°$ C. | 86.2 |
| Δn | 0.103 |
| Δε | −4.00 |
| η/mPa·s | 22.5 |
| $γ_1$/mPa·s | 147 |
| $γ_1/Δn^2 × 10^{-3}$ | 13.9 |
| $γ_1/Δn^2/|Δε|$ | 3.46 |

It is understood that the liquid crystal composition 20 has a practical $T_{NI}$ in terms of a liquid crystal composition for TVs, has a large Δε absolute value, and has low viscosity η and an optimum Δn. When an FFS mode liquid crystal display element was produced using the liquid crystal composition 20, excellent display characteristics equivalent to those in Examples 15 to 17 were exhibited. In addition, when the prepared liquid crystal display element was subjected to polarizing microscopic observation and electro-optical characteristic measurement in the same manner as in Example 1, the evaluation results were excellent.

Example 21 (Liquid Crystal Composition 21)

A liquid crystal composition (liquid crystal composition 21) having the following composition designed to have an equivalent $T_{NI}$, an equivalent Δn value, and an equivalent Δε value to those of the liquid crystal compositions 15 to 20 was prepared, and the physical property values thereof were measured. The results are shown in the following table. Using the liquid crystal composition 21, an FFS mode liquid crystal display element was produced in the same manner as in Example 1, and the results of evaluations of burn-in, drip mark, process adaptability, and solubility at low temperature are shown in the same table.

TABLE 24

| | |
|---|---|
| 3CyCyV | 17% |
| 3CyCyV1 | 10% |
| 3PhPh1 | 5% |
| 3CyCyPh1 | 2% |
| 3CyPh5O2 | 12% |
| 5CyPh5O2 | 7% |
| 3CyCyPh5O2 | 10% |
| 3CyCyPh5O3 | 9% |
| 4CyCyPh5O2 | 10% |
| 2CyPhPh5O2 | 4% |
| 3CyPhPh5O2 | 6% |
| 3PhPh5Ph2 | 4% |
| 4PhPh5Ph2 | 4% |
| $T_{NI}/°$ C. | 85.7 |
| Δn | 0.110 |
| Δε | −3.87 |
| η/mPa·s | 23.4 |
| $γ_1$/mPa·s | 153 |
| $γ_1/Δn^2 × 10^{-3}$ | 12.6 |

TABLE 24-continued

| | |
|---|---|
| $γ_1/Δn^2/|Δε|$ | 3.27 |
| Initial voltage holding ratio % | 99.7 |
| Voltage holding ratio % after 1 hour at 150° C. | 99.3 |
| Burn in evaluation | A |
| Drip mark evaluation | A |
| Process adaptability evaluation | A |
| Solubility at low temperature evaluation | A |

It is understood that the liquid crystal composition 21 has a practical $T_{NI}$ in terms of a liquid crystal composition for TVs, has a large Δε absolute value, and has low viscosity η and an optimum Δn. An FFS mode liquid crystal display element was produced using the liquid crystal composition 21 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 22 (Liquid Crystal Composition 22)

A liquid crystal composition (liquid crystal composition 22) having the following composition designed to have an equivalent $T_{NI}$, an equivalent Δn value, and an equivalent Δε value to those of the liquid crystal compositions 15 to 21 was prepared, and the physical property values thereof were measured. The results are shown in the following table. Using the liquid crystal composition 22, an FFS mode liquid crystal display element was produced in the same manner as in Example 1, and the results of evaluations of burn-in, drip mark, process adaptability, and solubility at low temperature are shown in the same table.

TABLE 25

| | |
|---|---|
| 3CyCyV | 16% |
| 3CyCyv1 | 10% |
| 3PhPh1 | 5% |
| 3CyCyPh1 | 6% |
| 3CyPh5O2 | 10% |
| 5CyPh5O2 | 5% |
| 3CyCyPh5O2 | 11% |
| 3CyCyPh5O3 | 9% |
| 4CyCyPh5O2 | 11% |
| 2CyPhPh5O2 | 2% |
| 3CyPhPh5O2 | 4% |
| 3PhPh5O2 | 5% |
| 3PhPh5Ph2 | 6% |
| $T_{NI}/°$ C. | 86.5 |
| Δn | 0.110 |
| Δε | −3.90 |
| η/mPa·s | 22.0 |
| $γ_1$/mPa·s | 144 |
| $γ_1/Δn^2 × 10^{-3}$ | 11.9 |
| $γ_1/Δn^2/|Δε|$ | 3.05 |
| Initial voltage holding ratio % | 99.7 |
| Voltage holding ratio % after 1 hour at 150° C. | 99.4 |
| Burn in evaluation | A |
| Drip mark evaluation | A |
| Process adaptability evaluation | A |
| Solubility at low temperature evaluation | A |

It is understood that the liquid crystal composition 22 has a practical $T_{NI}$ in terms of a liquid crystal composition for TVs, has a large Δε absolute value, and has low viscosity η and an optimum Δn. An FFS mode liquid crystal display element was produced using the liquid crystal composition 22 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 23 (Liquid Crystal Composition 23)

A liquid crystal composition (liquid crystal composition 23) having the following composition designed to have an equivalent $T_{NI}$, an equivalent Δn value, and an equivalent Δε value to those of the liquid crystal compositions 15 to 22 was prepared, and the physical property values thereof were measured. The results are shown in the following table.

TABLE 26

| | |
|---|---|
| 3CyCyV | 19% |
| 3CyCyV1 | 10% |
| 3PhPh1 | 5% |
| 3CyCyPh1 | 9% |
| 3CyPh5O2 | 8% |
| 5CyPh5O2 | 3% |
| 3CyCyPh5O2 | 11% |
| 3CyCyPh5O3 | 2% |
| 4CyCyPh5O2 | 9% |
| 2CyPhPh5O2 | 7% |
| 3CyPhPh5O2 | 9% |
| 3PhPh5O2 | 8% |
| $T_{NI}/°$ C. | 86.5 |
| Δn | 0.109 |
| Δε | −3.84 |
| η/mPa · s | 19.5 |
| $γ_1$/mPa · s | 126 |
| $γ_1/Δn^2 \times 10^{-3}$ | 10.6 |
| $γ_1/Δn^2/|Δε|$ | 2.76 |
| Initial voltage holding ratio % | 99.6 |
| Voltage holding ratio % after 1 hour at 150° C. | 99.2 |
| Burn in evaluation | A |
| Drip mark evaluation | A |
| Process adaptability evaluation | A |
| Solubility at low temperature evaluation | A |

It is understood that the liquid crystal composition 23 has a practical $T_{NI}$ in terms of a liquid crystal composition for TVs, has a large Δε absolute value, and has low viscosity η and an optimum Δn. An FFS mode liquid crystal display element was produced using the liquid crystal composition 23 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Comparative Examples 10 to 12

VA mode liquid crystal display elements were produced using liquid crystal compositions 21 to 23 in the same manner as in Comparative Examples 1 to 3.

The transmissivity, the contrast ratio, and the response speed were compared for the FFS mode liquid crystal display elements produced in Examples 21 to 23 and the VA mode liquid crystal display elements prepared in Comparative Examples 10 to 12, respectively. The results are shown below.

TABLE 27

| | Example 21 | Comparative Example 10 | Example 22 | Comparative Example 11 | Example 23 | Comparative Example 12 |
|---|---|---|---|---|---|---|
| Display mode | n-FFS | VA | n-FFS | VA | n-FFS | VA |
| Used liquid crystal composition | Liquid crystal composition 21 | | Liquid crystal composition 22 | | Liquid crystal composition 23 | |
| Maximum transmittance % | 88% | 85% | 88% | 86% | 89% | 87% |
| Contrast ratio | 279 | 263 | 786 | 264 | 295 | 259 |
| Response speed/ms | 8.0 | 13.0 | 6.1 | 12.1 | 5.8 | 9.5 |

The FFS mode display elements (Examples 21 to 23) produced using the liquid crystal compositions 21 to 23 exhibited excellent characteristics in all of the maximum transmittance, the contrast ratio, and the response speed compared with VA mode liquid crystal display elements (Comparative Examples 10 to 12) prepared using the same liquid crystal compositions respectively.

Example 24 (Liquid Crystal Composition 24)

A liquid crystal composition (liquid crystal composition 24) having the following composition designed to have an equivalent $T_{NI}$, an equivalent Δn value, and an equivalent Δε value to those of the liquid crystal compositions 15 to 23 was prepared, and the physical property values thereof were measured. The results are shown in the following table.

TABLE 28

| | |
|---|---|
| 3CyCy2 | 18% |
| 3CyCy4 | 3% |
| 3PhPh1 | 5% |
| 3CyCyPh1 | 4% |
| 3CyPh5O2 | 11% |
| 5CyPh5O2 | 9% |
| 3CyCyPh5O2 | 10% |
| 3CyCyPh5O3 | 7% |
| 4CyCyPh5O2 | 10% |
| 2CyPhPh5O2 | 7% |
| 3CyPhPh5O2 | 9% |
| 3PhPh5Ph2 | 3% |
| 4PhPh5Ph2 | 4% |
| $T_{NI}/°$ C. | 85.5 |
| Δn | 0.111 |
| Δε | −4.03 |
| η/mPa · s | 27.6 |

TABLE 28-continued

| | |
|---|---|
| $\gamma_1$/mPa·s | 188 |
| $\gamma_1/\Delta n^2 \times 10^{-3}$ | 15.3 |
| $\gamma_1/\Delta n^2/|\Delta\varepsilon|$ | 3.79 |

It is understood that the liquid crystal composition 24 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 24 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 25 (Liquid Crystal Composition 25)

A liquid crystal composition having the following composition designed to have an equivalent $T_{NI}$, an equivalent $\Delta n$ value, and an equivalent $\Delta\varepsilon$ value to those of the liquid crystal compositions 15 to 24 was prepared, and the physical property values thereof were measured. The results are shown in the following table.

TABLE 29

| | |
|---|---|
| 3CyCy2 | 20% |
| 3CyCy4 | 5% |
| 3PhPh1 | 5% |
| 3CyCyPh1 | 2% |
| 3CyPh5O2 | 7% |
| 5CyPh5O2 | 4% |
| 3CyCyPh5O2 | 11% |
| 3CyCyPh5O3 | 10% |
| 4CyCyPh5O2 | 11% |
| 2CyPhPh5O2 | 5% |
| 3CyPhPh5O2 | 7% |
| 3PhPh5O2 | 6% |
| 3PhPh5Ph2 | 3% |
| 4PhPh5Ph2 | 4% |
| $T_{NI}/°$ C. | 85.3 |
| $\Delta n$ | 0.110 |
| $\Delta\varepsilon$ | −3.94 |
| $\eta$/mPa·s | 25.5 |
| $\gamma_1$/mPa·s | 180 |
| $\gamma_1/\Delta n^2 \times 10^{-3}$ | 14.9 |
| $\gamma_1/\Delta n^2/|\Delta\varepsilon|$ | 3.78 |

It is understood that the liquid crystal composition 25 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced Using the liquid crystal composition 25 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Example 26 (Liquid Crystal Composition 26)

A liquid crystal composition (liquid crystal composition 26) having the following composition designed to have an equivalent $T_{NI}$, an equivalent $\Delta n$ value, and an equivalent $\Delta\varepsilon$ value to those of the liquid crystal compositions 15 to 25 was prepared, and the physical property values thereof were measured. The results are shown in the following table.

TABLE 30

| | |
|---|---|
| 3CyCy2 | 20% |
| 3CyCy4 | 3% |
| 3PhPh1 | 5% |
| 3CyCyPh1 | 10% |
| 3CyPh5O2 | 8% |
| 5CyPh5O2 | 5% |
| 3CyCyPh5O2 | 8% |
| 3CyCyPh5O3 | 3% |
| 4CyCyPh5O2 | 9% |
| 2CyPhPh5O2 | 10% |
| 3CyPhPh5O2 | 12% |
| 3PhPh5O2 | 7% |
| $T_{NI}/°$ C. | 85.7 |
| $\Delta n$ | 0.110 |
| $\Delta\varepsilon$ | −3.96 |
| $\eta$/mPa·s | 23.5 |
| $\gamma_1$/mPa·s | 160 |
| $\gamma_1/\Delta n^2 \times 10^{-3}$ | 13.2 |
| $\gamma_1/\Delta n^2/|\Delta\varepsilon|$ | 3.34 |

It is understood that the liquid crystal composition 26 has a practical $T_{NI}$ in terms of a liquid crystal composition for TVs, has a large $\Delta\varepsilon$ absolute value, and has low viscosity $\eta$ and an optimum $\Delta n$. An FFS mode liquid crystal display element was produced using the liquid crystal composition 26 in the same manner as Example 1 and evaluated for burn-in, drip marks, process adaptability, and solubility at low temperature using the method described above, and the evaluation results were excellent. In addition, when the prepared liquid crystal display element was subjected to polarizing microscopic observation and electro-optical characteristic measurement in the same manner as in Example 1, the evaluation results were excellent.

Examples 27 to 35 (Liquid Crystal Compositions 27 to 35)

Liquid crystal compositions (liquid crystal compositions 27 to 35) having the following compositions were prepared and the physical property values thereof were measured. The results are shown in the following table. Using the liquid crystal compositions 27 to 35, an FFS mode liquid crystal display element was produced in the same manner as in Example 1, and the results of evaluations of burn-in, drip mark, process adaptability, and solubility at low temperature are shown in the same table.

TABLE 31

| | Example 27 | Example 28 | Example 29 | Example 30 | Example 31 | Example 32 | Example 33 | Example 34 | Example 35 |
|---|---|---|---|---|---|---|---|---|---|
| $T_{NI}/°$ C. | 84.4 | 84.4 | 84.3 | 84.2 | 84.1 | 74.3 | 74.9 | 74.9 | 74.1 |
| $\Delta n$ | 0.089 | 0.090 | 0.0892 | 0.0899 | 0.0896 | 0.0908 | 0.0908 | 0.0902 | 0.0895 |
| $\Delta\varepsilon$ | −3.9 | −4.0 | −4 | −4.01 | −3.98 | −3.92 | −3.99 | −3.91 | −3.89 |
| $\gamma 1$/mPa·s | 122 | 122 | 151 | 123 | 119 | 119 | 115 | 109 | 105 |

TABLE 31-continued

|  | Example 27 | Example 28 | Example 29 | Example 30 | Example 31 | Example 32 | Example 33 | Example 34 | Example 35 |
|---|---|---|---|---|---|---|---|---|---|
| η/mPa·s | 16.2 | 15.9 | 19.2 | 16.2 | 15.9 | 16.2 | 15.6 | 15 | 14.8 |
| $\gamma 1/\Delta n^2 \times 10^{-2}$ | 15.3 | 15.2 | 19.0 | 15.2 | 14.8 | 14.4 | 13.9 | 13.4 | 13.1 |
| 3CyCyV | 20 | 30 | 10 | 25 | 37.5 | 11 | 20 | 29 | 39 |
| 3CyCyVI | 7 | 5.5 | 7 | 6 |  | 7 | 7 | 5 |  |
| 2CyCyVI | 14 | 6 | 5 | 8 |  | 15 | 13 | 5 |  |
| 5CyCyV |  |  | 21 |  |  | 7 |  |  |  |
| 3CyCyPh2 |  | 1 |  | 4 | 4 | 3 |  | 4 | 2 |
| VCyPhPh3 | 5 |  | 2 | 1.5 | 2 | 3 | 2 | 2 |  |
| 1VCyPhPh3 | 3.5 | 5 | 3 | 4 | 4.5 |  | 3 |  | 4 |
| 3Cy-1O-Ph5O1 | 1 | 3 | 5 |  |  | 4 | 5 | 4 | 2 |
| 3-Cy-1O-Ph5O2 | 8 | 7.5 | 6 | 9 | 9 | 8 | 9 | 8 | 10 |
| 1VCy-1O-Ph5O1 | 2 |  | 3 | 3 | 3 | 4 | 2 | 3 | 3 |
| 1VCy-1O-Ph5O2 | 4 | 4 |  | 5 | 5 | 4 | 4 | 5 | 5 |
| 2CyCy-1O-Ph5O2 | 7 | 8 | 7 | 7 | 6 | 6 | 7 | 7 | 8 |
| 3CyCy-1O-Ph5O2 | 10 | 12 | 9 | 10.5 | 12 | 9 | 10 | 10 | 8 |
| VCyCy-1O-Ph5O2 | 5 | 4 | 4 | 4 | 4 | 4 | 4 | 4 | 5 |
| VCyCy-1O-Ph5O3 | 4 | 3 | 4 | 4 | 4 | 4 | 4 | 4 | 4 |
| 1VCyCy-1O-Ph5O1 | 4 | 3 | 4 | 4 | 4 |  |  |  |  |
| 1VCyCy-1O-Ph5O2 | 4.5 | 5 | 4 | 4 | 4 | 4 | 4 | 4 | 4 |
| 3PhPh5Ph1 |  |  | 6 | 1 | 1 |  | 2 | 2 | 2 |
| 3PhPh5Ph2 | 1 | 3 |  |  |  | 7 | 4 | 4 | 4 |
| Initial voltage holding ratio | 99.5 | 99.6 | 99 | 99.3 | 99.6 | 99.2 | 99.6 | 99.6 | 99.5 |
| Voltage holding ratio after 1 hour at 150° C. | 99.1 | 99.2 | 97.8 | 99 | 99.2 | 98.1 | 99.1 | 99.2 | 99.1 |
| Burn in evaluation | A | A | B | A | A | B | A | A | A |
| Drip mark | A | A | A | A | A | A | A | A | A |
| Process adaptability | A | A | A | A | A | A | A | A | A |
| Solubility at low temperature evaluation | A | A | C | A | A | C | A | A | A |

It is understood that the liquid crystal compositions 27 to 35 have a practical $T_{NI}$ in terms of a liquid crystal composition for TVs, have a large Δε absolute value, and have low viscosity η and an optimum Δn. An FFS mode liquid crystal display element was produced using the liquid crystal compositions 27 to 35 in the same manner as Example 1 and evaluated for voltage holding ratio, burn-in, drip marks, process adaptability, and solubility at low temperature using the method described above, and the evaluation results were extremely excellent. In addition, when the prepared liquid crystal display element was subjected to polarizing microscopic observation and electro-optical characteristic measurement in the same manner as in Example 1, the evaluation results were excellent.

Comparative Examples 13 to 21

VA mode liquid crystal display elements were produced using liquid crystal compositions 27 to 35 in the same manner as in Comparative Examples 1 to 3.

The transmissivity, the contrast ratio, and the response speed were compared for the FFS mode liquid crystal display elements produced in Examples 27 to 35 and the VA mode liquid crystal display elements prepared in Comparative Examples 13 to 21, respectively. The results are shown below.

TABLE 31

|  | Example 27 | Comparative Example 13 | Example 28 | Comparative Example 14 | Example 29 | Comparative Example 15 | Example 30 | Comparative Example 16 | Example 31 | Comparative Example 17 |
|---|---|---|---|---|---|---|---|---|---|---|
| Display mode | n-FFS | VA | n-FFS | VA | n-FFS | VA | n-FFS | VA | n-FFS | VA |
| Used liquid crystal composition | Liquid crystal composition 27 | | Liquid crystal composition 28 | | Liquid crystal composition 29 | | Liquid crystal composition 30 | | Liquid crystal composition 31 | |
| Maximum transmittance % | 92% | 88% | 93% | 89% | 92% | 89% | 92% | 89% | 93% | 88% |
| Contrast ratio | 548 | 463 | 562 | 497 | 596 | 528 | 560 | 495 | 545 | 491 |
| Response speed/ms | 5.3 | 8.5 | 5.2 | 8.4 | 6.2 | 9.8 | 5.3 | 8.6 | 5.2 | 8.5 |

TABLE 32

|  | Example 32 | Comparative Example 18 | Example 33 | Comparative Example 19 | Example 34 | Comparative Example 20 | Example 35 | Comparative Example 21 |
|---|---|---|---|---|---|---|---|---|
| Display mode | n-FFS | VA | n-FFS | VA | n-FFS | VA | n-FFS | VA |
| Used liquid crystal composition | Liquid crystal composition 32 | | Liquid crystal composition 33 | | Liquid crystal composition 34 | | Liquid crystal composition 35 | |
| Maximum transmittance % | 93% | 87% | 93% | 86% | 93% | 88% | 91% | 87% |

TABLE 32-continued

|  | Example 32 | Comparative Example 18 | Example 33 | Comparative Example 19 | Example 34 | Comparative Example 20 | Example 35 | Comparative Example 21 |
|---|---|---|---|---|---|---|---|---|
| Contrast ratio | 578 | 485 | 567 | 479 | 551 | 473 | 594 | 465 |
| Response speed/ms | 5.3 | 8.6 | 5.2 | 8.4 | 5.1 | 8.1 | 5 | 7.9 |

Examples 36 to 41 (Liquid Crystal Compositions 36 to 41)

Liquid crystal compositions (liquid crystal compositions 36 to 41) having the following composition designed to have an equivalent $T_{NI}$, an equivalent $\Delta n$ value, and an equivalent $\Delta \varepsilon$ value to those of the liquid crystal compositions 27 to 35 were prepared, and the physical property values thereof were measured. The results are shown in the following table. Using the liquid crystal compositions 36 to 41, an FFS mode liquid crystal display element was produced in the same manner as in Example 1, and the results of evaluations of burn-in, drip mark, process adaptability, and solubility at low temperature are shown in the same table.

TABLE 33

|  | Example 36 | Example 37 | Example 38 | Example 39 | Example 40 | Example 41 |
|---|---|---|---|---|---|---|
| $T_{NI}/°C$. | 84.8 | 85.6 | 75.8 | 74.9 | 75.8 | 75.8 |
| $\Delta n$ | 0.0898 | 0.0927 | 0.0897 | 0.0893 | 0.0906 | 0.0901 |
| $\Delta \varepsilon$ | −4 | −3.92 | −4 | −3.97 | −3.99 | −3.89 |
| $\gamma 1/mPa \cdot s$ | 124 | 122 | 111 | 105 | 127 | 120 |
| $\eta/mPa \cdot s$ | 14.8 | 15.1 | 14.1 | 13.8 | 15.5 | 15 |
| $\gamma 1/\Delta n^2 \times 10^{-2}$ | 15.4 | 14.2 | 13.8 | 13.2 | 15.5 | 14.8 |
| 3CyCyV | 20.0 | 33.0 | 20.0 | 36.0 | 20.0 | 35 |
| 3CyCyV1 | 8 | 7 | 8 | 6 | 4 |  |
| 2CyCyV1 | 15 |  | 15 |  | 12 |  |
| 3CyCyPh2 | 4 | 5 | 3 | 3 | 4 | 5 |
| VCyPhPh3 | 6 | 8 | 6 | 6 | 6 | 6 |
| 3Cy-1O-Ph5O1 |  |  | 2 | 2 |  |  |
| 3-Cy-1O-Ph5O2 | 6 | 6 | 6 | 6 | 6 | 6 |
| 1VCy-1O-Ph5O2 |  |  | 2 | 2 |  |  |
| 2CyCy-1O-Ph5O2 | 9 | 8 | 6 | 8 | 8 | 8 |
| 3CyCy-1O-Ph5O2 | 14 | 14 | 13 | 13 | 8 | 8 |
| VCyCy-1O-Ph5O2 | 3 | 3 | 2 | 2 |  |  |
| VCyCy-1O-Ph5O3 | 3 | 3 |  |  |  |  |
| 3PhPh5Ph2 | 3 | 2 | 4 | 4 | 3 | 3 |
| 3PhPh5O2 | 3 | 5 | 5 | 6 | 5 | 5 |
| 5PhPh5O2 | 3 | 3 | 3 | 3 | 3 | 3 |
| 3CyPy' Ph5O2 | 3 | 3 | 3 | 3 | 3 | 3 |
| 3Cy-2-Ph5O3 |  |  |  |  | 4 | 4 |
| 3Cy-2-Ph5O4 |  |  |  |  | 4 | 4 |
| 3CyCy-2-Ph5O3 |  |  |  |  | 5 | 5 |
| 3CyCy-2-Ph5O4 |  |  |  |  | 5 | 5 |
| Initial voltage holding ratio | 99.2 | 99.1 | 99.4 | 99.3 | 99.5 | 99.4 |
| Voltage holding ratio after 1 hour at 150° C. | 98 | 98.4 | 98.8 | 98.7 | 99.1 | 99.1 |
| Burn in evaluation | A | A | A | A | A | A |
| Drip mark | A | A | A | A | A | A |
| Process adaptability | A | A | A | A | A | A |
| Solubility at low temperature evaluation | B | B | B | B | B | B |

It is understood that the liquid crystal compositions 36 to 41 have a practical $T_{NI}$ in terms of a liquid crystal composition for TVs, has a large $\Delta \varepsilon$ absolute value, and has low viscosity $\eta$ and an optimum $\Delta n$. An FFS mode liquid crystal display element was produced using the liquid crystal compositions 36 to 41 in the same manner as Example 1 and evaluated for voltage holding ratio, burn-in, drip marks, process adaptability, and solubility at low temperature using the method described above, and the evaluation results were practical in terms of a liquid crystal composition for TVs. In addition, when the prepared liquid crystal display element was subjected to polarizing microscopic observation and electro-optical characteristic measurement in the same manner as in Example 1, the evaluation results were excellent.

Comparative Examples 22 to 27

VA mode liquid crystal display elements were produced using liquid crystal compositions 36 to 41 in the same manner as in Comparative Example 1.

The transmissivity, the contrast ratio, and the response speed were compared for the FFS mode liquid crystal display elements produced in Examples 36 to 41 and the VA mode liquid crystal display elements prepared in Comparative Examples 22 to 27, respectively. The results are shown below.

TABLE 34

|  | Example 36 | Comparative Example 22 | Example 37 | Comparative Example 23 | Example 38 | Comparative Example 24 |
|---|---|---|---|---|---|---|
| Display mode | n-FFS | VA | n-FFS | VA | n-FFS | VA |
| Used liquid crystal composition | Liquid crystal composition 36 | | Liquid crystal composition 37 | | Liquid crystal composition 38 | |
| Maximum transmittance (%) | 92% | 87% | 92% | 88% | 93% | 88% |
| Contrast ratio | 562 | 497 | 537 | 485 | 558 | 472 |
| Response speed/ms | 5.4 | 8.6 | 5.3 | 8.5 | 5.1 | 8 |

TABLE 35

|  | Example 39 | Comparative Example 25 | Example 40 | Comparative Example 26 | Example 41 | Comparative Example 27 |
|---|---|---|---|---|---|---|
| Display mode | n-FFS | VA | n-FFS | VA | n-FFS | VA |
| Used liquid crystal composition | Liquid crystal composition 39 | | Liquid crystal composition 40 | | Liquid crystal composition 41 | |
| Maximum transmittance (%) | 91% | 87% | 91% | 88% | 91% | 88% |
| Contrast ratio | 568 | 492 | 581 | 516 | 576 | 497 |
| Response speed/ms | 5.1 | 7.9 | 5.2 | 8.7 | 5.4 | 8.8 |

The FFS mode display elements (Examples 36 to 41) produced using the liquid crystal compositions 36 to 41 exhibited excellent characteristics in all of the maximum transmittance, the contrast ratio, and the response speed compared with VA mode liquid crystal display elements (Comparative Examples 22 to 27) prepared using the same liquid crystal compositions respectively.

Examples 42 to 49 (Liquid Crystal Compositions 42 to 49)

Liquid crystal compositions (liquid crystal compositions 42 to 49) having the following compositions were prepared, and the physical property values thereof were measured. The results are shown in the following table. Using the liquid crystal compositions 42 to 49, an FFS mode liquid crystal display element was produced in the same manner as in Example 1, and the results of evaluations of burn-in, drip mark, process adaptability, and solubility at low temperature are shown in the same table.

TABLE 36

|  | Example 42 | Example 43 | Example 44 | Example 45 | Example 46 | Example 47 | Example 48 | Example 49 |
|---|---|---|---|---|---|---|---|---|
| $T_{NI}/°C.$ | 84.1 | 84.3 | 84.2 | 85.5 | 85.5 | 85.1 | 85.5 | 84.6 |
| $\Delta n$ | 0.0908 | 0.09 | 0.0907 | 0.0908 | 0.1053 | 0.1049 | 0.1054 | 0.1046 |
| $\Delta \varepsilon$ | −4.09 | −4.09 | −4.07 | −4.05 | −4.01 | −3.94 | −3.97 | −4.02 |
| $\gamma 1/mPa \cdot s$ | 118 | 117 | 118 | 121 | 140 | 142 | 141 | 139 |
| $\eta/mPa \cdot s$ | 18.7 | 18.3 | 18.5 | 19.1 | 16.9 | 19.3 | 19.6 | 21.3 |
| $\gamma 1/\Delta n^2 \times 10^{-2}$ | 14.3 | 14.4 | 14.3 | 14.7 | 12.6 | 12.9 | 12.7 | 12.7 |
| 3CyCyV | 34.0 | 35.0 | 35.0 | 34.0 | 35 | 30 | 31 | 30 |
| VCyPhPh3 | 1 |  | 3 | 2 | 5 | 5 | 3 | 3 |
| 3Cy-1O-Ph5O1 |  |  |  |  | 3 | 4 |  |  |
| 3-Cy-1O-Ph5O2 |  | 3 | 5 | 1 | 12 | 7 | 6 | 3 |
| 2CyCy-1O-Ph5O2 |  |  |  |  | 8 | 4 |  |  |
| 3CyCy-1O-Ph5O2 |  | 13 |  | 1 | 8 | 10 | 8 |  |
| 1VCyCy-1O-Ph5O2 |  |  | 6 |  | 8 |  |  | 3 |
| 3PhPh5Ph2 |  |  |  |  | 6 | 7 | 5 | 4 |
| 3CYPhPh5O2 | 7 | 5 | 5 | 6 | 2 | 2 |  | 2 |
| 3CyPhPh5O4 | 7 | 5 | 5 | 6 | 2 | 2 |  | 2 |
| 2Ph-2-PhPh5O2 |  |  |  |  | 3 | 3 | 5 | 3 |

TABLE 36-continued

|  | Example 42 | Example 43 | Example 44 | Example 45 | Example 46 | Example 47 | Example 48 | Example 49 |
|---|---|---|---|---|---|---|---|---|
| 2Ph-2-PhPh5O3 |  |  |  |  | 3 |  | 5 | 3 |
| 3PhPh5O2 |  |  |  |  |  |  |  | 4 |
| 3CyPh5O2 | 6 | 3 | 7 | 6 |  | 2 |  | 4 |
| 3CyPh5O3 | 6 | 3 | 6 | 5 |  |  | 5 | 4 |
| 3CyPh5O4 | 6 |  |  | 5 |  |  |  | 3 |
| VCyPh5O2 |  | 5 |  |  |  | 5 | 5 |  |
| 1VCyPh5O2 |  | 5 |  |  |  |  |  |  |
| 2CyCyPh5O2 | 7 | 4 | 6 | 7 |  | 4 | 5 | 6 |
| 2CyCyPh5O3 | 6 | 4 | 5 | 7 |  | 5 | 5 | 6 |
| 3CyCyPh5O3 | 7 |  | 5 | 7 |  |  | 5 | 6 |
| 3CyCyPh5O4 | 7 | 5 | 6 | 7 | 2 | 5 | 6 | 6 |
| 4CyCyPh5O2 | 6 |  | 6 | 6 | 3 |  |  | 6 |
| VCyCyPh5O2 |  | 5 |  |  |  | 5 | 6 |  |
| 1VCyCyPh5O2 |  | 5 |  |  |  |  |  |  |
| Voltage holding ratio | 99.6 | 99.5 | 99.5 | 99.6 | 99.4 | 99.5 | 99.6 | 99.4 |
| Voltage holding ratio after 1 hour at 150° C. | 99.1 | 99.2 | 99.2 | 99.3 | 99 | 99.2 | 99.3 | 99 |
| Burn in evaluation | A | A | A | A | A | A | A | A |
| Drip mark | A | A | A | A | A | A | A | A |
| Process adaptability | A | A | A | A | A | A | A | A |
| Solubility at low temperature evaluation | C | A | A | C | A | A | A | C |

It is understood that the liquid crystal compositions 42 to 49 have a practical $T_{NI}$ in terms of a liquid crystal composition for TVs, have a large $\Delta\varepsilon$ absolute value, and have low viscosity $\eta$ and an optimum $\Delta n$. An FFS mode liquid crystal display element was produced using the liquid crystal compositions 42 to 49 in the same manner as Example 1 and evaluated for voltage holding ratio, burn-in, drip marks, process adaptability, and solubility at low temperature using the method described above, and the evaluation results were extremely excellent. In addition, when the prepared liquid crystal display element was subjected to polarizing microscopic observation and electro-optical characteristic measurement in the same manner as in Example 1, the evaluation results were excellent.

Comparative Examples 28 to 35

VA mode liquid crystal display elements were produced using liquid crystal compositions 42 to 49 in the same manner as in Comparative Examples 1 to 3.

The transmissivity, the contrast ratio, and the response speed were compared for the FFS mode liquid crystal display elements produced in Examples 42 to 49 and the VA mode liquid crystal display elements prepared in Comparative Examples 28 to 35, respectively. The results are shown below.

TABLE 37

|  | Example 42 | Comparative Example 28 | Example 43 | Comparative Example 29 | Example 44 | Comparative Example 30 | Example 45 | Comparative Example 31 |
|---|---|---|---|---|---|---|---|---|
| Display mode | FFS | VA | FFS | VA | FFS | VA | FFS | VA |
| Used liquid crystal composition | Liquid crystal composition 42 | | Liquid crystal composition 43 | | Liquid crystal composition 44 | | Liquid crystal composition 45 | |
| Maximum transmittance (%) | 93 | 88 | 92 | 88 | 93 | 88 | 93 | 89 |
| Contrast ratio | 561 | 487 | 534 | 483 | 560 | 489 | 572 | 480 |
| Response speed/ms | 5 | 8.1 | 5.1 | 8.2 | 5 | 8.1 | 5.3 | 8.6 |

TABLE 38

|  | Example 46 | Comparative Example 32 | Example 47 | Comparative Example 33 | Example 48 | Comparative Example 34 | Example 49 | Comparative Example 35 |
|---|---|---|---|---|---|---|---|---|
| Display mode | FFS | VA | FFS | VA | FFS | VA | FFS | VA |
| Used liquid crystal composition | Liquid crystal composition 46 | | Liquid crystal composition 47 | | Liquid crystal composition 48 | | Liquid crystal composition 49 | |
| Maximum transmittance (%) | 90 | 87 | 92 | 89 | 92 | 88 | 93 | 89 |
| Contrast ratio | 568 | 476 | 596 | 493 | 595 | 497 | 588 | 481 |
| Response speed/ms | 5.2 | 8.1 | 5.2 | 8.0 | 5.3 | 8.1 | 5.1 | 8.2 |

The FFS mode display elements (Examples 42 to 49) produced using the liquid crystal compositions 42 to 49 exhibited excellent characteristics in all of the maximum transmittance, the contrast ratio, and the response speed compared with VA mode liquid crystal display elements (Comparative Examples 28 to 35) prepared using the same liquid crystal compositions respectively.

REFERENCE SIGNS LIST 1, 8 POLARIZING PLATE
2 FIRST SUBSTRATE
3 FIRST ELECTRODE LAYER
4 ALIGNMENT FILM
5 LIQUID CRYSTAL LAYER
6 COLOR FILTER
7 SECOND ELECTRODE LAYER
8 SECOND SUBSTRATE
11 GATE ELECTRODE
12 GATE INSULATING FILM
13 SEMICONDUCTOR LAYER
14 INSULATING LAYER
15 OHMIC CONTACT LAYER
16 DRAIN ELECTRODE
17 SOURCE ELECTRODE
18 INSULATING PROTECTION LAYER
21 PIXEL ELECTRODE
22 COMMON ELECTRODE
23 STORAGE CAPACITOR
25 DATA BUS LINE
27 SOURCE BUS LINE
29 COMMON LINE

The invention claimed is:

1. A liquid crystal display element comprising:
a first transparent insulating substrate and a second transparent insulating substrate, which are disposed so as to face each other;
a liquid crystal layer containing a liquid crystal composition, which is interposed between the first substrate and the second substrate;
on the first substrate, a first common electrode containing a transparent conductive material and a plurality of gate bus lines and data bus lines being disposed in a matrix shape;
on the second substrate, a second common electrode containing a transparent conductive material;
for each pixel, a thin film transistor provided at an intersection between the gate bus lines and data bus lines, and a pixel electrode containing a transparent conductive material, which is driven by the thin film transistor; and
alignment film layers which induce homogeneous alignment between the liquid crystal layer and each of the first and second substrates and whose alignment directions are parallel to each other,
wherein a distances R between the pixel electrode and the first common electrode is smaller than a distance G between the first substrate and the second substrate so that the pixel electrode and the first common electrode form fringe electric fields therebetween,
the first common electrode is disposed closer to the first substrate than the pixel electrodes and over nearly the entire surface of the first substrate, and
the liquid crystal composition has negative dielectric anisotropy and contains one or more compounds selected from the group of compounds represented by General Formula (i), General Formula (ii), and General Formula (iii):

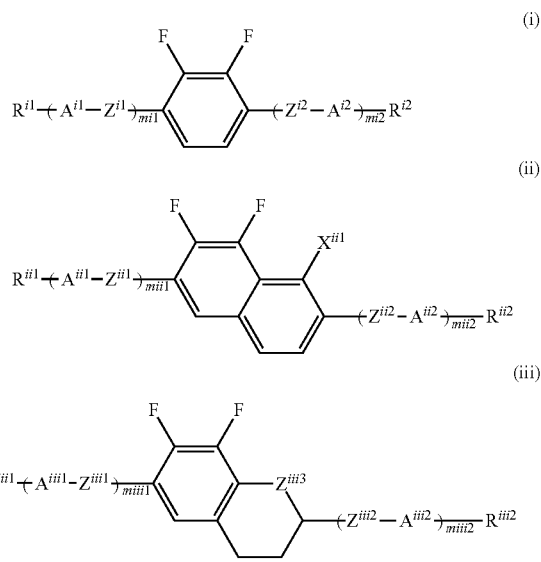

wherein $R^{i1}$, $R^{i2}$, $R^{ii1}$, $R^{ii2}$, $R^{iii1}$ and $R^{iii2}$ each independently represent an alkyl group having 1 to 10 carbon atoms, one or two or more non-adjacent —$CH_2$— in the alkyl group may each independently be substituted with —CH=CH—, —O—, —CO—, —COO— or —OCO—, $A^{i1}$, $A^{i2}$, $A^{ii1}$, $A^{ii2}$, $A^{iii1}$, and $A^{iii2}$ each independently represent a group selected from the group consisting of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=), and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $Z^{i1}$, $Z^{i2}$, $Z^{ii1}$, $Z^{ii2}$, $Z^{iii1}$ and $Z^{iii2}$ each independently represent a single bond, —$OCH_2$—, —$CH_2O$—, —$OCF_2$—, —$CH_2CH_2$—, or —$CF_2CF_2$—, $Z^{iii3}$ represents —$CH_2$— or an oxygen atom, $X^{ii1}$ represents a hydrogen atom or a fluorine atom, $m^{i1}$, $m^{i2}$, $m^{ii1}$, $m^{ii2}$, $m^{iii1}$, and $m^{iii2}$ each independently represent an integer of 0 to 3, $m^{i1}+m^{i2}$, $m^{ii1}+m^{ii2}$ and $m^{iii1}+m^{iii2}$ are 0, 1, 2, or 3, and in the case where there is a plurality of $A^{i1}$ to $A^{iii2}$ and $Z^{i1}$ to $Z^{iii2}$, these may be the same or different.

2. The liquid crystal display element according to claim 1, further comprising:
one or more of compounds represented by General Formula (IV):

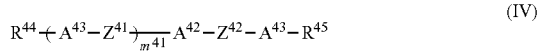

(IV)

wherein $R^{44}$ and $R^{45}$ each independently represent an alkyl group having 1 to 8 carbon atoms, one or two or more —CH$_2$— in the group may be substituted with —O—, —CH=CH—, —CO—, —OCO—, —COO—, —CF$_2$O— or —OCF$_2$— as long as an oxygen atom is not directly adjacent to another oxygen atom, one or two or more hydrogen atoms in the group may be independently substituted with a fluorine atom or a chlorine atom, $A^{41}$ to $A^{43}$ each independently represent a group selected from the group consisting of (a) a 1,4-cyclohexylene group (one —CH$_2$— or two or more non-adjacent —CH$_2$— present in the group may be substituted with —O— or —S—) (b) a 1,4-phenylene group (one —CH= or two or more non-adjacent —CH= present in the group may be substituted with —N=, and the hydrogen atom present in the group may be substituted with a fluorine atom or a chlorine atom, provided that at least one of adjacent —CH= represents a hydrogen atom), and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group, 1,2,3,4-tetrahydronaphthalene-2,6-diyl group or decahydronaphthalene-2,6-diyl group may be substituted with —N=, and the hydrogen atom present in the group may be substituted with a fluorine atom or a chlorine atom, provided that at least one of adjacent —CH= represents a hydrogen atom), $Z^{41}$ and $Z^{42}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, $m^{41}$ represents an integer of 0 to 2, and in the case where there is a plurality of $A^{41}$ and $Z^{41}$, these may be the same or different.

3. The liquid crystal display element according to claim 2, further comprising:
one or more of compounds represented by General Formula (IV-1) as the compound represented by General Formula (IV):

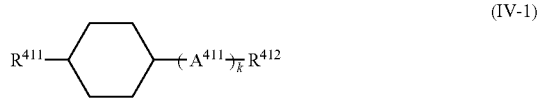

(IV-1)

wherein $R^{411}$ and $R^{412}$ each independently represent an alkyl group having 1 to 8 carbon $R^{412}$ atoms, an alkenyl group having 2 to 8 carbon atoms, an alkoxy group having 1 to 8 carbon atoms or an alkenyloxy group having 2 to 8 carbon atoms, $A^{411}$ represents a 1,4-phenylene group or a trans-1,4-cyclohexylene group, k represents 1 or 2, and in the case where k is 2, two A's may be the same or different.

4. The liquid crystal display element according to claim 3, further comprising:
one or more of compounds represented by General Formula (IV-1a) below as the compound represented by General Formula (IV-1):

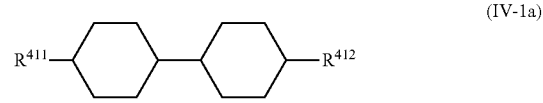

(IV-1a)

wherein $R^{411}$ and $R^{412}$ each independently represent the same meanings as $R^{411}$ and $R^{412}$ in General Formula (IV-1).

5. The liquid crystal display element according to claim 1, further comprising:
one or more of compounds represented by General Formula (i-a) as General Formula (i):

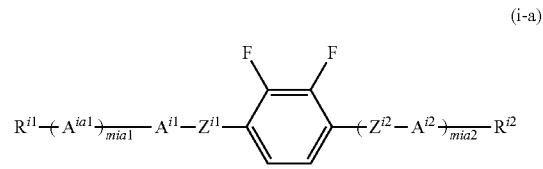

(i-a)

wherein $A^{ia1}$ each independently represent a group selected from the group consisting of (a) a 1,4-cyclohexylene group (one —CH$_2$— or two or more non-adjacent —CH$_2$— present in this group may be substituted with —O—), (b) a 1,4-phenylene group (one —CH= or two or more non-adjacent —CH= present in the group may be substituted with —N=), and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $m^{ia1}$ and $m^{ia2}$ each independently represent 0 or 1, $R^{i1}$, $R^{i2}$, $A^{i1}$, $A^{i2}$, $Z^{i1}$, and $Z^{i2}$ each independently represent the same meanings as $R^{i1}$, $R^{i2}$, $A^{i1}$, $A^{i2}$, $Z^{i1}$, and $Z^{i2}$ in General Formula (i).

6. The liquid crystal display element according to claim 1, further comprising:
one or more of compounds in General Formula (i) where $Z^{i1}$ and $Z^{i2}$ each represent a single bond.

7. The liquid crystal display element according to claim 1, wherein the pixel electrode has a comb shape or has a slit.

8. The liquid crystal display element according to claim 1, wherein the inter-electrode distance R is zero.

* * * * *